US011093556B2

(12) United States Patent
Li et al.

(10) Patent No.: US 11,093,556 B2
(45) Date of Patent: Aug. 17, 2021

(54) RESTFUL OPERATIONS FOR SEMANTIC IOT

(71) Applicant: CONVIDA WIRELESS, LLC, Wilmington, DE (US)

(72) Inventors: Qing Li, Princeton Junction, NJ (US); Catalina Mladin, Hatboro, PA (US); Hongkun Li, Malvern, PA (US); Xu Li, Plainsboro, NJ (US); Chonggang Wang, Princeton, NJ (US); Rocco Di Girolamo, Laval (CA); William Robert Flynn, IV, Schwenksville, PA (US)

(73) Assignee: Convida Wireless, LLC, Wilmington, DE (US)

( * ) Notice: Subject to any disclaimer, the term of this patent is extended or adjusted under 35 U.S.C. 154(b) by 950 days.

(21) Appl. No.: 15/337,940

(22) Filed: Oct. 28, 2016

(65) Prior Publication Data
US 2017/0124193 A1    May 4, 2017

Related U.S. Application Data

(60) Provisional application No. 62/252,940, filed on Nov. 9, 2015, provisional application No. 62/249,112, filed on Oct. 30, 2015.

(51) Int. Cl.
*G06F 16/00* (2019.01)
*G06F 16/951* (2019.01)
(Continued)

(52) U.S. Cl.
CPC .......... *G06F 16/951* (2019.01); *G06F 16/367* (2019.01); *G06F 16/9024* (2019.01);
(Continued)

(58) Field of Classification Search
CPC ............... G06F 16/367; G06F 16/9024; G06F 16/9027; G06F 16/951; G06F 16/955; H04L 63/101
(Continued)

(56) References Cited

U.S. PATENT DOCUMENTS 7,496,571 B2 *  2/2009  Benedikt ................. G06F 40/14
7,765,176 B2 *  7/2010  Simmons ................. G06F 16/29
                                                                706/45
(Continued)

FOREIGN PATENT DOCUMENTS

JP      2013175181 A   9/2013
KR  10-2011-0040776 A   4/2011
(Continued)

OTHER PUBLICATIONS

Barnaghi et al, "Semantics for the Internet of Things: Early Progress and Back to the Future", International Journal on Semantic Web and Information System, 2012, 8(1), 1-21 pages.
(Continued)

*Primary Examiner* — Michelle N Owyang
(74) *Attorney, Agent, or Firm* — BakerHostetler

(57) ABSTRACT

Access control for RESTful operations may be provided to a centralized semantic graph store. In addition, operations may be provided over semantic triples distributed in a resource tree database. In an example, an system may use semantic descriptors distributed in hierarchical resource trees mechanisms for maintaining semantic descriptors relationship information. The mechanisms enable semantic queries to be performed within the context of specific graphs by using specific sets of sematic descriptors together. The mechanism which uses the formation of a group for semantic operation purposes also enables the use of the group resource in order to fan out semantic requests to members of
(Continued)

the group, including members located on different service entities.

14 Claims, 61 Drawing Sheets

(51) Int. Cl.
  *G06F 16/955* (2019.01)
  *G06F 16/901* (2019.01)
  *G06F 16/36* (2019.01)
  *H04L 29/06* (2006.01)

(52) U.S. Cl.
  CPC ........ *G06F 16/9027* (2019.01); *G06F 16/955* (2019.01); *H04L 63/101* (2013.01)

(58) Field of Classification Search
  USPC .................................. 707/705–780, 600–899
  See application file for complete search history.

(56) References Cited

U.S. PATENT DOCUMENTS

| | | | | |
|---|---|---|---|---|
| 10,075,339 | B2* | 9/2018 | Bandyopadhyay | ........................ H04L 41/0823 |
| 10,075,402 | B2* | 9/2018 | Wood | .................... H04L 67/327 |
| 10,282,484 | B2* | 5/2019 | Piccand | ................ G06F 16/367 |
| 10,372,766 | B2* | 8/2019 | Song | ...................... H04W 4/70 |
| 2003/0208473 | A1 | 11/2003 | Lennon | |
| 2006/0036633 | A1* | 2/2006 | Chong | .................. G06F 16/367 |
| 2010/0030725 | A1 | 2/2010 | Mendis et al. | |
| 2010/0070448 | A1 | 3/2010 | Omoigui | |
| 2010/0228693 | A1* | 9/2010 | Dawson | ................ G06F 16/322 706/12 |
| 2012/0131027 | A1* | 5/2012 | Kim | ...................... G06F 16/367 707/756 |
| 2012/0254197 | A1 | 10/2012 | Kuzmin | |
| 2013/0159451 | A1* | 6/2013 | Luciw | ................ H04L 67/2842 709/213 |
| 2013/0175611 | A1 | 7/2013 | Shinohara et al. | |
| 2013/0212057 | A1* | 8/2013 | Lee | ........................ G06N 5/046 706/47 |
| 2014/0059043 | A1* | 2/2014 | Sundara | .................. G06F 16/00 707/723 |
| 2014/0207827 | A1 | 7/2014 | Huang et al. | |
| 2014/0245122 | A1 | 8/2014 | Oro et al. | |
| 2014/0337376 | A1* | 11/2014 | Wilson | .................. G06F 16/951 707/769 |
| 2018/0203907 | A1* | 7/2018 | Bauer | .................... H04W 4/70 |

FOREIGN PATENT DOCUMENTS

| | | |
|---|---|---|
| WO | 2013/175611 A1 | 11/2013 |
| WO | 2014/125120 A1 | 8/2014 |
| WO | 2014/207827 A1 | 12/2014 |
| WO | WO 2017-075362 | 5/2017 |

OTHER PUBLICATIONS

Flouris et al, "Access Control for RDF: Experimental Results", 2010, 1-3, http://ceur-ws.org/Vol-647/paper8.pdf.
Hebeler et al, "Semantic Web Programming", 2009 by Wiley Publishing, Inc., Indianapolis, Indiana, 2009.
International Patent Application No. PCT/US2016/059341: International Search Report and the Written Opinion dated Jan. 20, 20017, 11 pages.
OneM2M "Functional Architecture", TS-0001 V2.3.0, Technical Specification, Aug. 7, 2015, 352 pages.
OneM2M "Service Layer Core Protocol Specification", TS-0004 V1.0.1, Technical Specification, Jan. 30, 2015, 217 pages.
OneM2M "Study of Abstraction and Semantics Enablements", TR-0007 V2.6.0, Technical Report, Sep. 29, 2015, 176 pages.
OneM2M TS-0012 V-0.4.0 "Onem2m Technical Specification, Base Ontology", Aug. 7, 2015, 30 Pages.
Sesame to RDF4J Migration Guide, Oct. 19, 216, 12 pages, http://docs.rdf4j.org/migration/.
W3C "Description of W3C Technology Stack Illustration", 2004-2005, http://www.w3.org/Consortium/techstack-desc.html.
W3C "OWL 2 Web Ontology Language Document Overview (Second Edition)", W3C Recommendation, Dec. 11, 2012, 8 pages.
W3C "RDF 1.1 Turtle", Terse RDF Triple Language, W3C Recommendation, Feb. 25, 2014, 15 pages.
W3C "RDF Schema 1.1", W3C Recommendation, Feb. 25, 2014.
W3C "RDF Vocabulary Description Language 1.0: RDF Schema", W3C Recommendation, Feb. 10, 2004, 12 pages.
W3C "RIF Overview (Second Edition)", W3C Working Group Note, Feb. 5, 2013, 9 pages, http://www.w3.org/TR/2013/NOTE-rif-Overview-20130205/.
W3C "SPARQL 1.1 Overview", W3C Recommendation, Mar. 21, 2013, 6 pages http://www.w3.org/TR/2013/REC-spargl11-overview-20130321/.
W3C "SPARQL 1.1 Query Language", W3C Recommendation, Mar. 21, 2013, 89 pages http://www.w3.org/TR/2013/REC-spargl11-query-20121108/.
W3C "SPARQL 1.1 Update", W3C Recommendation, Mar. 21, 2013, 26 pages, http://www.w3.org/TR/2013/REC-spargl11-update-20130321/.
WC3 "RDF 1.1 Concepts and Abstract Syntax", W3C Recommendation, Feb. 25, 2014, 23 pages.
Wilde, E. and Hausenblas, M., "RESTful SPARQL? You Name It!", Proceeding of the 4th workshop on Emerging Web Servicces Technology, Nov. 9, 2009, 39-43.
Anonymous: "SPARQL—Wikipedia", Sep. 24, 2015, pp. 1-3, XP055655021.

* cited by examiner

```
eHealthcare Ontology Reference Model
@prefix rdf: <http://www.w3.org/1999/0222-rdf-syntax-ns#> .
@prefix rdfs: <http://www.w3.org/2000/01/rdf-schema#> .
@prefix xsd: <http://www.w3.org/2001/XMLSchema#> .
@prefix ex: <http://example.org/> .
@prefix acp: <http://accessControlPolicy.org/> .
ex:Person a rdfs:Class .
ex:dateOfBirth a rdf:Property ;
        rdfs:domain ex:Person ; rdfs:range xsd:date ;
        rdfs:comment "Date of Birth" .
ex:name a rdf:Property ;
        rdfs:domain ex:Person ; rdfs:range rdfs:Literal ;
        rdfs:comment "name of the person" .
ex:Patient rdfs:subClassOf ex:Person .
ex:Doctor rdfs:subClassOf ex:Person .
ex:takeCareOf a rdf:Property ;
        rdfs:domain ex:Doctor ; rdfs:range rdfs:Patient ;
        rdfs:comment "doctor take care of (relation) patient" .
ex:Device a rdfs:Class .
ex:measureType a rdf:Property ;
        rdfs:domain ex:Device ; rdfs:range rdfs:Literal ;
        rdfs:comment "the type of measurement, e.g. blood pressure or glucose" .
ex:manufactureModel a rdf:Property ;
        rdfs:domain ex:Device ; rdfs:range rdfs:Literal ;
        rdfs:comment "manufacturer and model of the device" .
ex:MeasurementSample a rdfs:Class .
ex:measureOn a rdf:Property ;
        rdfs:domain ex:MeasurementSample ; rdfs:range xsd:date ;
        rdfs:comment "the date of measurement" .
ex:measureFor a rdf:Property ;
        rdfs:domain ex:MeasurementSample ; rdfs:range ex:Patient ;
        rdfs:comment "sample is measure for which patient" .
ex:unit a rdf:Property ;
        rdfs:domain ex:MeasurementSample ; rdfs:range rdfs:Literal ;
        rdfs:comment "unit of the value" .
ex:BPMeasurementSample rdfs:subClassOf ex:MeasurementSample .
ex:dValue a rdf:Property ;
        rdfs:domain ex:BPMeasurementSample ; rdfs:range xsd:integer ;
        rdfs:comment "value of the diastolic" .
ex:sValue a rdf:Property ;
        rdfs:domain ex:BPMeasurementSample ; rdfs:range xsd:integer ;
        rdfs:comment "value of the systolic" .
ex:GCMeasurementSample rdfs:subClassOf ex:MeasurementSample .
ex:value a rdf:Property ;
        rdfs:domain ex:GCMeasurementSample ; rdfs:range xsd:integer ;
        rdfs:comment "value of glucose measurement" .
ex:containMeasurement a rdf:Property ;
        rdfs:domain ex:Device ; rdfs:range ex:MeasurementSample ;
        rdfs:comment "Device contains one or more measurement samples" .
ex:ressourceGroup a rdf:Class ;
        rdfs:comment "contain a list of resources in resource tree" .
ex:containResouce a rdf:Property ;
        rdfs:domain ex:ressourceGroup ;
        rdfs:range rdf:Resource, ex:MeasurementSample .
```

FIG. 23

Access Control Ontology

@prefix rdf: <http://www.w3.org/1999/02/22-rdf-syntax-ns#>
@prefix rdfs: <http://www.w3.org/2000/01/rdf-schema#>
@prefix xsd: <http://www.w3.org/2001/XMLSchema#>
@prefix acp: <http://accessControlPolicy.org>
@prefix ex: <http://example.org>
@prefix m2m: <http://oneM2M.org> acp:accessControlPolicy  rdf:type  rdfs:Class .
acp:accessControlRule    rdf:type  rdfs:Class .

acp:hasACPRule   rdf:type    rdf:Property ;
                 rdfs:domain acp:accessControlPolicy ;
                 rdfs:range  acp:accessControlRule .

acp:hasACOriginator   rdf:type    rdf:Property ;
                      rdfs:domain acp:accessControlRule ;
                      rdfs:range  xsd:anyURI, rdfs:Literal .

acp:hasACOperations   rdf:type    rdf:Property ;
                      rdfs:domain acp:accessControlRule ;
                      rdfs:range  m2m:accessControlOperations, rdfs:Literal .

acp:hasACContexts   rdf:type    rdf:Property ;
                    rdfs:domain acp:accessControlRule ;
                    rdfs:range  m2m:ipv4, m2m:ipv6, m2m:scheduleEntry, m2m:countryCode, xsd:float, rdfs:Literal .

acp:appliedTo   rdf:property ;
                rdfs:domain  acp:accessControlPolicy ;
                rdfs:range   xsd:anyURI, rdfs:Literal, m2m:ID, ex:resourceGroup .

Access Control Triples
(i.e. who-what-how)

FIG. 24

```
eHealth Triple Graph Store

@prefix rdf: <http://www.w3.org/1999/0222-rdf-syntax-ns#> .
@prefix rdfs: <http://www.w3.org/2000/01/rdf-schema#> .
@prefix xsd: <http://www.w3.org/2001/XMLSchema#> .
@prefix ex: <http://example.org> .
@prefix acp: <http://accessControlPolicy.org> .

ex:Patient1 a ex:Patient ; ex:name "Jack" ; ex:dateOfBirth "2000-08-03"^^xsd:date .

ex:Patient2 a ex:Patient ; ex:name "Alice" ; ex:dateOfBirth "1998-06-03"^^xsd:date .

ex:Doctor1 a ex:Doctor ; ex:name "John" ; ex:dateOfBirth "1944-08-21"^^xsd:date ; ex:takeCareOf ex:Patient1 .

ex:Doctor2 a ex:Doctor ; ex:name "Steve" ; ex:dateOfBirth "1947-02-11"^^xsd:date ; ex:takeCareOf ex:Patient2 .

ex:Sample1 a ex:BPMeasurementSample ;
    ex:measureOn "2014-08-21"^^xsd:date ; ex:measureFor ex:Patient1 ;
    ex:unit "mmHg" ; ex:sValue "150"^^xsd:integer ; ex:dValue "100"^^xsd:integer .

ex:Sample2 a ex:BPMeasurementSample ;
    ex:measureOn "2014-07-24"^^xsd:date ; ex:measureFor ex:Patient3 ;
    ex:unit "mmHg" ; ex:sValue "140"^^xsd:integer ; ex:dValue "96"^^xsd:integer .

ex:Sample3 a ex:BPMeasurementSample ;
    ex:measureOn "2012-11-24"^^xsd:date ; ex:measureFor ex:Patient3 ;
    ex:unit "mmHg" ; ex:sValue "130"^^xsd:integer ; ex:dValue "57"^^xsd:integer .

Below are triples associating measurement samples with corresponding access control policy ex:semanticsDescriptor1 a ex:resourceGroup ; ex:containResource ex:Sample1, ex:Sample2 .
ex:semanticsDescriptor2 a ex:resourceGroup ; ex:containResource ex:Sample3 .

acp:accessControlPolicy1 acp:appliedTo ex:semanticsDescriptor1 .
acp:accessControlPolicy2 acp:appliedTo ex:semanticsDescriptor1 .

acp:accessControlPolicy2 acp:appliedTo ex:semanticsDescriptor2 .

Below are triples created for access control policy 1 resource based on access control ontology acp:accessControlPolicy1 rdf:type acp:accessControlPolicy.

acp:accessControlRule1_1 rdf:type acp:accessControlRule.
acp:accessControlRule1_2 rdf:type acp:accessControlRule.

acp:accessControlPolicy1 acp:hasACPRule acp:accessControlRule1_1, acp:accessControlRule1_2 .

acp:accessControlRule1_1 acp:hasACOriginator "AE-ID-1", "AE-ID-2", "AE-ID-3" .
acp:accessControlRule1_1 acp:hasACOperations "RETRIEVE", "DISCOVERY" .

acp:accessControlRule1_2 acp:hasACOriginator "AE-ID-1", "AE-ID-3" .
acp:accessControlRule1_2 acp:hasACOperations "CREATE", "UPDATE", "DELETE" .

Below are triples created for access control policy 2 acp:accessControlPolicy2 rdf:type acp:accessControlPolicy.

acp:accessControlRule2_1 rdf:type acp:accessControlRule.

acp:accessControlPolicy2 acp:hasACPRule acp:accessControlRule2_1 .

acp:accessControlRule2_1 acp:hasACOriginator "AE-ID-1", "AE-ID-2" .
acp:accessControlRule2_1 acp:hasACOperations "DISCOVERY" .
```

FIG. 25 eHealth Semantic Query with Access Control

```
PREFIX rdf: <http://www.w3.org/1999/02/22-rdf-syntax-ns#>
PREFIX rdfs: <http://www.w3.org/2000/01/rdf-schema#>
PREFIX xsd: <http://www.w3.org/2001/XMLSchema#>
PREFIX acp: <http://accessControlPolicy.org/>
PREFIX ex: <http://example.org/>
PREFIX m2m: <http://oneM2M.org/>

SELECT ?sample ?sValue ?dValue ?accessControlRule ?resourceGroup
WHERE
{
    ?accessControlRule  acp:hasACOriginator  "AE-ID-1" .
    ?accessControlRule  acp:hasACOperations  "DISCOVERY" .
    ?accessControlPolicy  acp:hasACPRule  ?accessControlRule .
    ?accessControlPolicy  acp:appliedTo  ?resourceGroup .
    ?resourceGroup  ex:containResource  ?sample .
    ?sample  ex:sValue  ?sValue .
    ?sample  ex:dValue  ?dValue .
}
```

FIG. 26

```
@prefix rdf: <http://www.w3.org/1999/02/22-rdf-syntax-ns#>.
@prefix oneM2M: <http://oneM2M.org/owl#>.
@prefix ex: <http://example.com/cseBase/>.

<rdf:Description rdf:about ex: Device12>
    <oneM2M:hasService> ex:Service23 </oneM2M:hasService>
    <oneM2M:hasFunctionality> ex:FuncF </oneM2M:hasFunctionality>
</rdf:Description>

<rdf:Description rdf:about ex: Service23>
    <oneM2M:hasOperation> ex:OperationA </oneM2M:hasOperation>
</rdf:Description>

<rdf:Description rdf:about ex: OperationA>
    <oneM2M:exposesCommand> ex:CommandK </oneM2M:exposesCommand>
    <oneM2M:hasOutput> ex:OutputX </oneM2M:hasOutput>
</rdf:Description>

<rdf:Description rdf:about ex: OutputX>
    <oneM2M:quantifies> ex:TemperatureAspect </oneM2M:quantifies>
</rdf:Description>
```

```
@prefix rdf: <http://www.w3.org/1999/02/22-rdf-syntax-ns#> .
@prefix oneM2M: <http://oneM2M.org/owl#> .
@prefix ex: <http://example.com/cseBase/> .

<rdf:Description rdf:about ex: Device12>
    <oneM2M:hasService> ex: Service23 </oneM2M:hasService>.
    <oneM2M:hasFunctionality> ex:FuncF </oneM2M:hasFunctionality>
</rdf:Description>
```

FIG. 39

```
http://example.com/cseBase/Service23 >; http://example.com/cseBase/OperationA ;
http://example.com/cseBase/OutputX
```

FIG. 40 http://example.com/cseBase/Device12; http://example.com/cseBase/Service23;
http://example.com/cseBase/OperationA ; http://example.com/cseBase/OutputX

FIG. 41

```
@prefix rdf: <http://www.w3.org/1999/02/22-rdf-syntax-ns#> .
@prefix oneM2M: <http://oneM2M.org/owl#> .
@prefix ex: <http://example.com/cseBase/> .

<rdf:Description rdf:about ex: Device12>
    <oneM2M:hasService> ex:Service23 </oneM2M:hasService>.
    <oneM2M:hasFunctionality> ex:FuncF </oneM2M:hasFunctionality>
</rdf:Description>

<rdf:Description rdf:about ex: Service23 >
    <oneM2M:hasOperation> ex:OperationA </oneM2M:hasOperation>
</rdf:Description>

<rdf:Description rdf:about ex: OperationA >
    <oneM2M:exposesCommand> ex:CommandK </oneM2M:exposesCommand>
</rdf:Description>
```

FIG. 42

```
@prefix rdf: <http://www.w3.org/1999/02/22-rdf-syntax-ns#> .
@prefix oneM2M: <http://oneM2M.org/owl#> .
@prefix ex: <http://example.com/cseBase/> .
<rdf:Description rdf:about ex: OperationA >
    <oneM2M:exposesCommand> ex:CommandK </oneM2M:exposesCommand>
    <oneM2M:hasOutput> ex:OutputX </oneM2M:hasOutput>
</rdf:Description>

<rdf:Description rdf:about ex: OutputX >
    <oneM2M:quantifies> ex:TemperatureAspect </oneM2M:quantifies>
</rdf:Description>
```

FIG. 43 http://example.com/cseBase/Device12; http://example.com/cseBase/OperationA ;

FIG. 44

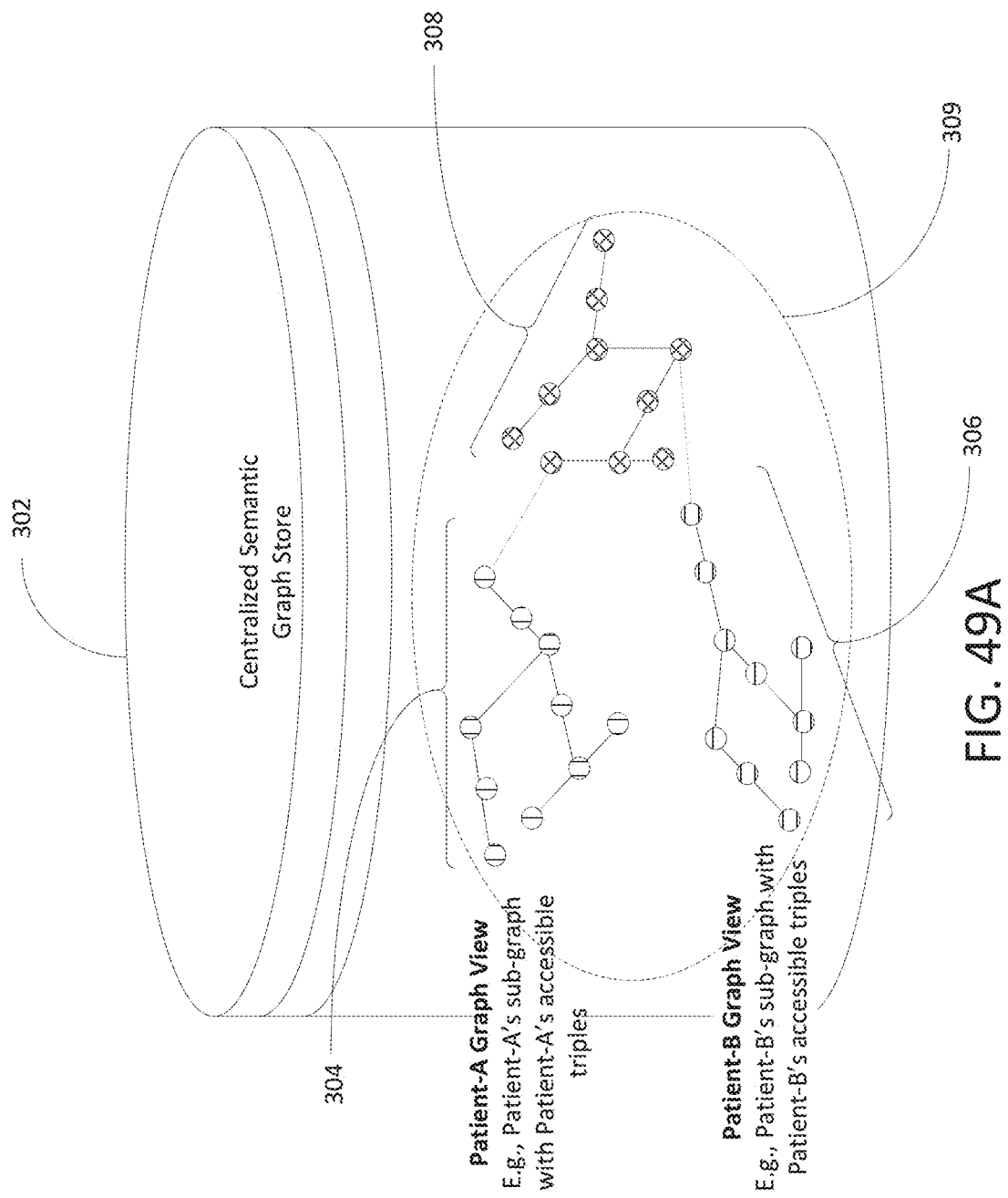

Example 1:

```
select distinct ?sample ?sValue ?dValue ?semanticDescriptor
where
{
  ?accessControlRule acp:hasACOriginator "AE-ID-1" .
  ?accessControlRule acp:hasACOperations "DISCOVERY" .
  ?accessControlPolicy acp:hasACPRule ?accessControlRule .
  ?accessControlPolicy acp:appliedTo ?semanticDescriptor .
  ?semanticDescriptor ex:containResrouce ?sample .
  ?sample ex:sValue ?sValue .
  ?sample ex:dValue ?dValue .
}
```

Result 1:

Query Result (1-3 of 3)

| Download format: | BINARY ▼ | Download |

Results per page: 100 ▼
Results offset: [Previous 100] [Next 100]
Show data types & language tags: ✓

| Sample | sValue | dValue | SemanticDescriptor |
|---|---|---|---|
| <http://example.org/Sample> | s0 | d0 | <http://example.org/semanticDescriptor> |
| <http://example.org/Sample> | s0 | d1 | <http://example.org/semanticDescriptor> |
| <http://example.org/Sample> | s0 | s1 | <http://example.org/semanticDescriptor> |

FIG. 53A

Example 2:

```
select distinct ?sample ?sValue ?dValue ?semanticDescriptor
where
{
  ?accessControlRule acp:hasACOriginator "AE-ID-3" .
  ?accessControlRule acp:hasACOperations "DISCOVERY" .
  ?accessControlPolicy acp:hasACPRule ?accessControlRule .
  ?accessControlPolicy acp:appliedTo ?semanticDescriptor .
  ?semanticDescriptor ex:containResrouce ?sample .
  ?sample ex:sValue ?sValue .
  ?sample ex:dValue ?dValue .
}
```

Result 2:

Query Result (1-2 of 2)

Download format: BINARY ▼ [Download]

Results per page: 100 ▼
Results offset: [Previous 100] [Next 100]
Show data types & language tags: ✓

| Sample | SValue | DValue | SemanticDescriptor |
|---|---|---|---|
| <http://example.org/Sample> | 150 | 100 | <http://example.org/semanticDescriptor> |
| <http://example.org/Sample> | 140 | 96 | <http://example.org/semanticDescriptor> |

FIG. 53B

Example 3:
select distinct ?sample ?sValue ?dValue ?semanticDescriptor
where
{
  ?accessControlRule acp:hasACOriginator "AE-ID-4" .
  ?accessControlRule acp:hasACOperations "DISCOVERY" .
  ?accessControlPolicy acp:hasACPRule ?accessControlRule .
  ?accessControlPolicy acp:appliedTo ?semanticDescriptor .
  ?semanticDescriptor ex:containResrouce ?sample .
  ?sample ex:sValue ?sValue .
  ?sample ex:dValue ?dValue .
}
Result 3:

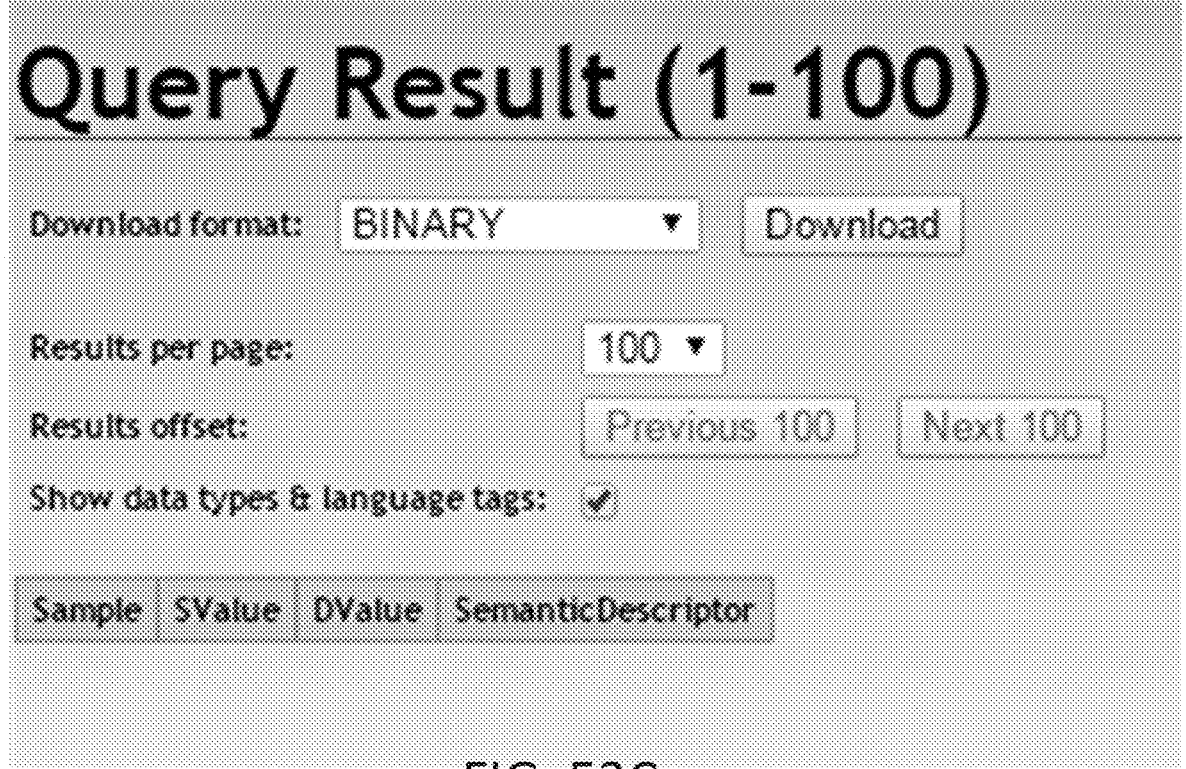

FIG. 53C

RESTFUL OPERATIONS FOR SEMANTIC IOT

CROSS-REFERENCE TO RELATED APPLICATION

This application claims the benefit of U.S. Provisional Patent Application Ser. No. 62/249,112, filed on Oct. 30, 2015, entitled "Restful Operations For Semantic JOT," and U.S. Provisional Patent Application Ser. No. 62/252,940, filed on Nov. 9, 2015, entitled "Restful Operations For Semantic JOT," The contents of each of the above-referenced applications are incorporated by reference herein in their entirety.

BACKGROUND

Semantic Web

The Semantic Web is an extension of the Web through standards by the World Wide Web Consortium (W3C). The standards promote common data formats and exchange protocols on the Web, most fundamentally the Resource Description Framework (RDF). The Semantic Web involves publishing in languages specifically designed for data: Resource Description Framework (RDF), Web Ontology Language (OWL), and Extensible Markup Language (XML). These technologies are combined to provide descriptions that supplement or replace the content of Web documents via web of linked data. Thus, content may manifest itself as descriptive data stored in Web-accessible databases, or as markup within documents, particularly, in Extensible HTML (XHTML) interspersed with XML, or, more often, purely in XML, with layout or rendering cues stored separately.

The Semantic Web Stack

The Semantic Web Stack (see Description of W3C Technology Stack Illustration, http://www.w3.org/Consortium/techstack-desc.html) illustrates the architecture of the Semantic Web specified by W3C, as shown FIG. 1. The functions and relationships of the components can be summarized as follows.

XML provides an elemental syntax for content structure within documents, yet associates no semantics with the meaning of the content contained within. XML is not at present a necessary component of Semantic Web technologies in most cases, as alternative syntaxes exists, such as Turtle. Turtle is a de facto standard, but has not been through a formal standardization process.

XML Schema is a language for providing and restricting the structure and content of elements contained within XML documents.

RDF Description of W3C Technology Stack Illustration, is a language for expressing data models, which refer to objects ("web resources") and their relationships in the form of subject-predicate-object, e.g., S-P-O triple or RDF triple. An RDF-based model can be represented in a variety of syntaxes, e.g., RDF/XML, N3, Turtle, and RDFa. RDF is a fundamental standard of the Semantic Web.

RDF Schemaextends RDF and is a vocabulary for describing properties and classes of RDF-based resources, with semantics for generalized-hierarchies of such properties and classes.

OWL adds more vocabulary for describing properties and classes: among others, relations between classes (e.g., disjointness), cardinality (e.g., "exactly one"), equality, richer type of properties, characteristics of properties (e.g., symmetry), and enumerated classes.

SPARQL is a protocol and query language for semantic web data sources, to query and manipulate RDF graph content (e.g., RDF triples) on the Web or in an RDF store (e.g., a Semantic Graph Store).

SPARQL 1.1 Query is a query language for RDF graph, can be used to express queries across diverse data sources, whether the data is stored natively as RDF or viewed as RDF via middleware. SPARQL contains capabilities for querying required and optional graph patterns along with their conjunctions and disjunctions. SPARQL also supports aggregation, subqueries, negation, creating values by expressions, extensible value testing, and constraining queries by source RDF graph. The results of SPARQL queries can be result sets or RDF graphs.

SPARQL 1.1 Update is an update language for RDF graphs. It uses a syntax derived from the SPARQL Query Language for RDF. Update operations are performed on a collection of graphs in a Semantic Graph Store. Operations are provided to update, create, and remove RDF graphs in a Semantic Graph Store.

RIF is the W3C Rule Interchange Format. It's an XML language for expressing Web rules that computers can execute. RIF provides multiple versions, called dialects. It includes a RIF Basic Logic Dialect (RIF-BLD) and RIF Production Rules Dialect (RIF PRD).

Semantic Search and Semantic Query

Relational Databases contain all relationships between data in an implicit manner only. For example the relationships between customers and products (stored in two content-tables and connected with an additional link-table) only come into existence in a query statement (e.g., SQL is used in the case of relational databases) written by a developer. Writing the query demands the exact knowledge of the database schema. Many Relational Databases are modeled as in a Hierarchical Database in which the data is organized into a tree-like structure. The data is stored as records which are connected to one another through links. A record in the hierarchical database model corresponds to a row (or tuple) in the relational database model and an entity type corresponds to a table (or relation—parent & child). A search or query of a record may be conducted by SQL or Non-SQL search engines.

As shown in FIG. 2, a conventional hierarchical database model mandates that each child record has only one parent, whereas each parent record can have one or more child records. In order to retrieve data from a hierarchical database the whole tree needs to be traversed starting from the root node. This structure is simple but inflexible because the relationship is confined to a one-to-many relationship.

Linked-Data contain all relationships between data in an explicit manner. In the above mentioned example described in Relational Database, no query code needs to be written. The correct product for each customer can be fetched automatically. Whereas this simple example is trivial, the real power of linked-data comes into play when a network of information is created (customers with their geo-spatial information like city, state and country; products with their categories within sub- and super-categories). Now the system can automatically answer more complex queries and analytics that look for the connection of a particular location with a product category. The development effort for this query is omitted. Executing a Semantic Query is conducted by walking the network of information and finding matches (also called Data Graph Traversal).

Semantic Search seeks to improve search accuracy by understanding searcher intent and the contextual meaning of terms as they appear in the searchable dataspace, whether on the Web or within a closed system, to generate more relevant results. Semantic search systems consider various points including context of search, location, intent, and variation of words, synonyms, generalized and specialized queries, concept matching and natural language queries to provide relevant search results. Major web search engines like Google and Bing incorporate some elements of Semantic Search. Semantic Search uses semantics, or the science of meaning in language, to produce highly relevant search results. In most cases, the goal is to deliver the information queried by a user rather than have a user sort through a list of loosely related keyword results. For example, semantics may be used to enhance a record search or query in a hierarchical Relational Database.

Semantic Query allows for queries and analytics of associative and contextual nature. Semantic queries enable the retrieval of both explicitly and implicitly derived information based on syntactic, semantic and structural information contained in data. They are designed to deliver precise results (possibly the distinctive selection of one single piece of information) or to answer more fuzzy and wide open questions through pattern matching and digital reasoning.

Semantic queries work on named graphs, linked-data or triples. This enables the query to process the actual relationships between information and infer the answers from the network of data. This is in contrast to Semantic Search, which uses semantics (the science of meaning) in unstructured text to produce a better search result (e.g., Natural language processing).

From a technical point of view semantic queries are precise relational-type operations much like a database query. They work on structured data and therefore have the possibility to utilize comprehensive features like operators (e.g., >, < and =), namespaces, pattern matching, subclassing, transitive relations, semantic rules, and contextual full text search. The semantic web technology stack of the W3C is offering SPARQL to formulate semantic queries in a syntax similar to SQL. Semantic queries are used in triple stores, graph databases, semantic wikis, natural language, and artificial intelligence systems.

Another aspect of semantic queries is that the type of the relationship can be used to incorporate intelligence into the system. The relationship between a customer and a product has a fundamentally different nature then the relationship between a neighborhood and its city. The latter enables the semantic query engine to infer that a customer living in Manhattan is also living in New York City whereas other relationships might have more complicated patterns and "contextual analytics". This process is called inference or reasoning and is the ability of the software to derive new information based on given facts.

Semantic Internet of Things (IoT)

The rapid increase in number of network-connected devices and sensors deployed in our world is changing the information communication networks, and services or applications in various domains. It is predicted that within the next decade billions of devices will generate large volumes of real world data for many applications and services in a variety of areas such as smart grids, smart homes, healthcare, automotive, transport, logistics and environmental monitoring. Internet of Things (IoT) enables integration of real world data and services into the current information networking.

Integration of data from various physical, cyber, and social resources enables developing applications and services that can incorporate situation and context-awareness into the decision making mechanisms and can create smarter applications and enhanced services. In dealing with large volumes of distributed and heterogeneous IoT data, issues related to interoperability, automation, and data analytics is used with common description and data representation frameworks and machine readable and machine-interpretable data descriptions. Applying semantic technologies to the IoT promotes interoperability among various resources and data providers and consumers, and facilitates effective data access and integration, resource discovery, semantic reasoning, and knowledge extraction. Semantic annotations can be applied to various resources in the IoT. The suite of technologies developed in the Semantic Web, such as ontologies, semantic annotation, Linked Data, and semantic Web services, can be used as principal solutions for realizing the IoT.

However, there are several challenges based on the conventional configuration of IoT that require special design considerations to be taken into account to effectively apply the semantic technologies on the real world data. Challenges may include dynamicity and complexity, scalability, distributed data storage and query, quality/trust/reliability of data, security and privacy, or interpretation and perception of data. With regard to dynamicity and complexity, real world data is more transient, and mostly time and location dependent. The pervasiveness and volatility of the underlying environments require continuous updates and monitoring of the descriptions. With regard to scalability, the IoT data refers to different phenomena in the real world; so the semantic description and annotation with data need to be associated with domain knowledge of real world resources and entities so that to be scalable to different and dynamic real word situations. With regard to distributed data storage/query, with large volumes of data and semantic descriptions, efficiency of storage and data handling mechanisms become a significant challenge, especially considering the scale and dynamicity involved. With regard to quality, trust, and reliability of data, the IoT data is provided by different sensory devices, which provides for concerns for inaccuracy and varying qualities in the IoT data. With regard to security and privacy, IoT data is often personal. The mechanisms to provide and guarantee the security and privacy of data may be significant issues in IoT. Lastly, with regard to interpretation and perception of data, semantic descriptions and background knowledge provided in machine-readable and interpretable formats, support transforming enormous amount of raw observations created by machine and human sensors into higher-level abstractions that are meaningful for human or automated decision making processes. However, machine perception in IoT adds additional challenges to the problems that conventional AI methods have been trying to solve in the past, such as integration and fusion of data from different sources, describing the objects and events, data aggregation and fusion rules, defining thresholds, real-time processing of the data streams in large scale, and quality and dynamicity issues.

oneM2M Architecture

The oneM2M standard (see oneM2M-TS-0001 oneM2M Functional Architecture—V2.3.0 which is incorporated by reference in its entirety) under development defines a Service Layer called "Common Service Entity (CSE)". The purpose of the Service Layer is to provide "horizontal" services that can be utilized by different "vertical" M2M systems and applications.

The CSE supports four reference points as shown in FIG. 3. The Mca reference point interfaces with the Application Entity (AE). The Mcc reference point interfaces with another CSE within the same service provider domain and the Mcc' reference point interfaces with another CSE in a different service provider domain. The Mcn reference point interfaces with the underlying network service entity (NSE). An NSE provides underlying network services to the CSEs, such as device management, location services and device triggering.

CSE contains multiple logical functions called "Common Service Functions (CSFs)", such as "Discovery", "Data Management & Repository". FIG. 4 ilustrates the CSFs under development at oneM2M.

The oneM2M architecture enables the following types of Nodes as shown in FIG. 3, application service node (ASN), application dedicated node (ADN), middle node (MN), infrastructure node (IN), and non-oneM2M node (NoDN). An ASN is a node that contains one CSE and contains at least one application entity (AE). For example, with regard to physical mapping, an ASN may reside in an M2M Device. An ADN is a node that contains at least one AE and does not contain a CSE. There may be zero or more ADNs in the field domain of the oneM2M system. For example, with regard to physical mapping, an ADN may reside in a constrained M2M device. A MN is a node that contains one CSE and contains zero or more AEs. There may be zero or more MNs in the field domain of the oneM2M system. For example, with regard to physical mapping, a MN may reside in an M2M Gateway. An IN is a node that contains one CSE and contains zero or more AEs. There is an IN in the infrastructure domain per oneM2M service provider. A CSE in an IN may contain CSE functions not applicable to other node types. For example, with regard to physical mapping, an IN may reside in an M2M service infrastructure. A non-oneM2M Node is a node that does not contain oneM2M entities (neither AEs nor CSEs). Such nodes represent devices attached to the oneM2M system for interworking purposes, including management.

The possible configurations of inter-connecting the various entities supported within the oneM2M system are illustrated in FIG. 5.

Semantic Description in oneM2M Architecture

The <semanticDescriptor> resource is used to store a semantic description pertaining to a resource and potentially sub-resources. Such a description may be provided according to ontologies. The semantic information is used by the semantic functionalities of the oneM2M system and is also available to applications or CSEs.

Conventionally, <semanticDescriptor> resource shall contain the attributes specified in Table 1. FIG. 6 illustrates structure of <semanticDescriptor> resource in a resource tree.

TABLE 1

Attributes of <semanticDescriptor> Resource

| Attributes of <semanticDescriptor> | Multi-plicity | RW/RO/WO | Description |
| --- | --- | --- | --- |
| creator | 0 . . . 1 | RO | The AE-ID of the entity which created the resource. This can also be the CSE-ID of the IN-CSE if the IN-CSE created the resource. |
| descriptor | 1 | RW | store a semantic description pertaining to a resource and potentially sub-resources. Such a description may be provided according to ontologies |

TABLE 1-continued

Attributes of <semanticDescriptor> Resource

| Attributes of <semanticDescriptor> | Multi-plicity | RW/RO/WO | Description |
| --- | --- | --- | --- |
| ontologyRef | 0 . . . 1 | WO | A reference (URI) of the ontology used to represent the information that is stored in the descriptor attribute. If this attribute is not present, the ontologyRef from the parent resource is used if present. |

Semantic Filtering Proposals in oneM2M

Generic filtering is supported by having filter criteria specified in a request operation (oneM2M-TS-0001 oneM2M Functional Architecture—V2.3.0 section 8.1.2). In order to provide for semantic filtering, an additional value for the request operation filter criteria has been proposed, with the definition shown in the table 2 below. Multiple instances may be used, which according to the general rules for evaluating filter criteria, means that an "OR" semantics applies, e.g., the overall result for the semantics filter criteria is true if one or more of the semantic filters matches the semantic description.

TABLE 2 semantics Filter Criteria

| semantics | 0 . . . n | The semantic description contained in one of the <semanticDescriptor> child resources matches the specified semantic filter. |
| --- | --- | --- |

The proposal above uses the following assumptions: the semantic descriptions are specified as RDF triples (representation, e.g., RDF/XML, Turtle, description format had not been fully specified in oneM2M yet); the semantics filter criteria will be used for SPARQL requests to be executed on semantic descriptions In some cases the relevant semantic information for a single search may be distributed among different <semanticDescriptor> resources. The example provided in FIG. 7 illustrates this case. The semantic graph representing subject-predicate-object relations is shown, with different parts of this graph (represented by ovals) being stored in different <semanticDescriptor> resources. Semantic filtering needs to be applied to (parts of) the complete semantic graph, which raises the problem that several different parts of the graph have to be put together for the execution of the semantic operation.

This problem is not generally apparent in the realm of the Semantic Web, since the URI identifying class instances can be directly de-referenced so the concept (e.g., class, relationship) information can be found based on its URI. In the oneM2M case, only resources that can be accessed and semantics are stored as resource content. Since in this case semantic instances are not first-class citizens the URI-based approach is not applicable in the oneM2M case.

Conventional SPARQL 1.1, supports federated queries using the SERVICE keyword, where the URL of a remote SPARQL endpoint can be specified. For this approach, a requestor would a-priori know which semantic descriptors contain the semantic instances required for the search, making this approach not generally applicable when the semantic descriptors are distributed in resource trees.

A solution for enabling semantic filtering on semantic descriptions stored across <semanticDescriptor> resources, as presented in oneM2M, introduce an annotation link in the form of a resourceDescriptorLink OWL annotation property. This annotation property can be specified for any class instance and its value is the URL of a <semanticDescriptor> resource, where additional RDF triples for the given class instance can be found. The following example uses the classes and relationships defined in the oneM2M Base Ontology (FIG. 8) in order to create the graphs in FIG. 9.

This solution entails the following functional flow for the SPARQL-based semantic filtering engine at the receiver. First, the semantic filter formulated as a SPARQL request is executed on the content of the semantic descriptor resource of the candidate resource. Second, if in the course of the execution a class instance with one or more resourceDescriptorLink annotations is encountered, the execution is halted. Third, the content of each of the <semanticDescriptor> resources the resourceDescriptorLink references is added to the content on which the SPARQL request is being executed (lazy evaluation, alternative: fetch everything before execution, but may result in fetching unnecessary information). Fourth, the execution of the SPARQL request is continued on the enlarged content.

Access Control Policy in oneM2M

As shown in FIG. 10, the conventional <accessControlPolicy> resource is comprised of privileges and selfPrivileges attributes which represent a set of access control rules defining which entities (defined by accessControlOriginators) have the privilege to perform certain operations (defined by accessContolOperations) within specified contexts (defined by accessControlContexts) and are used by the CSEs in making Access Decision to specific resources. In a privilege, each access control rule defines which AE/CSE is allowed for which operation. So for sets of access control rules an operation is permitted if it is permitted by one or more access control rules in the set. For a resource that is not of <accessControlPolicy> resource type, the common attribute accessControlPolicyIDs for such resources contains a list of identifiers which link that resource to <accessControlPolicy> resources. The CSE Access Decision for such a resource shall follow the evaluation of the set of access control rules expressed by the privileges attributes defined in the <accessControlPolicy> resources. The selfPrivileges attribute shall represent the set of access control rules for the <accessControlPolicy> resource itself. The CSE Access Decision for <accessControlPolicy> resource shall follow the evaluation of the set of access control rules expressed by the selfPrivileges attributes defined in the <accessControlPolicy> resource itself.

The <accessControlPolicy> resource conventionally contains the attributes specified in Table 3.

TABLE 3

Attributes of <accessControlPolicy> Resource

| Attributes of <accessControlPolicy> | Multi-plicity | RW/RO/WO | Description | <accessControlPolicyAnnc> Attributes |
|---|---|---|---|---|
| privileges | 1 | RW | A set of access control rules that applies to resources referencing this <accessControlPolicy> resource using the accessControlPolicyID attribute. | MA |
| selfPrivileges | 1 | RW | A set of access control rules that apply to the <accessControlPolicy> resource itself. | MA |

The conventional set of Access Control Rules represented in privileges and selfPrivileges attributes are comprised of 3-tuples described below. The accessControlOriginators is a parameter in an access-control-rule-tuple. It represents the set of Originators allowed to use this access control rule. The set of Originators is described as a list of parameters, where the types of the parameter can vary within the list. Table 4 describes the supported types of parameters in accessControlOriginators.

TABLE 4

Types of Parameters in accessControlOriginators

| Name | Description |
|---|---|
| domain | A SP domain or SP sub-domain |
| originatorID | CSE-ID, AE-ID, or the resource-ID of a <group> resource that contains the AE or CSE that represents the Originator. |
| all | Any Originators are allowed to access the resource within the accessControlOriginators constraints |

When the originatorID is the resource-ID of a <group> resource which contains <AE> or <remoteCSE> as member, the hosting CSE of the resource determines if the originator of the request matches one of the members in the memberIDs attribute of the <group> resource (e.g., by retrieving the <group> resource). If the <group> resource cannot be retrieved or doesn't exist, the request shall be rejected.

The accessControlContexts is a parameter in an access-control-rule-tuple that contains a list, where each element of the list, when present, represents a context that is permitted to use this access control rule. Each request context is described by a set of parameters, where the types of the parameters can vary within the set. Table 5 describes the supported types of parameters in accessControlContexts. The following conventional Originator accessControlContexts shall be considered for access control policy check by the CSE.

TABLE 5

Types of Parameters in accessControlContexts

| Name | Description |
|---|---|
| accessControlTimeWindow | Represents a time window constraint which is compared against the time that the request is received at the Hosting CSE. |
| accessControlLocationRegion | Represents a location region constraint which is compared against the location of the Originator of the request. |
| accessControlIpIPAddress | Represents an IP address constraint or IP address block constraint which is compared against the IP address of the Originator of the request. |

The accessControlOperations is a parameter in an access-control-rule-tuple that represents the set of operations that are authorized using this access control rule. Table 6 describes the supported set of operations that are authorized by accessControlOperations. The following accessControlOperations shall be considered for access control policy check by the CSE.

TABLE 6

Types of parameters in accessControlOperations

| Name | Description |
| --- | --- |
| RETRIEVE | Privilege to retrieve the content of an addressed resource |
| CREATE | Privilege to create a child resource |
| UPDATE | Privilege to update the content of an addressed resource |
| DELETE | Privilege to delete an addressed resource |
| DISCOVER | Privilege to discover the resource |
| NOTIFY | Privilege to receive a notification |

Proposed Functional Architecture of M2M Semantics Support

FIG. 11 shows a proposed functional architectural for M2M semantic support, the major components may include a resource repository, ontology processor, ontology repository, semantics repository, rule repository, reasoner, or semantics query processor. Resource Repository stores all resources that are collected from the physical M2M Devices. The M2M semantic support is intended to enable semantics to the original resources for universal understanding/interpretation of them, as well as any advanced processing on them, e.g., semantic query, data analytics, etc. Ontology processor is in charge of processing, classifying, storing and providing discovery function of published/generated ontologies external and internal of the M2M domain. Ontology repository stores the ontologies. Those ontologies can be used to enable semantics for resources. Semantics repository stores the annotated semantics information in certain representations, which may have the option of utilizing RDF. Semantics annotation is a process of representing resource's semantics in a concrete format, such as binary stream. Rule repository stores the rules that are used to represent new knowledge that often goes beyond the existing semantics that is associated with the resources in resource repository. Rules are typically conditional statements: if-then clauses. Reasoner takes input from the rule repository and the existing resource semantics information in the semantics repository and generates new resource semantics information if the conditions in the rules are satisfied. New resource semantics information is added to the semantics repository. Semantics query processor handles the queries from clients to search over the resource semantics information stored in the semantics repository and returns the results to the clients.

SUMMARY

Disclosed herein are ways to provide access control for RESTful operations to a centralized semantic graph store and provide operations over semantic RDF triples distributed in resource tree database.

In an example, there may be semantic descriptors in a centralized semantic graph store. Provided herein are details with regard to architecture with semantic descriptors in a centralized semantic graph store, restful operations with semantic triples or graphs in a centralized semantic graph store, access control for a centralized semantic graph store with access control rules specified by access control policy, and resource discovery with semantic query, among other things.

In another example, there may be semantic descriptors in hierarchical resource trees. Provided herein are details with regard to architecture with semantic descriptors distributed in hierarchical resource trees, and semantic query with semantic descriptors distributed in hierarchical resource trees and temporary semantic graph stores, among other things.

In another example, there may be semantic descriptors in a centralized semantic graph store and resource trees. Provided herein are details with regard to architecture with semantic descriptors in a centralized semantic graph store and resource trees, and semantic query with semantic descriptors in a centralized semantic graph store and resource trees.

Architecture using semantic descriptors distributed in the hierarchical resource trees mechanisms for maintaining semantic descriptors relationship information is disclosed. The mechanisms enable semantic queries to be performed within the context of specific graphs by using specific sets of sematic descriptors together. The mechanism which uses the formation of a group for semantic operation purposes also enables the use of the group resource in order to fan out semantic requests to members of the group, including members located on different service entities.

Additional functionality enabled includes query optimizations by maintaining in a centralized manner the composite graph associated with the entire group. Local triple store storage, caching, etc., may further optimize the query processing when using the group method. Functionality also includes greater granularity in targeting semantic operations and making them as specific or as wide as possible, by using groups in conjunction with graph naming rules.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The claimed subject matter is not constrained to limitations that solve any or all disadvantages noted in any part of this disclosure.

BRIEF DESCRIPTION OF THE DRAWINGS

FIG. 23 illustrates an exemplary eHealth Ontology Reference Model;

FIG. 24 illustrates an exemplary Access Control Ontology Model;

FIG. 25 illustrates an exemplary eHealth Triples in Semantic Graph Store;

FIG. 26 illustrates an exemplary eHealth Semantic Query with Access Control;

FIG. 38 illustrates an exemplary RDF description of the composite graph represented in FIG. 31.

FIG. 39 illustrates an exemplary Content of the semanticDescriptor descriptor attribute for <Device12>;

FIG. 40 illustrates an exemplary relatedSemantics attribute when the list of links method is used;

FIG. 41 illustrates an exemplary semanticGroupLinks attribute when the group of links method is used;

FIG. 42 illustrates an exemplary Semantic Annotation for <Device12> in an Arbitrary Graph-based Scheme;

FIG. 43 illustrates an exemplary <OperationA> annotation in an Arbitrary Graph-based scheme;

FIG. 44 illustrates an exemplary semanticGroupLinks attribute when the group of links method is used;

FIG. 49A illustrates exemplary views in a Semantic Graph Store;

FIG. 53A illustrates an example 1 for eHealth Semantic Query with Access Control;

FIG. 53B illustrates an example 2 for eHealth Semantic Query with Access Control;

FIG. 53C illustrates an example 3 for eHealth Semantic Query with Access Control.

DETAILED DESCRIPTION OF ILLUSTRATIVE EMBODIMENTS

As described herein with regard to "Semantic Internet of Things", there are many challenges for semantic IoT when compared to the semantic web. A first challenge is the security and privacy especially as the scenario illustrated in Use Case I associated with FIG. 12—how to control the access to a centralized semantic graph store and how to manage the access control policies for semantic graph store efficiently should be addressed. Another challenge is the large volumes of semantic descriptors distributed in the database(s) in RDF triples or not as the scenario illustrated in Use Case II associated with FIG. 13—how to extract the semantic RDF triples from the hierarchical resource trees and conduct operations over RDF triples should be addressed. With regard to the distributed semantic descriptors in Use Case II, another query related problem is the scope of the query, which may be seen as the span of the searched graph or of the corresponding RDF description resulting from the descriptors. This search is associated with the resource used as the query operation target, but the default spans may easily result into un-optimized searches Disclosed herein are multiple approaches for RESTful operations applied to semantic descriptors for semantic IoT services or applications. Provided herein are details of mechanisms for semantic descriptors in a centralized semantic graph store; mechanisms for semantic descriptors distributed in hierarchical resource trees; and hybrid mechanisms for semantic descriptors located at both a centralized graph store and hierarchical resource trees. Also discussed are alternatives for semantic descriptors distributed within a service entity. It should be understood herein that the use of the term "graph" is interchangeable with "semantic graph" or the like.

Figure 12:
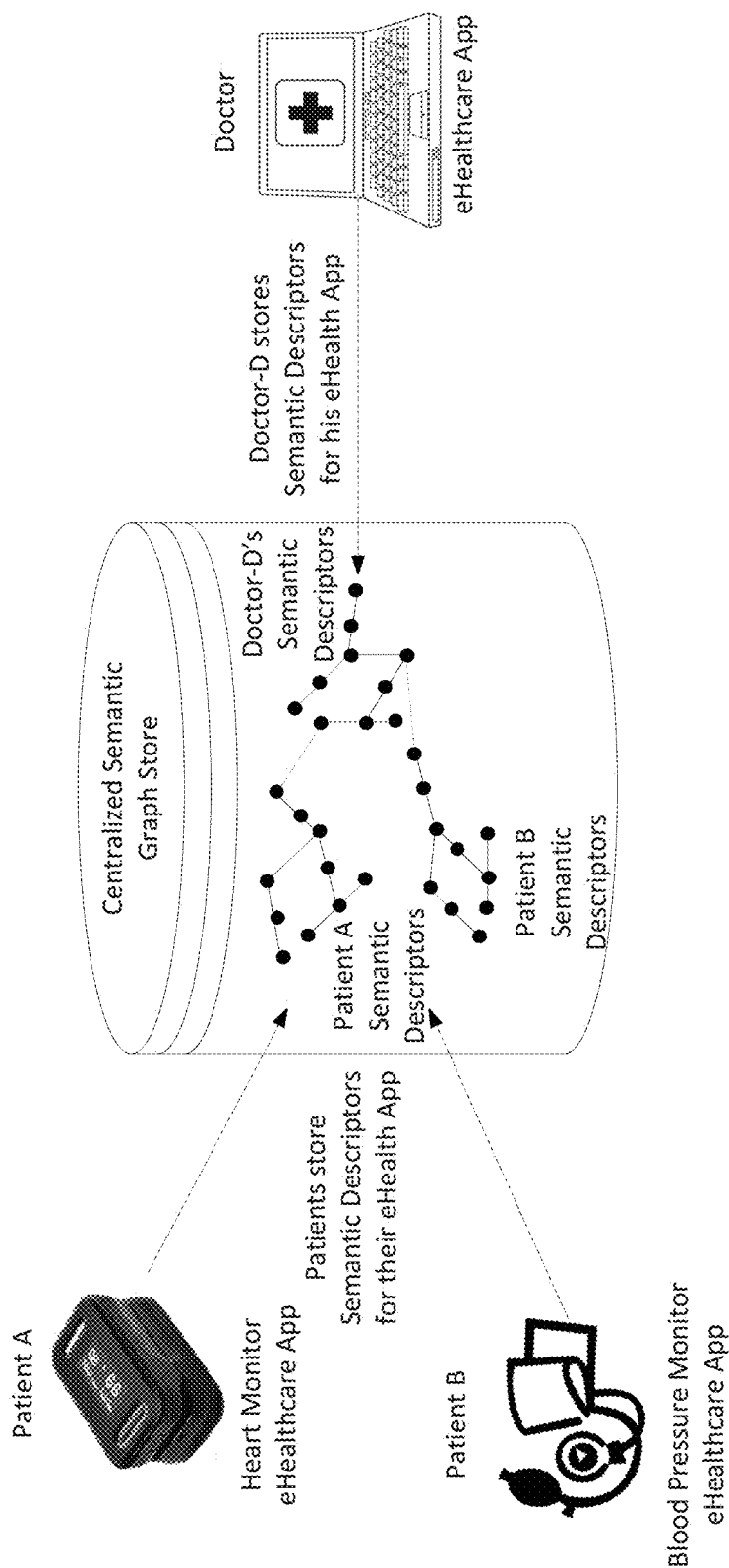
FIG. 12 illustrates exemplary Semantic Descriptors in Centralized Semantic Graph Store.

Use Case I is discussed in view of FIG. 12. As shown in FIG. 12, the semantic descriptions in the form of RDF triples (e.g., semantic descriptors) are deposited at a centralized RDF triple database, e.g., Semantic Graph Store. For example, Doctor-D and Doctor-D's patients A and B store their Semantic Descriptors into a centralized RDF triple store or Semantic Graph Store, and then Doctor-D may conduct a Semantic Query over all his patients' Semantic Descriptors if the patients grant the permission to Doctor-D, and the patients may also conduct a Semantic Query over their own Semantic Descriptors and some of Doctor-D's Semantic Descriptors if Doctor-D grants the permission to his patients. But the patients cannot conduct a Semantic Query over each other's Semantic Descriptors if no permission is granted. Furthermore, Doctor-D may update or delete his Semantic Descriptors and maybe some of his patients' Semantic Descriptors if the permissions are granted by his patients and similarly a patient may update or delete his or her own Semantic Descriptors and may be some of Doctor-D's if a permission is granted by Doctor-D.

Figure 13:
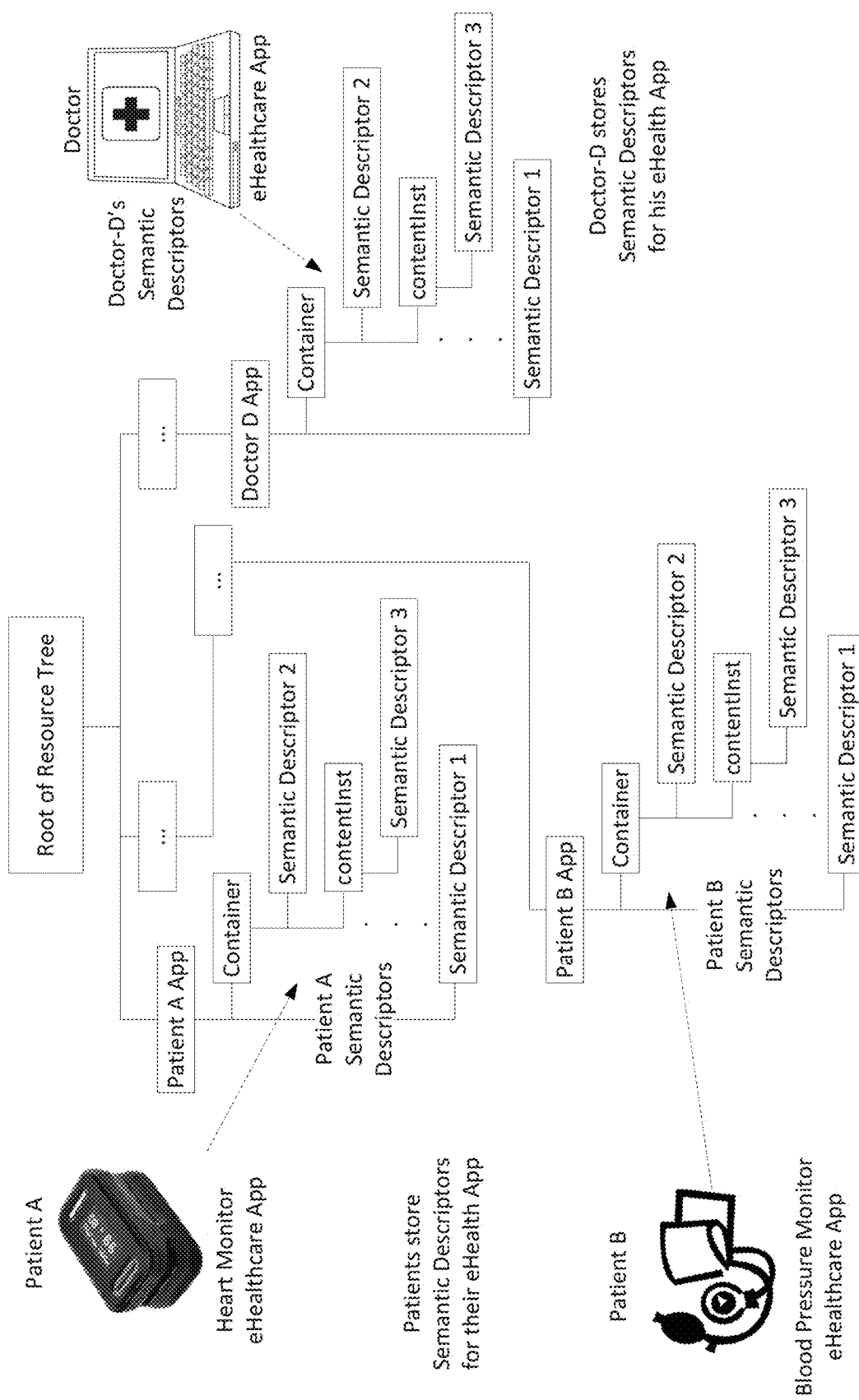
FIG. 13 illustrates exemplary Semantic Descriptors Distributed in a Hierarchical Resource Tree.

Use Case II is discussed in view of FIG. 13. As shown in FIG. 13, both data and semantic descriptions in the form of RDF triples (e.g., semantic descriptors) or not are deposited at a relationship database, e.g., a hierarchical Resource Tree. For example, Doctor-D and Doctor-D's patients A and B store their data and Semantic Descriptors into a relationship database or a hierarchical Resource Tree. Semantic Descriptor 1 describes semantic info related to the related eHealth Application, Semantic Descriptor 2 is for a data container, and Semantic Descriptor 3 is for a specific data instance. Later, Doctor-D may conduct Semantic Search using semantic descriptions or Semantic Query over all his patients' Semantic Descriptors in the resource tree if the patients grant the permission to Doctor-D, and the patients may conduct Semantic Search using semantic descriptions or Semantic Query over their own Semantic Descriptors and some of Doctor-D's Semantic Descriptors if Doctor-D grants the permission to his patients in the resource tree. But the patients cannot conduct Semantic Query over each other's Semantic Descriptors if no permission is granted. Furthermore, Doctor-D may update or delete his Semantic Descriptors and may be some of his patients' Semantic Descriptors if the permissions are granted by his patients and a patient may update or delete his or her own Semantic Descriptors and may be some of Doctor-D's if a permission is granted by Doctor-D.

Some general considerations are disclosed below. A semantic description may be in either RDF triple like format or not. A semantic description in a general format, e.g., not specifically RDF triple like S-P-O relationship description, is the same as the other resources, such as metadata or context info in the resource tree. Herein, there is a discussion around the semantic description in relationship, e.g., RDF triple S-P-O, and thus the term semantic descriptor or semantic triple is used for semantic description in RDF triple like format. SPARQL is used for RDF triples only for illustration purposes. The solutions are general for other types of semantics expressions and semantics query languages for linked data. Data is a general term used herein for a record in a resource tree which may be data samples or context info (e.g., metadata). An element or node in a semantic triple (e.g., the S, P, or O of a triple S-P-O) may be addressed by a unique identifier, e.g., Internationalized Resource Identifier (IRI) or uniform resource identifier (URI), in a semantic triple statement. URI is used, but IRI or other identifier (e.g., URL) are also applicable in the mechanisms disclosed. An element or node in a RDF triple S-P-O may be represented by URI, blank node label or a Unicode string literal. For simplifying the statement, the base or namespace is not used in some examples for semantic triples. The semantic triples are used for RESTful operation discussions, but the mechanisms may also apply to semantic graph (e.g., linked triples or linked data) operations which are supported by SPARQL Update 1.1, for example. It should be understand that it is contemplated herein that operations of one section or example may be applied to another section or example. For example, the operation messages (e.g., request and response) disclosed herein regarding restful operations for centralized semantic graph store for centralized architecture are also applicable to the operations for the other architecture disclosed herein, such as semantic descriptors distributed in hierarchical resource trees and semantic descriptors in a semantic graph store and hierarchical resource trees.

Figure 14A:
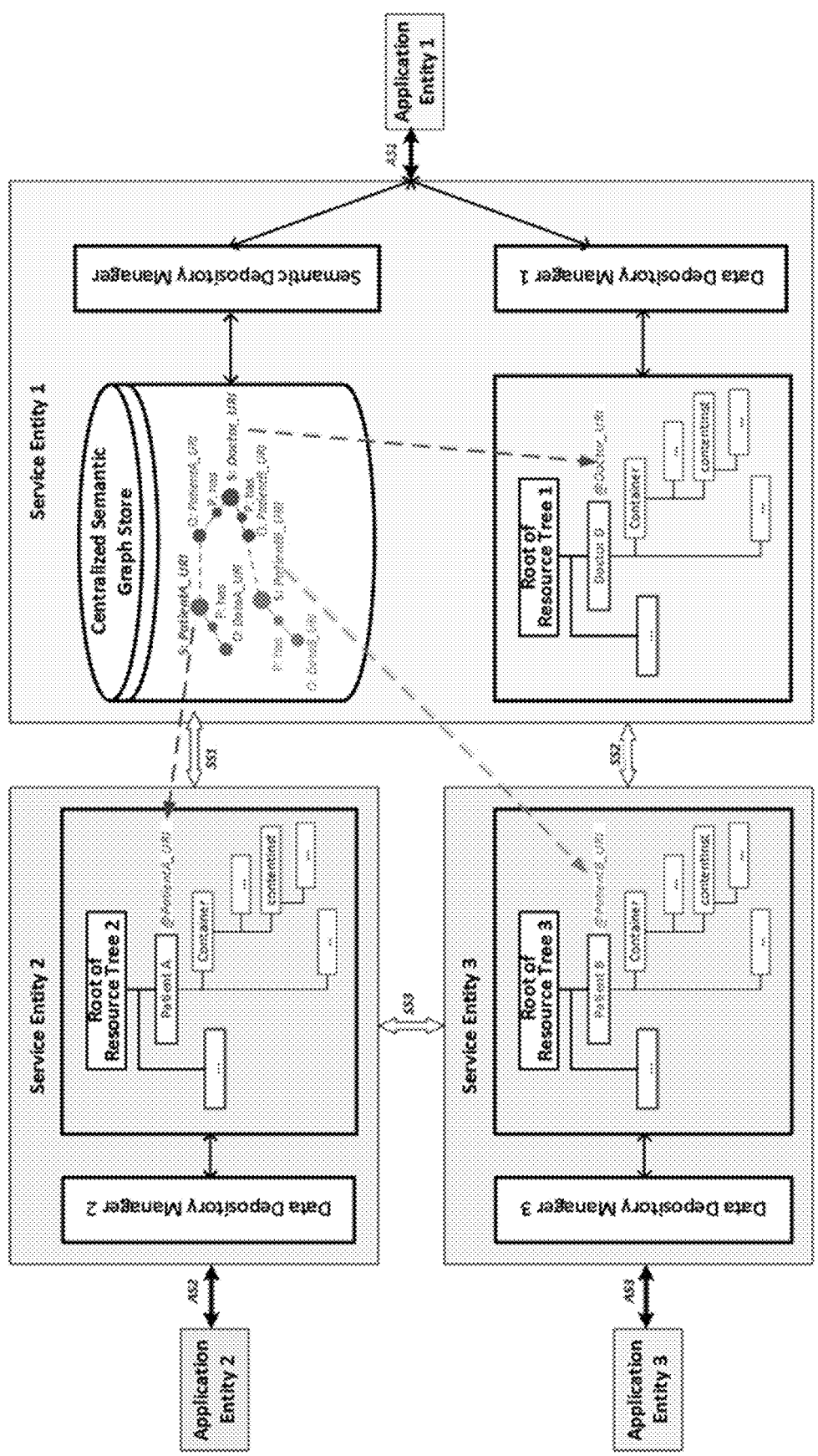
FIG. 14A illustrates an exemplary Architecture for Semantic Descriptors in a Centralized Semantic Graph Store.

As shown in FIG. 14A, (see Use Case I and II and FIG. 29 for additional context of FIGS. 14A and 14B discussion below) a centralized architecture has the following features. Semantic Graph Store may reside on a service entity (SE), e.g., CSE in oneM2M, and contain Semantic Triples pointing to different resources in different Resource Trees via their individual URIs. A URI is the same as a URL if the URI is reachable or accessible in an IoT system. The resources addressed or pointed by Semantic Triples via URIs (illustrated in FIG. 14B) may locate at the same hierarchical Resource Tree on a Service Entity, e.g., all Doctor-D's resources are deposited at Resource Tree 1 on SE 1, or different hierarchical Resource Trees on multiple Service Entities, e.g., Patient-A's resources are located at Resource Tree 2 on SE2, and Patient-B's at Resource Tree 3 on SE3, but the corresponding Semantic Triples are located at SE1. An Application Entity (AE), e.g., AE in oneM2M, may communicate with a Service Entity via interface AS, e.g., Mca interface in oneM2M, for RESTful operations such as CREATE, RETRIEVE, UPDATE, DELETE etc. over either the resources in the Resource Tree or the Semantic Triples in the Semantic Graph Store. A service entity (SE) may communicate with another service entity (SE) via interface SS, e.g., Mcc or Mcc' interface in oneM2M, for RESTful operations such as CREATE, RETRIEVE, UPDATE, DELETE etc. over either the resources in the resource tree or the semantic triples in the semantic graph store. Data Depository Manager is responsible for data exchanges with other external entities such as AE and/or SE and internal entities such as Semantic Depository Manager and/or other common function entities; Resource Tree database operations and management via the commands for CREATE, RETRIEVE, UPDATE, DELETE, etc. Semantic Depository Manager is responsible for: semantic triple exchanges with other external entities such as AE and/or SE and internal entities such as Data Depository Manager and/or other common function entities; or Semantic Graph Store operations and management via the commands for CREATE, RETRIEVE, UPDATE, DELETE, etc.

It's shown in FIG. 14A that both Doctor-D's triples and data are located on the same SE, but it's also possible that they are located at different SEs. Also it's possible that the centralized semantic graph store shown in FIG. 14A is located at an SE which is in another service domain, e.g., another service provider. In this case, the RESTful operations are across service domains, e.g., via the interface Mcc' in oneM2M.

Figure 14B:
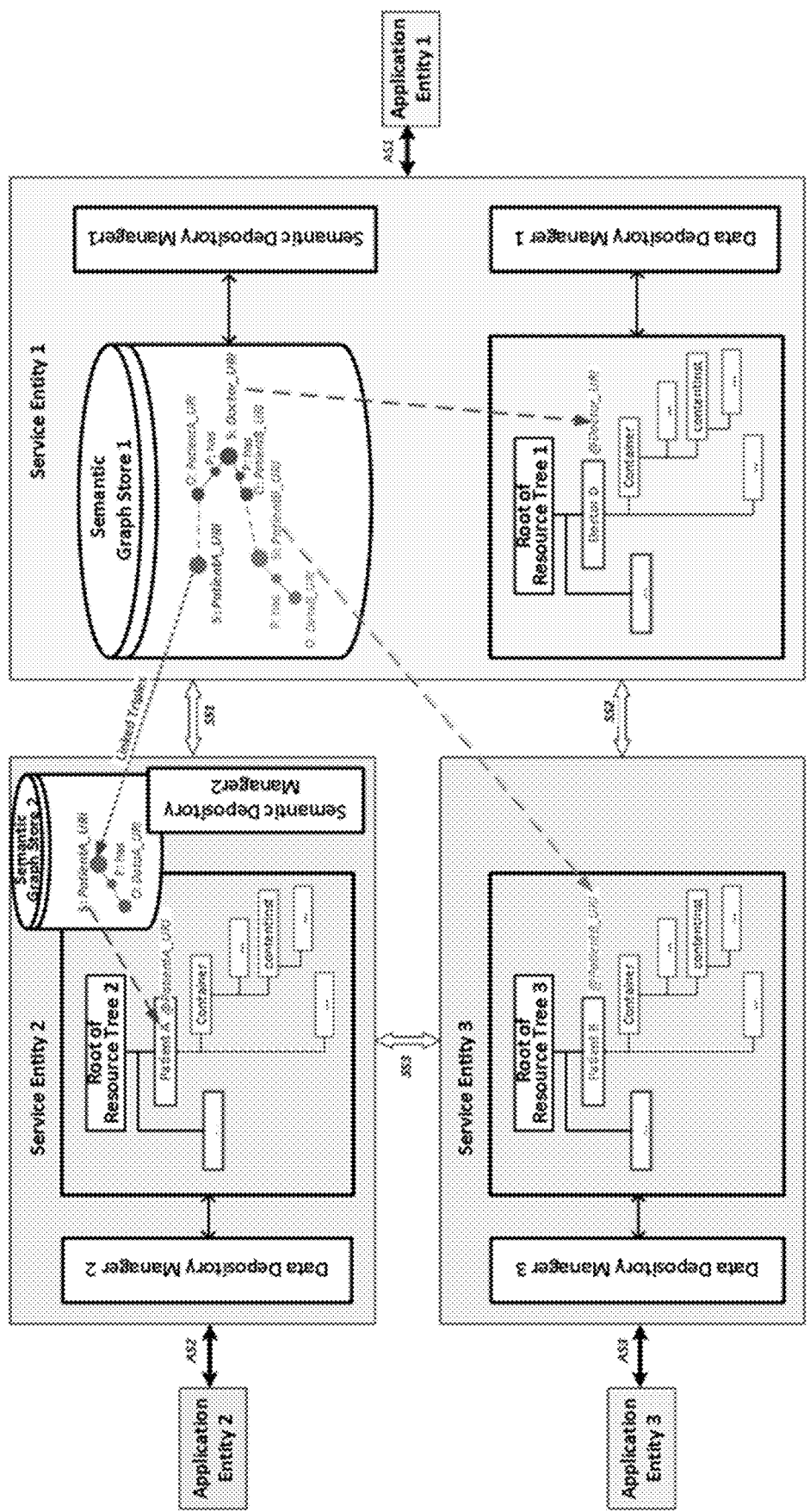
FIG. 14B illustrates an exemplary Architecture for Semantic Descriptors in Multiple Semantic Graph Stores.

Another architecture with multiple centralized semantic graph stores in an IoT system is exampled in FIG. 14B. In this architecture, semantic graph store 1 is located at SE1 and semantic graph store 2 is located at SE2. The operations between semantic graph store 1 and semantic graph store 2 may be conducted at the interface SS1, e.g., Mcc/Mcc' interface in oneM2M, via the commands for CREATE, RETRIEVE, UPDATE, DELETE, etc.

Figure 15:
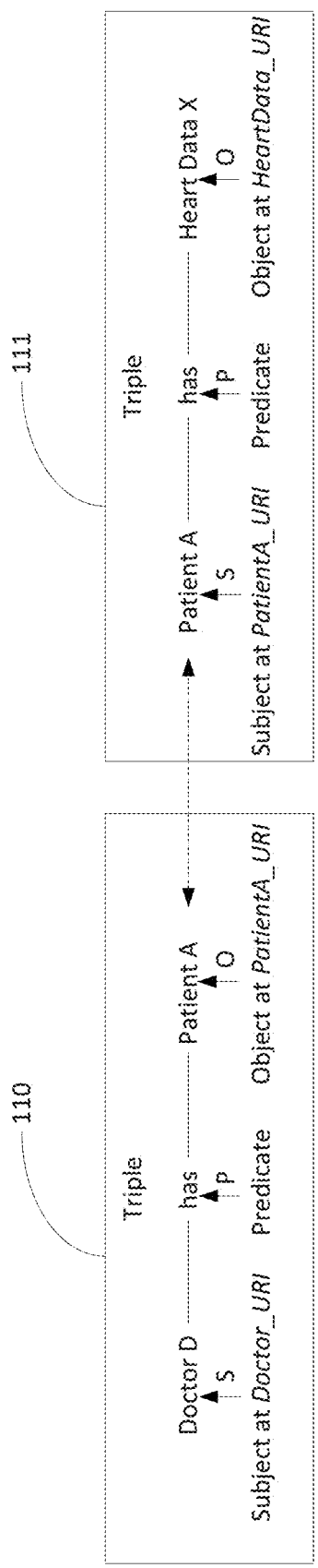
FIG. 15 illustrates an exemplary link between two semantic triples.

As exampled in FIG. 14A, triples are connected or linked in a Semantic Graph Store. For example, as shown in FIG. 15, the Triple 1 "Doctor D has Patient A" is linked with Triple 2 "Patient A has Heart Data X" via PatientA_URI.

The resource such as <Doctor D> is stored at Doctor URI in Resource Tree 1 and resources such as <Patient A> and <Heart-Data X> (not shown in FIG. 14A) are stored at PatientA_URI and HeartData_URI (not shown in FIG. 14A) respectively in Resource Tree 2.

The Doctor-D's eHealth Application (e.g., Application Entity 1) may communicate with Service Entity 1 via interface AS1 for RESFTful operations over his or his patients' resources (if permission is granted) in Resource Tree 1 at Service Entity 1 via interface AS1, Resource Tree 2 at Service Entity 2 through Service Entity 1 via interface SS1, and Resource Tree 3 at Service Entity 3 through Service Entity 1 via interface SS2 respectively. The Doctor-D's eHealth Application may also apply RESTful operations over his or his patients' Semantic Triples (if permission is granted) in Semantic Graph Store at Service Entity 1 via interface AS1.

The Patient-A's Heart Monitor eHealth Application (e.g., Application Entity 2) may communicate with Service Entity 2 via interface AS2 for RESFTful operations over his or the Doctor-D's resources (if permission is granted) in Resource Tree 2 at Service Entity 2 via interface AS2 and Resource Tree 1 at Service Entity 1 through Service Entity 2 via interface SS1 respectively. The Patient-A's Heart Monitor eHealth Application may also apply RESTful operations over his or the Doctor-D's Semantic Triples (if permission is granted) in Semantic Graph Store at Service Entity 1 through Service Entity 2 via interface SS1.

Figure 51A:
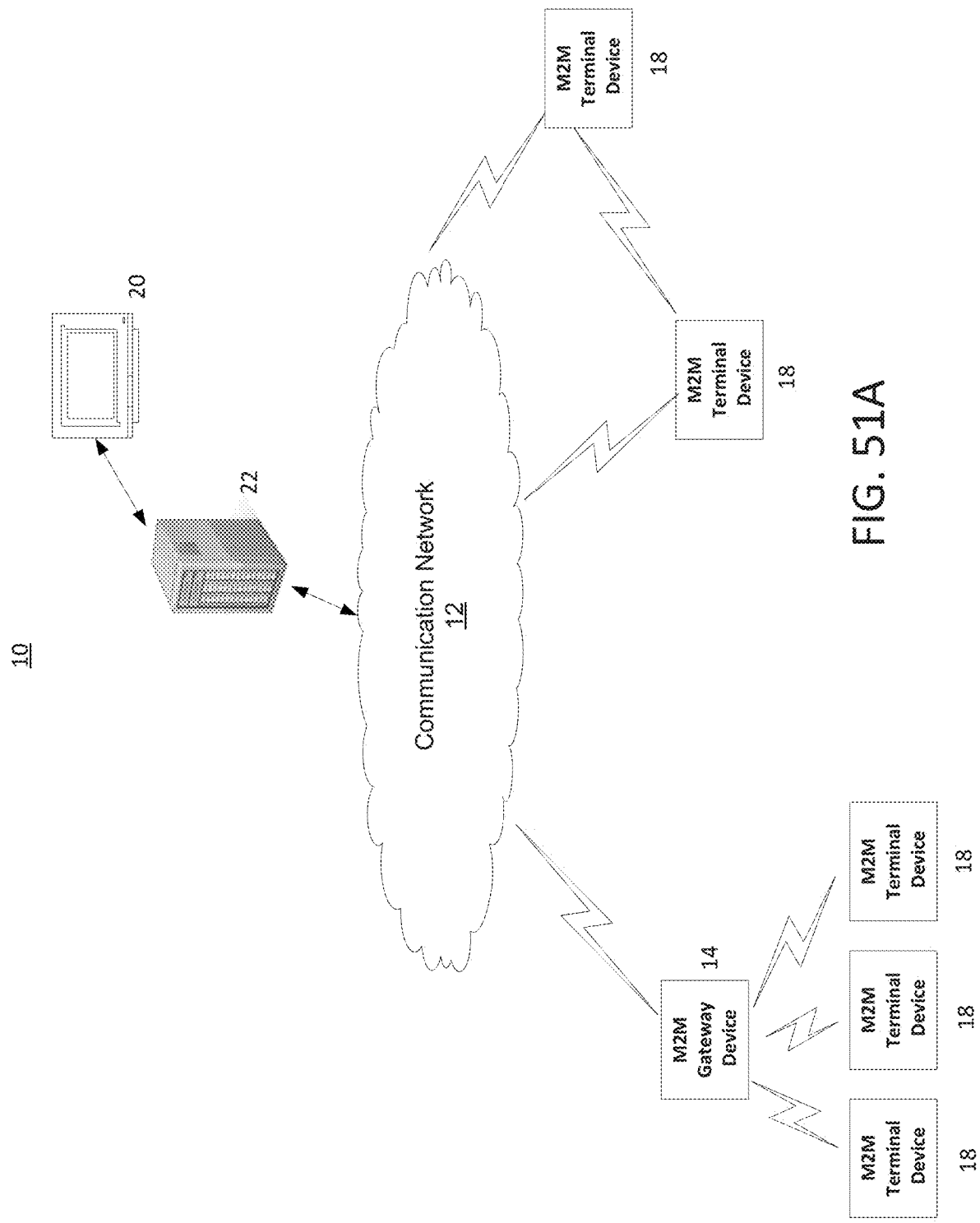
FIG. 51A is a system diagram of an example machine-to-machine (M2M) or Internet of Things (IoT) communication system in which the disclosed subject matter may be implemented.
Figure 51B:
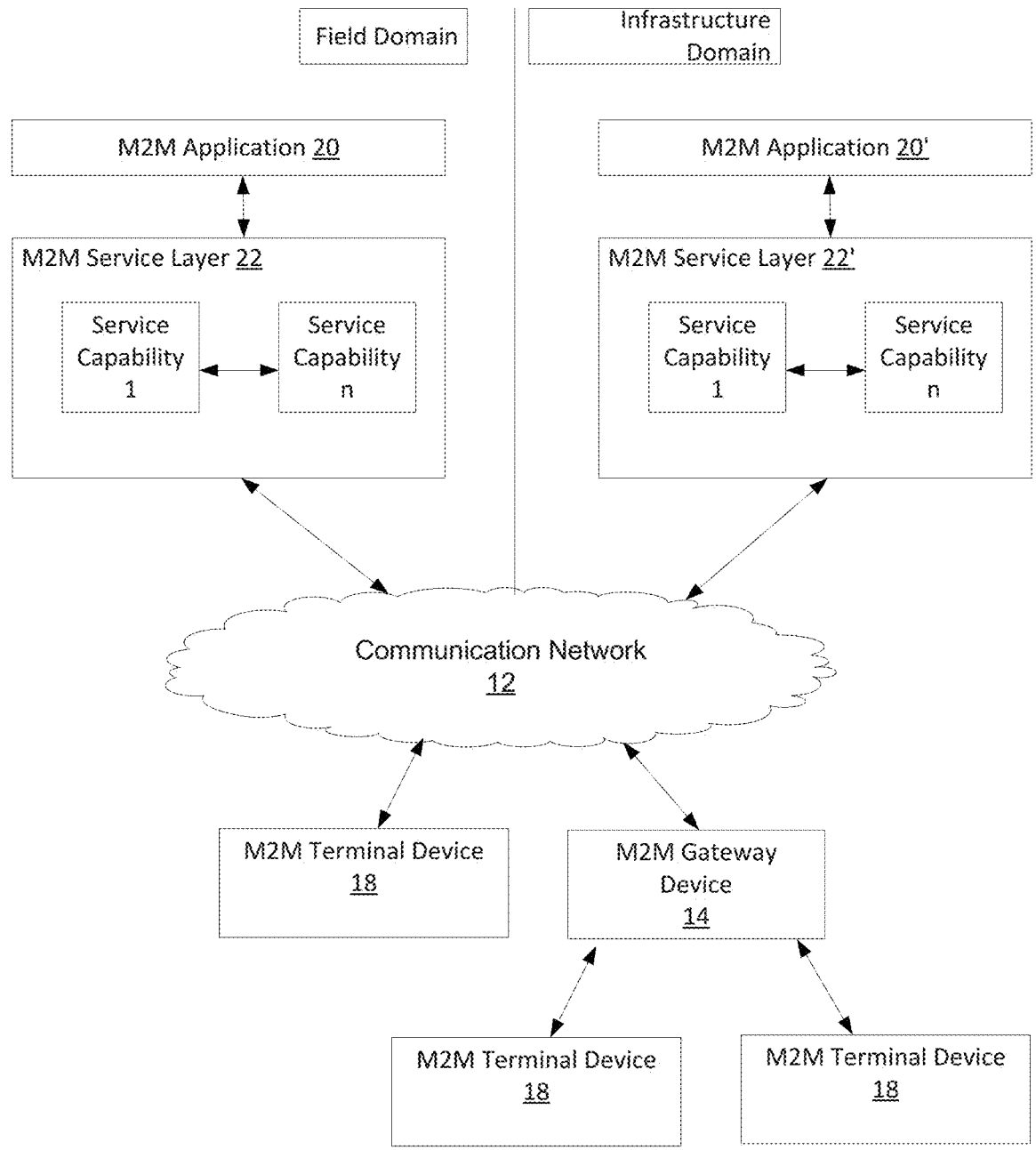
FIG. 51B is a system diagram of an example architecture that may be used within the M2M/IoT communications system illustrated in FIG. 51A.
Figure 51C:
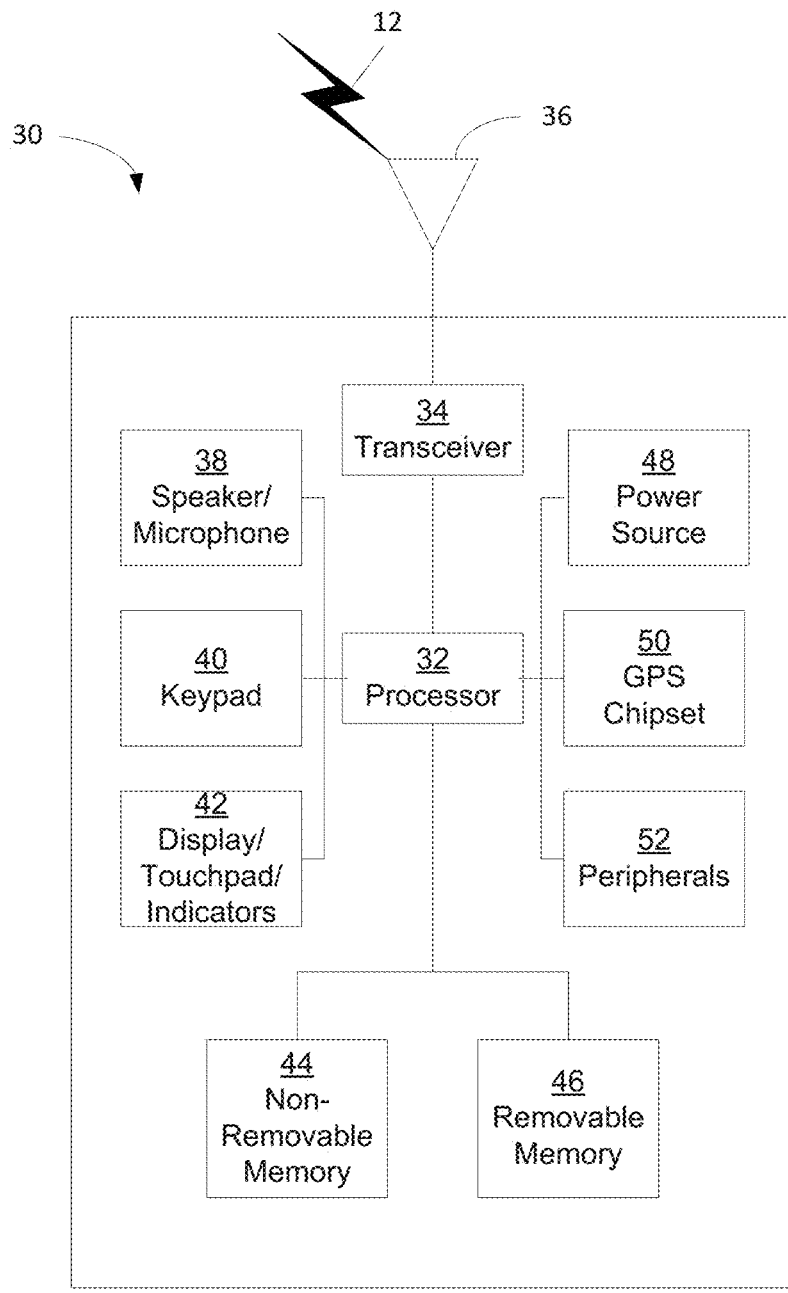
FIG. 51C is a system diagram of an example M2M/IoT terminal or gateway device that may be used within the communications system illustrated in FIG. 51A.
Figure 51D:
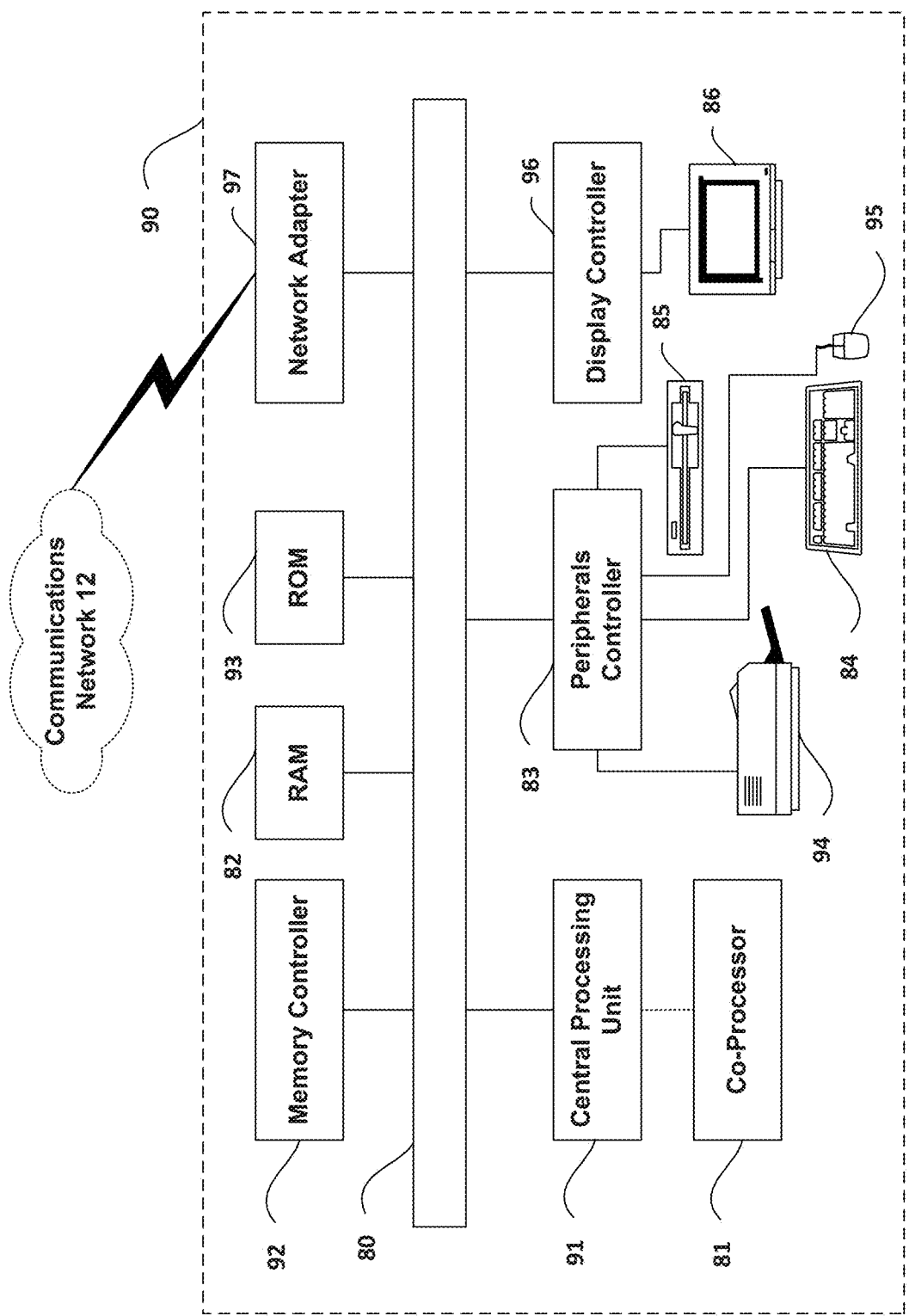
FIG. 51D is a block diagram of an example computing system in which aspects of the communication system of FIG. 51A may be embodied.

It is understood that the entities performing the steps illustrated in FIG. 16-FIG. 21 and the like FIG.s are logical entities that may be implemented in the form of software (e.g., computer-executable instructions) stored in a memory of, and executing on a processor of, a device, server, or computer system such as those illustrated in FIG. 51C or FIG. 51D. That is, the method(s) illustrated in FIG. 16-FIG. 22, FIG. 27-FIG. 30, FIG. 45-FIG. 49, and the like FIG.s may be implemented in the form of software (e.g., computer-executable instructions) stored in a memory of a computing device, such as the device or computer system illustrated in FIG. 51C or FIG. 51D, which computer executable instructions, when executed by a processor of the computing device, perform the steps illustrated in FIG. 16-FIG. 22, FIG. 27-FIG. 30, FIG. 45-FIG. 49, and the like FIGs. In an example, with further detail below with regard to the interaction of M2M devices, AE 373 of FIG. 29 may reside on M2M terminal device 18 of FIG. 51A, while SE 361 of FIG. 29 may reside on M2M gateway device 14 of FIG. 51A.

Figure 16:
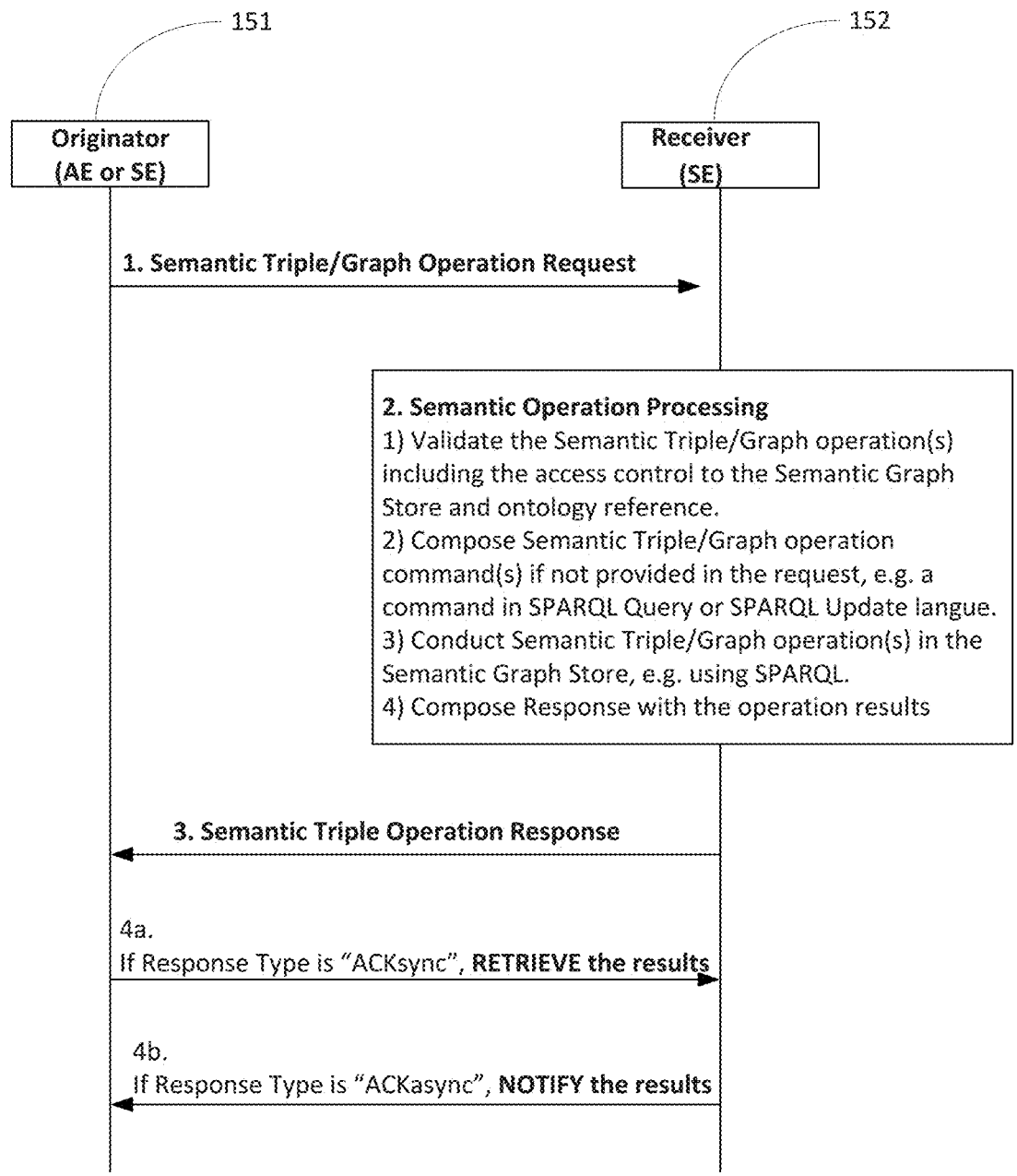
FIG. 16 illustrates an exemplary General Operation Flow for Centralized Semantic Graph Store.
Figure 17:
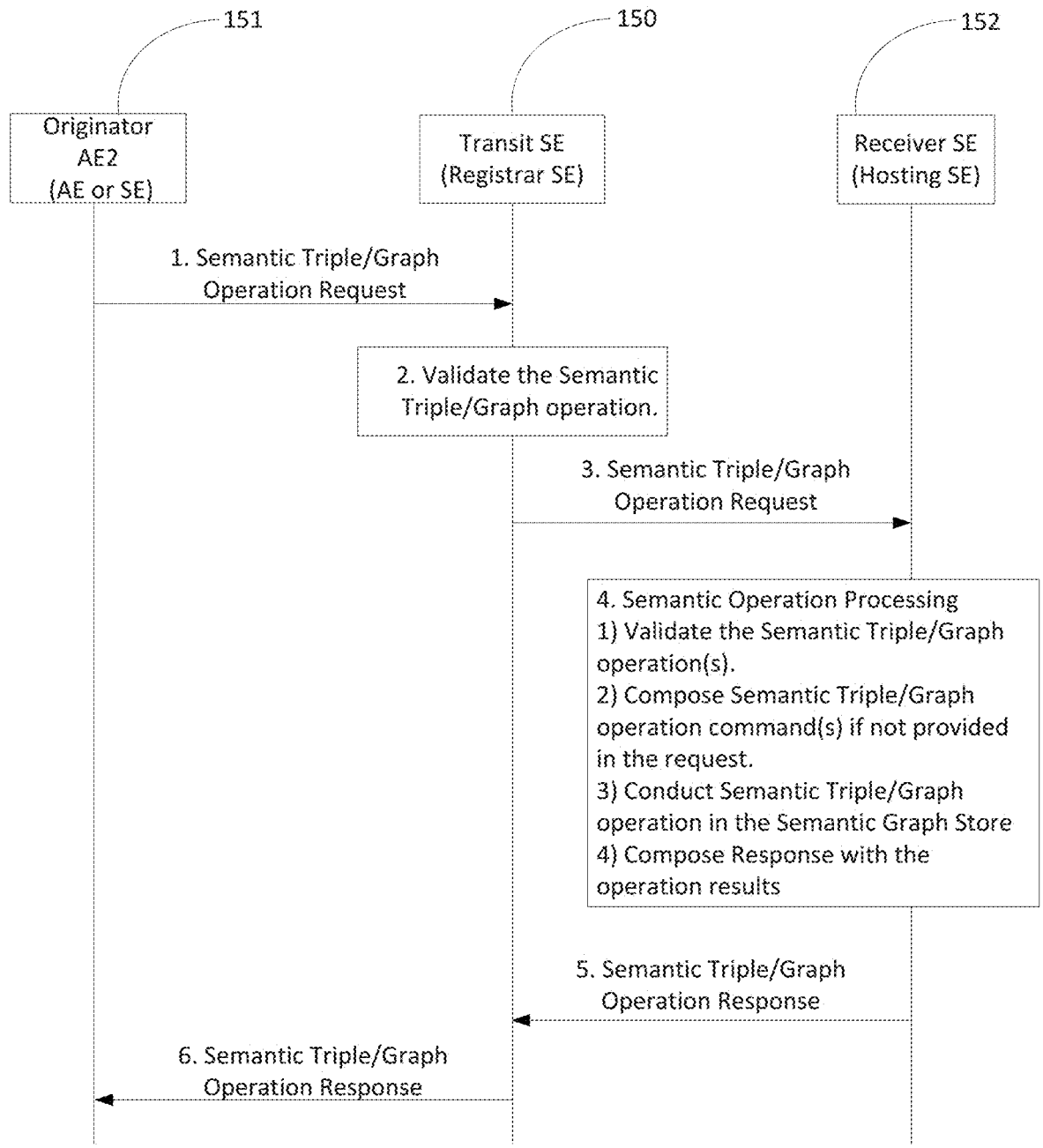
FIG. 17 illustrates an exemplary General Operation Flow for Centralized Semantic Graph Store with Transit SE.

FIG. 16 illustrate an exemplary general RESTful semantic triple operation flow for architecture illustrated in FIG. 14A (e.g., the Doctor-D's eHealth Application AE1 requests semantic triple or graph operations to the triples in semantic graph store). FIG. 17 illustrate an exemplary General RESTful semantic triple operation flow for architecture illustrated in FIG. 14A (e.g., the Patient-A's Heart Monitor eHealth Application AE2 requests semantic triple or graph operations to the triples in semantic graph store). FIG. 16 and FIG. 17 may be based on the RESTful request and response messages between AE and SE via AS interface (e.g., the Mca interface in oneM2M) or between SEs via SS interface (e.g., the Mcc or Mcc' interface in oneM2M). The example mechanisms described herein are also applicable to the semantic graph operations for the architecture illustrated in FIG. 14B, such as graph operations between semantic graph store 1 at SE1 and semantic graph store 2 at SE2. The request message may contain mandatory, operation dependent or optional parameters based on different semantic triple or graph operations. The request message may contain the following parameters, which are examples and are not necessarily option, mandatory, or the like. It is implementation dependent.

With continued reference to the general RESTful semantic triple operation flows (e.g., FIG. 16 and FIG. 17), a first set of parameters may include the following associated with an attempt at resource discovery. A "To" field may include an address or ID of the <SemanticGraphStore> resource. <SemanticGraphStore> resource may be known by pre-provisioning or by resource discovery. A "From" field may include ID of originator 151 (e.g., the AE ID or SE ID). This may be used by receiver 152 (e.g., SE) to check the originator's access privilege for Semantic Triple operations in the Semantic Graph Store. An operation field may include the operation to be conducted, such as CREATE (C), RETRIEVE (R), UPDATE (U), DELETE (D) etc. An operation type may include values that may be "resource" for resource operations in resource tree, "triple" for triple operations in a semantic graph store, and/or "graph" for graph operations in a semantic graph Store. The default is "resource." Many of the examples given herein are with regard to triple and graph operation. A request identifier may include the request identifier to be used for correlating between request and response.

With continued reference to the general RESTful semantic triple operation flows (e.g., FIG. 16 and FIG. 17), a second set of parameters may be considered operation dependent parameters for triple or graph operations. There may be content and content format as discussed in more detailed below. Content may include semantic content (e.g., triples or graph) to be transferred, which may be presented differently in view of the semantic triple or graph operations. In an example, with regard to CREATE, content may be the content of new semantic triple(s) with the <Operation Type> as "triple" or "graph". For example, a triple such as "Doctor-D URI has PatientA_URI." In an example, with regard to UPDATE, content may include the content to be replaced with existing semantic triple(s) or graph. For example, "Doctor-D_URI has PatientA_URI2" to replace "Doctor-D_URI has PatientA_URI1" for triple 110 shown in FIG. 15. The existing semantic triple or graph to be updated or replaced may be explicitly addressed by the <SemanticTripleGraphIDs> (e.g., a unique name for a graph) or inferred by the semantic query engine via using this new content to match the triples or graph relationship network in the semantic graph store. In an example, with regard to RETRIEVE, content may include the query semantic triple(s). For example, "?Doctor has Patient-A" (?Doctor is a variable for query) is for querying Patient-A's doctors. In an example, with regard to DELETE, content may include the content of existing semantic triple(s) or graph to be deleted. The existing semantic triple(s) or graph may be explicitly addressed by the <SemanticTripleGraphIDs> (e.g., a unique name for a graph) for deleting or inferred by the semantic query engine by using this content to match the triples or graph in the semantic graph store.

With reference to content format as mentioned above, content format may be considered the format of semantic triple or graph operation content, such as N-Triple, JSON, RDF/XML or Turtle for triples; SPARQL or SQL for query; or other structured text or literal.

With continued reference to the general RESTful semantic triple operation flows (e.g., FIG. 16 and FIG. 17), a third set of parameters may be considered. There may be a creator parameter, wherein it indicates the creator of semantic content to be transferred, e.g., AE ID or SE ID. There may be a Semantic Triple Graph IDs parameter, wherein it may be created by receiver 152 if not presented by originator 151 or conflicting with existing triples in the semantic graph store. Semantic Triple Graph IDs parameter is an ID of the semantic triple graph and may be absolute or relative but unique in the semantic graph store. There may be a Access Control Policy IDs parameter, wherein receiver 152 may create based on the ID of originator 151 and service profile if not presented by originator 151. This parameter may be used by receiver 152 to check the access control privileges of originator and validate the operation accordingly. There may be an Ontology Ref parameter, wherein receiver 152 may create the <OntologyRef> based on ID of originator 151 and service profile, if not presented by the originator 152.

With continued reference to the third set of parameters, there may be a response message type parameter, result content parameter, or filter criteria parameter. Response message type parameter may indicate what type of response may be sent to the issued request and when the response may be sent to originator 151. Different response type may be requested by originator 151 based on the communication, triple operation latency, the system capability, current processing, or loading status, among other things. Response message types may include the following: ACK sync, ACK async, NoACK sync, or ACKnoACK, among other things. For ACK sync, after acceptance, receiver 152 may respond with an acknowledgement confirming that receiver 152 will further process the request. The success or failure of the execution of the requested operation is to be conveyed later. For ACK async {list of notification targets}, after acceptance, receiver 152 may respond with an acknowledgement confirming that receiver will further process the request. The result of the requested operation should be sent as notification(s) to the notification target(s). The notification target(s) may be provided within this parameter as a list of entities or to originator 151 when no notification target list is provided. When an empty notification target list is provided by originator 151, no notification with the result of the requested operation may be sent at all. For NoACK sync, after acceptance, receiver 152 may respond with the result of the requested operation after completion of the requested operation. This may be the default behavior when the response type parameter is not given the request. For ACKnoACK {list of notification targets}, after acceptance, receiver 152 may decide how to respond based on its status or other service policies—either with ACK or NoACK described above.

There may be a result content parameter, wherein result content indicates the expected components of the result of the requested operation. Semantic Triple Graph IDs: <SemanticTripleGraphIDs> of the request semantic triples. Semantic Triples or Graph is representation of the requested semantic triple(s) or graph returned as content. Semantic Triple Node may be URIs, bank node labels, or "literal" for a triple node of the request semantic triples. This may be indicated by <URIType> if URI is returned. URI Type indicates absolute or relative URI. If relative URI is used, the <NameSpace> or ontology reference may be included in the relative URI. True/False: Boolean logic results of the requested operation, e.g., for SPARQL Query "ASK" operation.

There may be a filter criteria parameter, which indicates filter criteria for filtered semantic triple or graph operations in the semantic graph store. An example of filtering for SPARQL query is shown below.

```
PREFIX rdfs: <http://www.w3.org/2000/01/rdf-schema#>
PREFIX type: <http://dbpedia.org/class/yago/>
PREFIX prop: <http://dbpedia.org/property/>
SELECT ?country_name ?population
WHERE {
    ?country a type:LandlockedCountries ;
             rdfs:label ?country_name ;
             prop:populationEstimate ?population .
    FILTER (?population > 15000000) .
}
```

SPARQL built-in filter functions are listed below.
Logical: !, &&, ||
Math: +, −, *, /
Comparison: =, !=, >, <, . . .
SPARQL tests: isURI, isBlank, isLiteral, bound
SPARQL accessors: str, lang, datatype
Other: sameTerm, langMatches, regex A response message may contain all types of parameters based on different semantic triple operations. The parameters may be provided in different ways, but below are examples. Depending on implementation some parameters may or may not be optional or considered mandatory. Exemplary parameters are below. A first set of parameters may include response status or request identifier. Response status may indicate that a result of the requested operation is successful, unsuccessful, acknowledgement (e.g., the result to be conveyed later) or status of processing such as authorization timeout, etc. The request identifier (ID) parameter may identify the corresponding request.

A second set of parameters, which may be considered operation dependent, may include the following examples: content or content status. Content may include response content such as if response status is successful then: 1) CREATE—Content is the <SemanticTripleGraphIDs> in the Semantic Graph Store; 2) UPDATE—Content is the semantic triples or graph replaced in the semantic graph store; 3) DELETE—Content is the semantic triples or Graph deleted; or 4) RETRIEVE—Content is the semantic query results which may contain <SemanticTripleGraphIDs>, <SemanticTriples/Graph>, <SemanticTripleNodes>, or <True/False> Boolean logic results, as indicated by <ResultContent> in the request message. If response status is unsuccessful then the content parameter in a response may include error information. If response status is acknowledgment then the content parameter may contain the <SemanticTripleGraphIDs> if the <ResponseType> is ACK based as specified in the request. The content status parameter may indicate in the response to a retrieve operation when a semantic query returned content is partial if a response status is successful.

A third set of parameters may be the following examples: "To" or "From". The "to" parameter may indicate the address or ID of originator 151 or the transit SE 150. The "from" parameter may indicate the ID of receiver 152.

Figure 18:
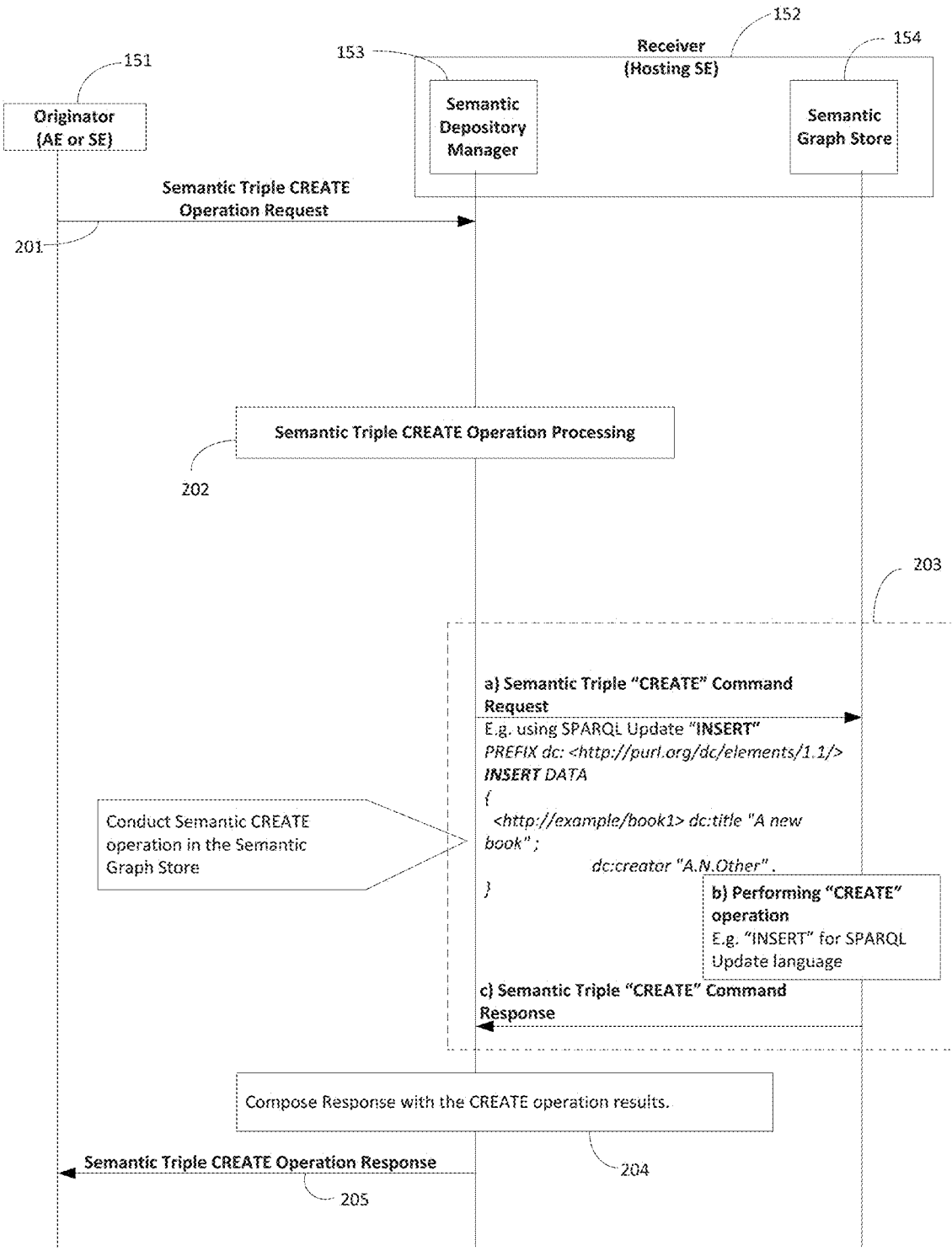
FIG. 18 illustrates an exemplary Operation Flow for CREATE Semantic Triples.
Figure 19:
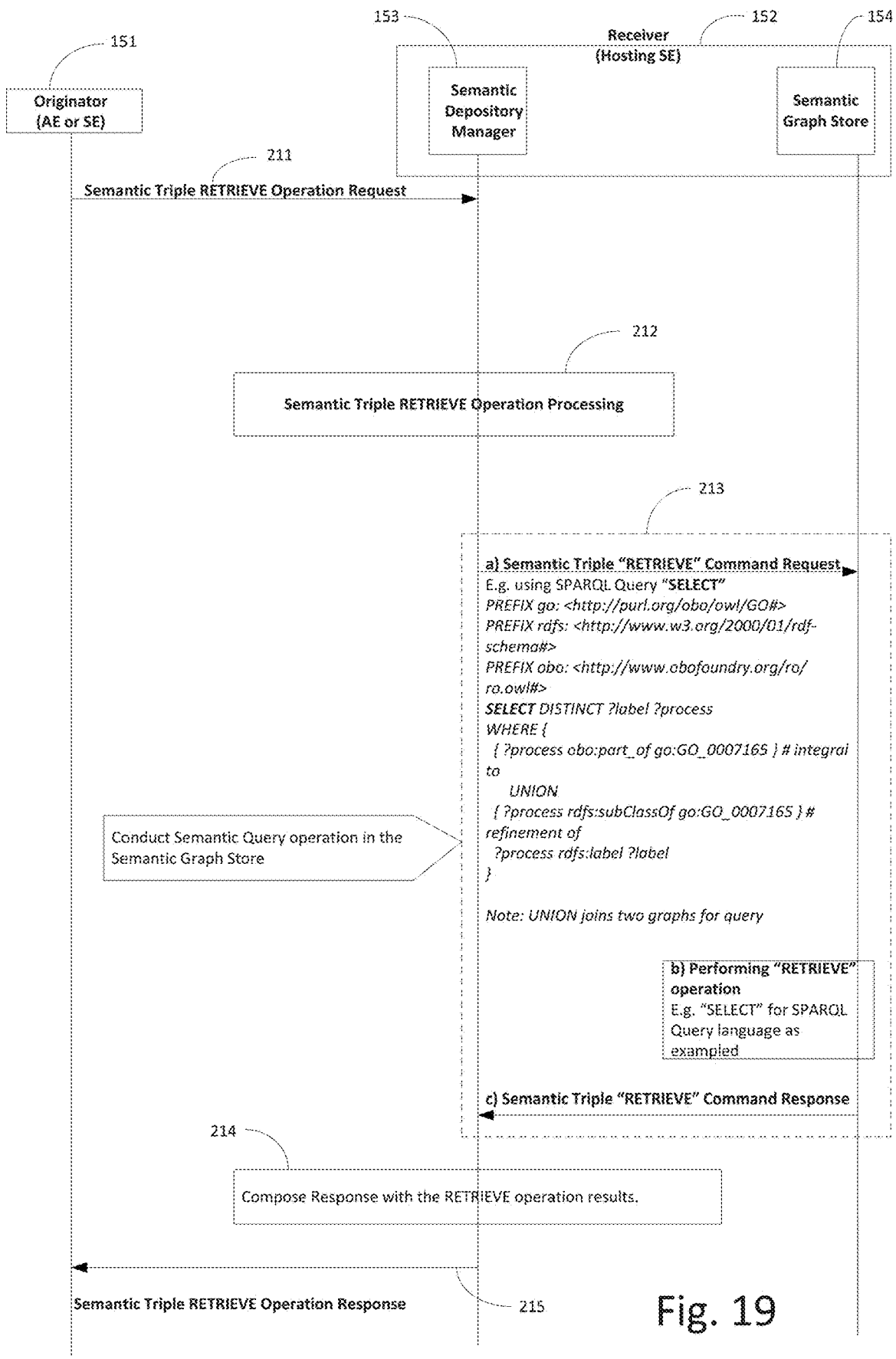
FIG. 19 illustrates an exemplary Operation Flow for RETRIEVE Semantic Triples—Semantic Query.
Figure 20:
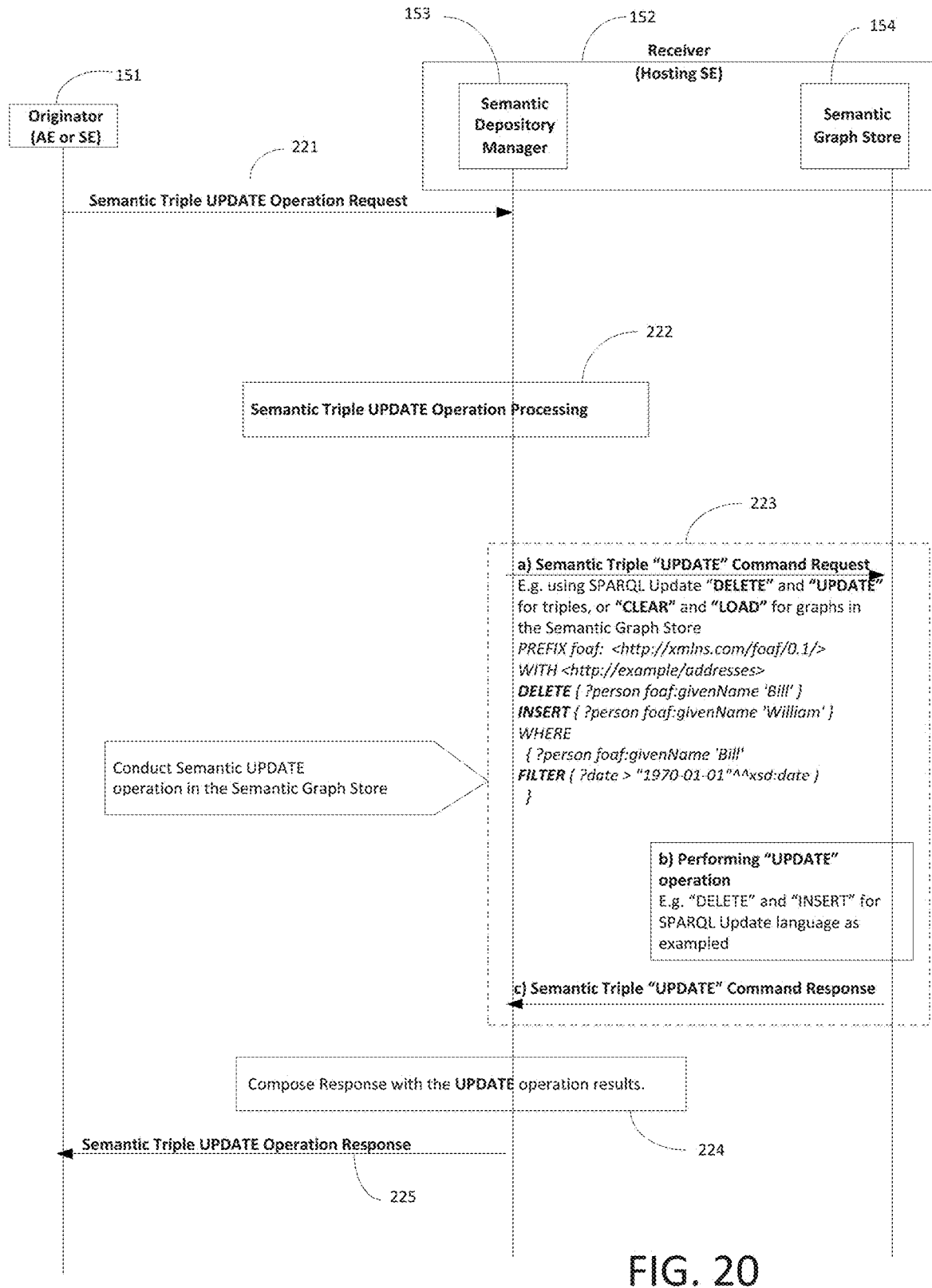
FIG. 20 illustrates an exemplary Operation Flow for UPDATE Semantic Triples.
Figure 21:
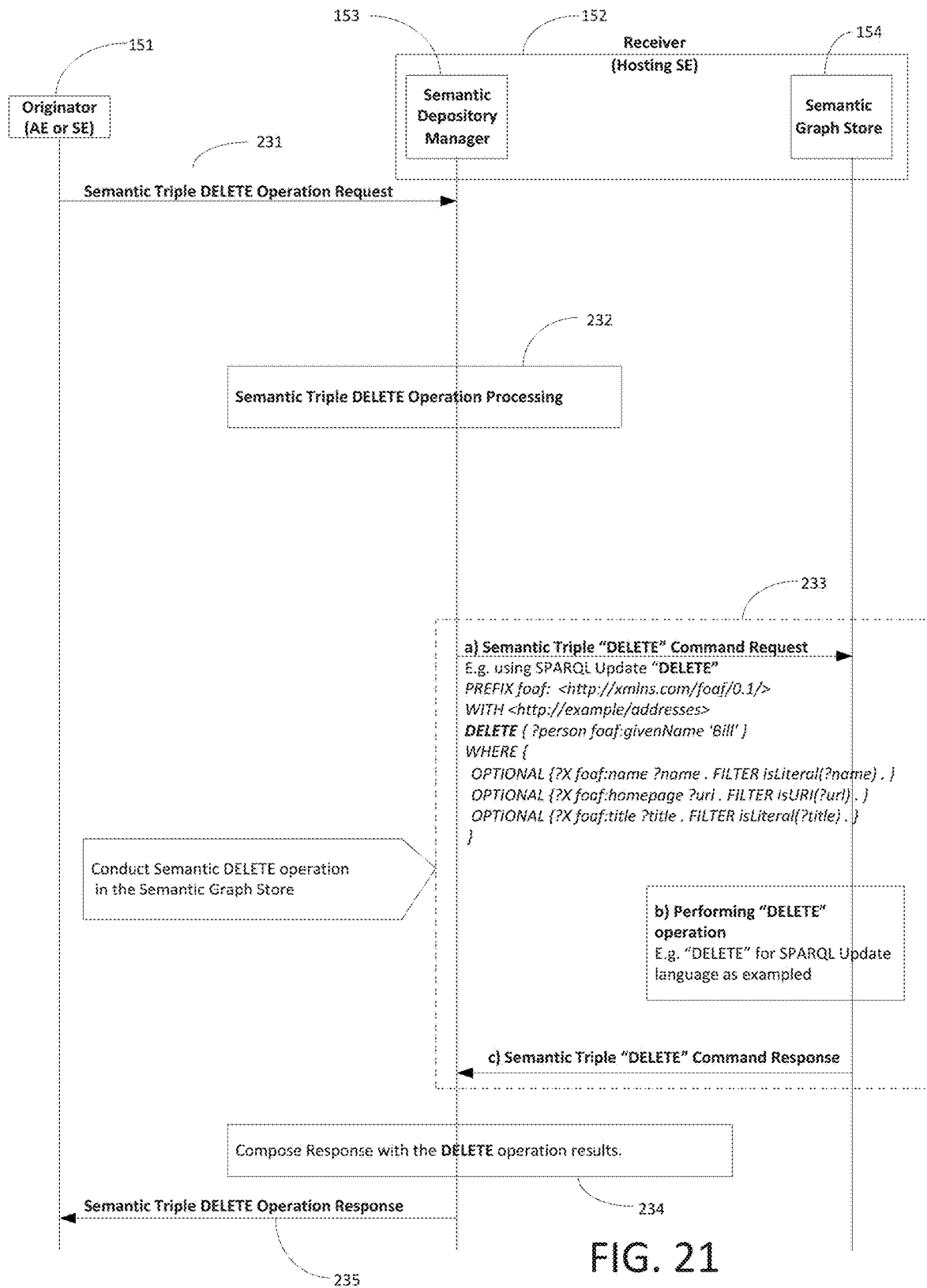
FIG. 21 illustrates an exemplary Operation Flow for DELETE Semantic Triples.

Some additional details of some of the aforementioned operations are illustrated with "triple" in the following figures. FIG. 18 provides operation flow for CREATE semantic triples. FIG. 19 provides operation flow for RETRIEVE semantic triples—semantic query. FIG. 20 provides operation flow for UPDATE semantic triples. FIG. 21 provides operation flow for DELETE semantic triples.

The mechanisms detailed in FIG. 18 thru FIG. 21 are also applicable to semantic graph operations for a semantic graph store or between semantic graph stores. FIG. 18 illustrates an exemplary operation flow for CREATE semantic triples. At step 201, a semantic triple CREATE operation request is sent. The request of step 201 may include 1) To: SemanticGraphStore and From: Originator ID (e.g., AE ID or SE ID); 2) Operation: CREATE; 3) Parameters: RequestID, ContentFormat (e.g., RDF XML), AccessControlPolicyIDs, OntologyRef, Creator, ResponseType, ResultContent (is SemanticTripleIDs); and 4) Content: SemanticTriples.

With continued reference to FIG. 18, at step 202, semantic triple CREATE operation processing occurs at receiver 152, for example. There may be a validation of the Semantic Triple CREATE operation in Semantic Graph Store 154. The validation may include the following. A determination if originator 151 has the privileges to CREATE the targeted Semantic Triples specified by <AccessControlPolicyIDs> or create & assign an <AccessControlPolicyIDs> based on <ServiceSubscriptionPolicy> and other service policies if <AccessControlPolicyIDs> do not exist. There may also be validating of <ontologyRef> and assigning of an <ontologyRef> if it is not provided by originator 151. In addition, if provided by originator 151 in the CREATE Request of step 201, it may be verified that <SemanticTripleIDs> does not already exist in the Semantic Graph Store 154. If not, then the <SemanticTripleIDs> suggested by originator 151 may be used, otherwise a unique <SemanticTripleIDs> is used with the Semantic Triples to be created. Also, "AccessControlTriples" (e.g., Access Control Rule Tuple defining Who-What-How) may be associated with the Semantic Triples to be created based on the Access Control Policy Rules specified by <privileges> under <AccessControlPolicy> which is identified by <AccessControlPolicyIDs>. If a <creator> is included in the request of step 201, the "CreatorTriple" may be associated with the Semantic Triples to be created. Lastly, upon successful validation of the CREATE request of step 201, create the semantic triple CREATE operation command if not provided in the request of step 201. For example, in SPARQL Update language to "insert" triples or "add" graph in Semantic Graph Store 154.

With continued reference to FIG. 18, at step 203, there is a semantic CREATE operation in Semantic Graph store 154 conducted. An example is shown in FIG. 18. It is possible via SPARQL 1.1 Update, for example, to provide these graph management operations which may be used for mapping the CREATE operation also: 1) CREATE: creates a new graph in stores that support empty graphs; 2) COPY: modifies a graph to contain a copy of another; 3) MOVE: moves all of the data from one graph into another; or 4) ADD: reproduces all data from one graph into another. At step 204, compose response with the CREATE operation results. At step 205, there is a semantic triple CREATE operation response. The response may include 1) To: Originator ID (e.g., AE ID or SE ID) and From: Receiver ID (e.g., SE ID); 2) Parameters: RequestStatus (is successful), RequestID; and 3) Content: SemanticTripleIDs (if ResponseType is NoACKsync).

FIG. 19 illustrates an exemplary Operation Flow for RETRIEVE Semantic Triples—Semantic Query. At step 211, semantic triple RETRIEVE operation request is sent. The request of step 211 may include 1) To: SemanticGraphStore and From: Originator ID (e.g., AE ID or SE ID); 2) Operation: RETRIEVE; 3) Parameters: RequestID, ContentFormat (e.g., SPARQL), FilterCriteria or ResultContent; and 4) Content: SemanticTriples.

With continued reference to FIG. 19, at step 212, semantic triple RETRIEVE operation processing occurs at receiver 152, for example. There may be a validation of the Semantic Triple RETRIEVE operation in Semantic Graph Store 154. The validation may include the following. A determination if the originator 151 (using AE ID or SE ID) has the privileges to RETRIEVE the Semantic Triples or other info specified by its Query Semantic Triples based on the <AccessControlPolicy> associated with the triples. The <ontologyRef> may also be validated, if needed. In addition, there may be a determination if the FilterCriteria are valid. Lastly, on successful validation of the RETRIEVE request of step 211, the semantic query command may be created. For example, in SPARQL Query language "SELECT" for a table of result values, "CONSTRUCT" for an RDF graph, "ASK" for "True/False" Boolean result, or "DESCRIBE" for whatever the Semantic Graph Store 154 returns.

With continued reference to FIG. 19, at step 213, there is a semantic query operation in Semantic Graph store 154 conducted. An example is shown in FIG. 19. At step 214, compose response with the RETRIEVE operation results. At step 215, there is a semantic triple RETRIEVE operation response. The response may include 1) To: Originator ID (e.g., AE ID or SE ID) and From: Receiver ID (e.g., SE ID); 2) Parameters: RequestStatus (is successful), RequestID; and 3) Content: SemanticTriples (if ResponseType is NoACKsync).

FIG. 20 illustrates an exemplary Operation Flow for UPDATE Semantic Triples. At step 221, semantic triple UPDATE operation request is sent. The request of step 221 may include 1) To: SemanticGraphStore and From: Originator ID (e.g., AE ID or SE ID); 2) Operation: UPDATE; 3) Parameters: RequestID, SemanticTripleIDs, ContentFormat (e.g., RDF XML), FilterCriteria, ResultantContent; and 4) Content: SemanticTriples.

With continued reference to FIG. 20, at step 222, semantic triple UPDATE operation processing occurs at receiver 152, for example. There may be a validation of the Semantic Triple UPDATE operation in Semantic Graph Store 154. The validation may include the following. A determination if originator 151 has the privileges to UPDATE the targeted Semantic Triples specified by <AccessControlPolicy> associated with the triples. There may also be validating of <ontologyRef> and determination if the FilterCriteria are valid. Lastly, on successful validation of the UPDATE request of step 221, create the semantic triple UPDATE operation command if not provided in the UPDATE request of step 221. For example, in SPARQL Update language to "DELETE" and "INSERT" for updating a triple.

With continued reference to FIG. 20, at step 223, there is a semantic UPDATE operation in Semantic Graph store 154 conducted. It is possible via SPARQL 1.1 Update, for example, to provide these graph management operations which may be used for mapping the UPDATE operation, also: 1) CREATE: creates a new graph in stores that support empty graphs; 2) COPY: modifies a graph to contain a copy of another; 3) MOVE: moves all of the data from one graph into another; 4) ADD: reproduces all data from one graph into another; or 5) DROP: remove a graph and all of its contents. At step 224, compose response with the UPDATE operation results. At step 225, there is a semantic triple UPDATE operation response. The response may include 1) To: Originator ID (e.g., AE ID or SE ID) and From: Receiver ID (e.g., SE ID); 2) Parameters: RequestStatus (is successful), RequestID; and 3) Content: SemanticTriples (if ResponseType is NoACKsync).

FIG. 21 illustrates an exemplary Operation Flow for DELETE Semantic Triples. At step 231, semantic triple DELETE operation request is sent. The request of step 231 may include 1) To: SemanticGraphStore and From: Originator ID (e.g., AE ID or SE ID); 2) Operation: DELETE; 3) Parameters: RequestID, SemanticTripleIDs, ContentFormat (e.g., RDF XML), FilterCriteria, ResultantContent; and 4) Content: SemanticTriples.

With continued reference to FIG. 21, at step 232, semantic triple DELETE operation processing occurs at receiver 152, for example. There may be a validation of the Semantic Triple DELETE operation in semantic receiver 152 (e.g., Semantic Graph Store 154). The validation may include the following. A determination if the Originator 151 has the privileges to DELETE the targeted Semantic Triples specified by <AccessControlPolicy> associated with the triples. There may also be a determination if the FilterCriteria are valid. Lastly, on successful validation of the DELETE request of step 231, create the semantic triple DELETE operation command if not provided in the request of step 231. For example, in SPARQL Update language to "DELETE" and "CLEAR" for removing all triples in a specific graph.

With continued reference to FIG. 21, at step 233, there is a semantic DELETE operation in Semantic Graph store 154 conducted. It is possible via SPARQL 1.1 Update, for example, to provide these graph management operations which may be used for mapping the DELETE operation, also: 1) MOVE: moves all of the data from one graph into another; or 2) DROP: removes a graph and all of its contents. At step 234, compose response with the DELETE operation results. At step 235, there is a semantic triple DELETE operation response. The response may include 1) To: Originator ID (e.g., AE ID or SE ID) and From: Receiver ID (e.g., SE ID); 2) Parameters: RequestStatus (is successful), RequestID; and 3) Content: SemanticTriples (if ResponseType is NoACKsync).

Figures 49B, 49C:
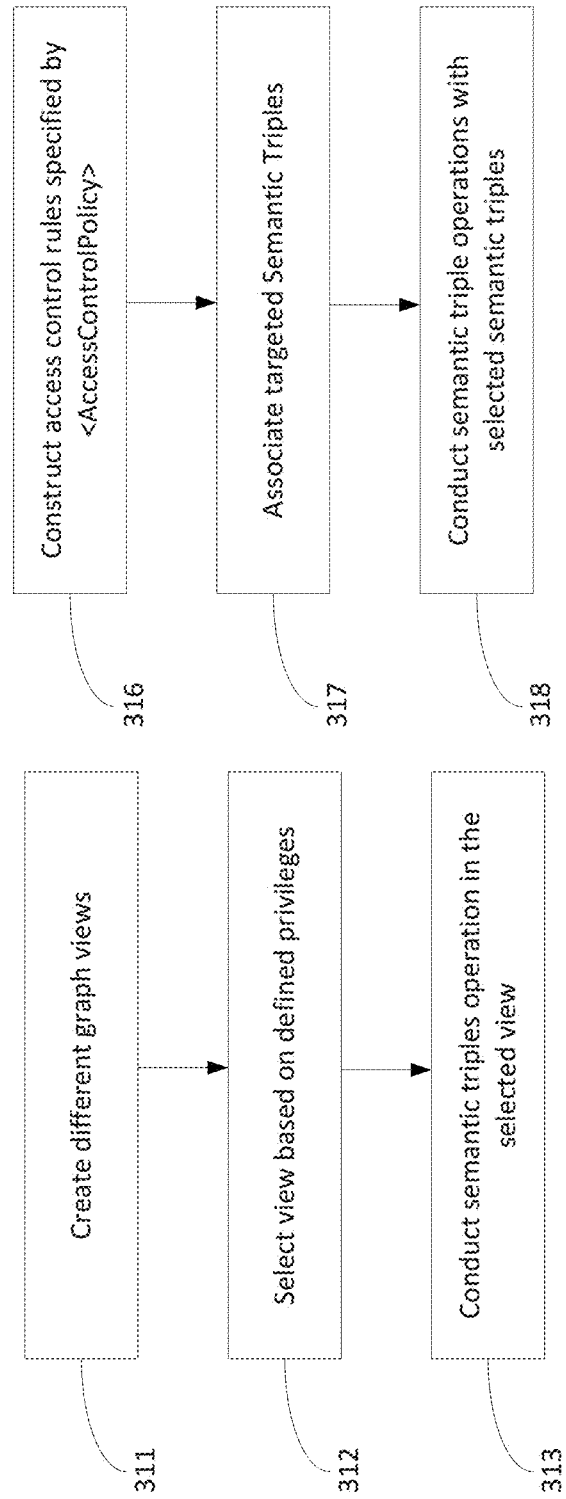
FIG. 49B illustrates exemplary method associated with a Semantic Graph Store.
FIG. 49C illustrates exemplary method for access control associated with Semantic Graph Store.

As discussed herein, <AccessControlPolicy> specified by <AccessControlPolicyIDs> may be used for access control in the semantic graph store based on methods such as access control with graph views or access control with <AccessControlTriples>. With reference to access control with graph views, a graph view of a semantic graph store (an example shown in FIG. 49A) is a constructed sub-graph over the base graph store, which may enhance usability of data by providing specifically configured access to data that is relevant to an application or enable access control to data by giving access to the data depending upon the access privileges granted. The graph view approach may include the following steps as shown in FIG. 49B. At step 311, different graph views (e.g., graph view 304 for patient-A, graph view 306 for patient-B, or graph view 308 for Doctor-D) may be created per each access control rule specified by the <AccessControlPolicy>. Graph view 304 may be patient-A's sub-graph with patient-A's accessible triples. Graph view 306 may be patient-B's sub-graph with patient-B's accessible triples. Graph view 308 may be Doctor-D's triples that are not accessible by patients. Circle 309 may be Doctor-D graph view (e.g., Doctor-D's sub-graph with Doctor'D's accessible triples which is a union of Doctor-D's triples, patient-A's triples, and patient-B's triples).

With continued reference to step 311, there are some multiple ways to create a graph view based on the access control policy. In a first way, a sub-graph of a graph view with sub-ontology reference model may be constructed. This sub-graph may be configured based on the access control policy and then semantic query may be conducted in the sub-graph. In a second way, a sub-graph for graph view by semantic query may be constructed as shown in the following example.

Graph view 304 (e.g., graph view of Patient-A):

```
CONSTRUCT {
    ?doctor_:takeCareOf ?patient
    ?doctor_:name ?name
    ?sample_:measureFor ?patient
    ?sample_:sValue ?sValue
    ?sample_:dValue ?dValue
    ?sample_:measuredOn ?date
}
WHERE {
    ?patient ex:name "Patient-A"
    ?patient ex:dateOfBirth "200-08-3" ^^xsd:date.
    ?doctor ex:takeCareOf ?patient
    ?doctor ex:name ?name
    ?sample ex:measureFor ?patient
    ?sample ex:sValue ?sValue
    ?sample ex:dValue ?dValue
    ?sample ex:measuredOn ?date }
```

With continued reference to FIG. 49B, at step 312, to each semantic triple operation request of an AE or a SE, the view may be selected based on the privileges of an originator defined by the <AccessControlPolicy> of targeted semantic triples. At step 313, semantic triple operations are conducted in the selected view which contains only those semantic triples from the semantic graph store that the originator has allowed for the requested semantic triple operation.

FIG. 49C illustrates summary of an exemplary method for <AccessControlPolicy> specified by <AccessControlPolicyIDs> used for access control in the semantic graph store based on access control with <AccessControlTriples>. At step 316, Access Control Rules specified by <AccessControlPolicy> in a semantic graph store may be constructed. At step 317, targeted SemanticTriples may be associated with their <AccessControlPolicyIDs> or <AccessControlPolicy> with related Access Control Rules. At step 318, semantic triple operations may be conducted with the selected semantic triples associated with the Access Control Rules that allow the originator to operate.

Figure 22:
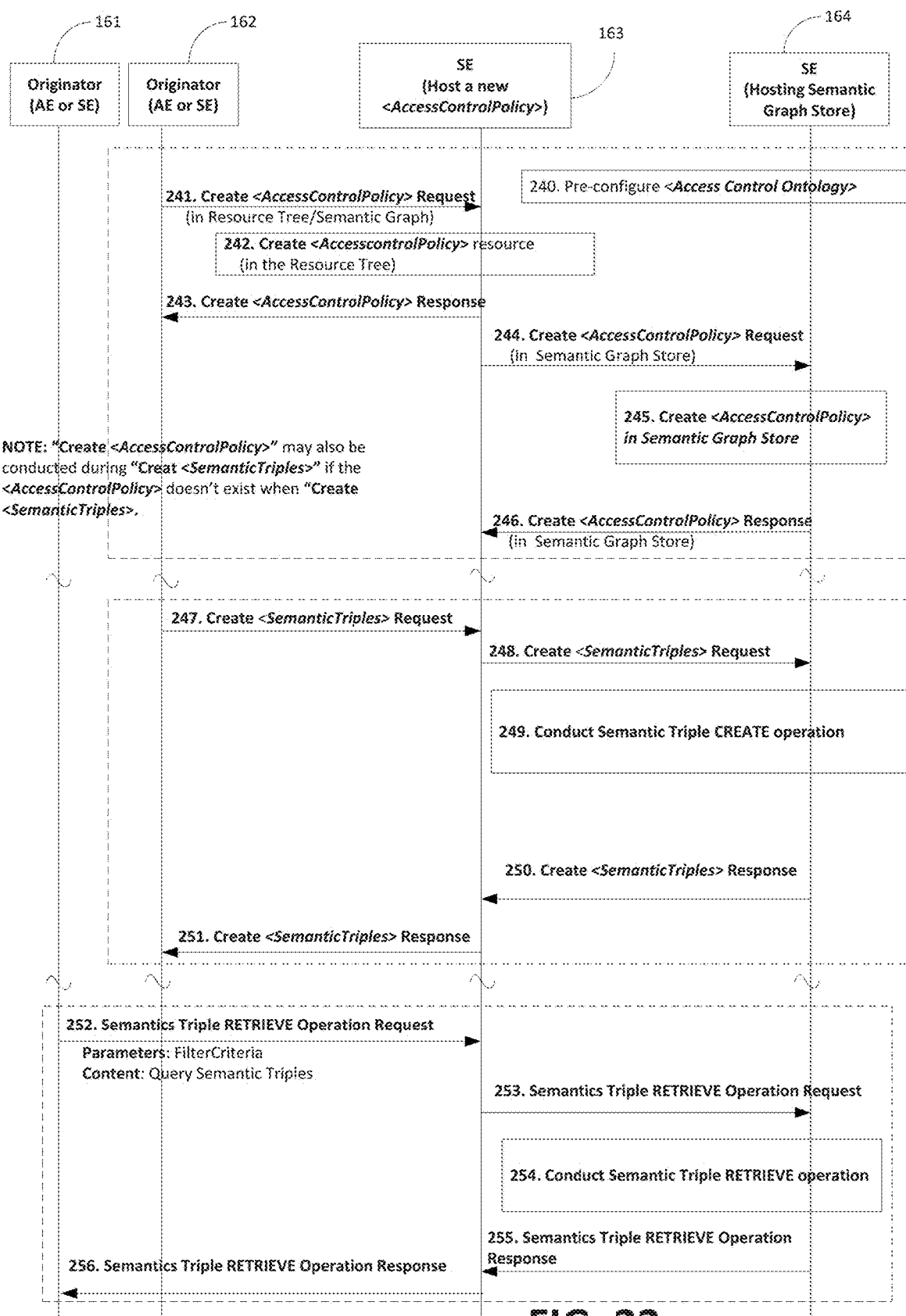
FIG. 22 illustrates an example Using <AccessControlTriples> for Access Control in a Semantic Graph Store.
Figure 52:
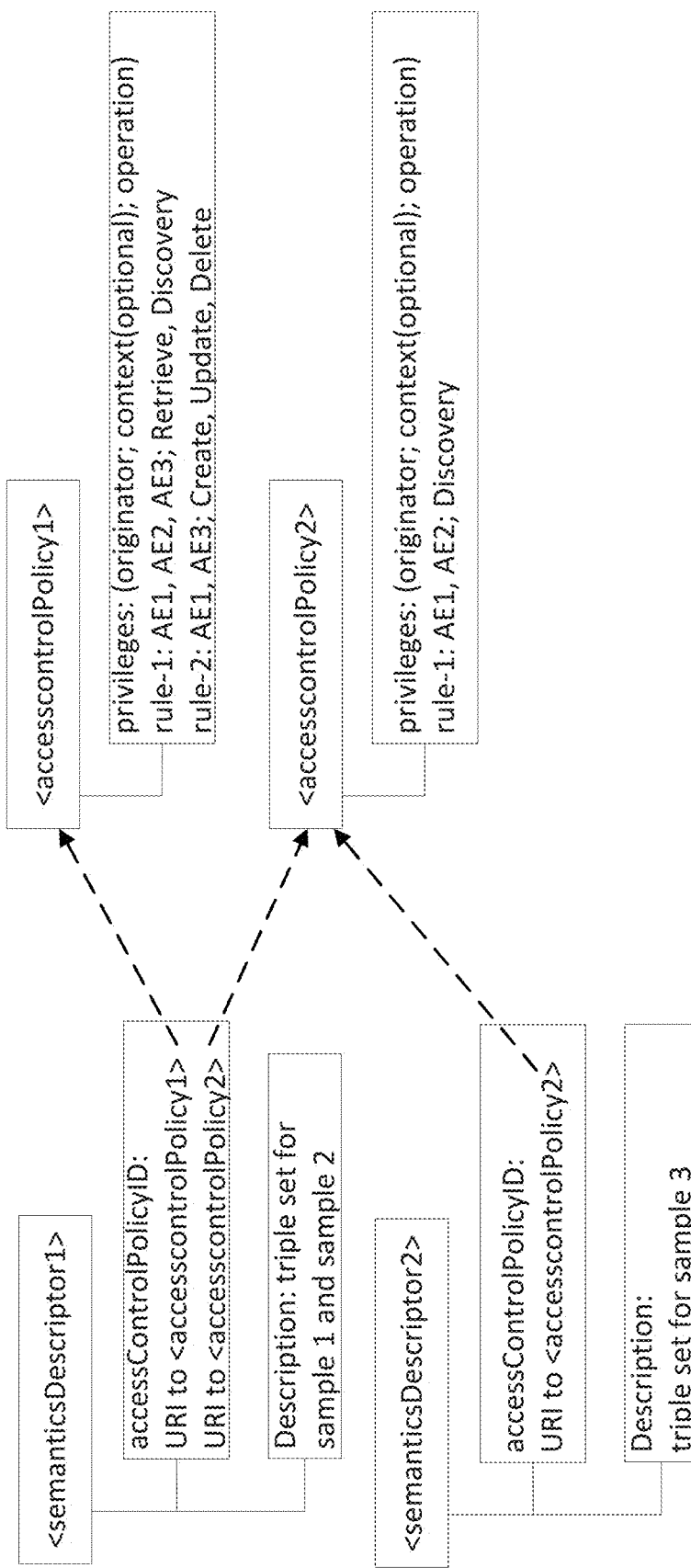
FIG. 52 illustrates an example of Access Control Policy in Semantic Graph Store.

FIG. 52 illustrates an exemplary access control policy associated with a semantics graph store. FIG. 22 illustrates an exemplary call flow (method) for an example of access control policy in a semantic graph store (such as in FIG. 52). The method of FIG. 22 illustrates an example of how to use access control information with the targeted triples and insert them together into a semantics graph store. At step 240 of FIG. 22, eHealth ontology reference model (as shown in FIG. 23) may be pre-configured and an access control ontology model (as shown in FIG. 24) may pre-configured. At step 241, originator 162 requests to create an <Access- ControlPolicy> resource at SE 163, which hosts access control policies. At step 242, SE 163 creates <AccessControlPolicy> resource in the resource tree. At step 243, SE 163 responds to originator 162 with an indication of a successful result. At step 244, SE 163 requests SE 164 to insert this <AccessControlPolicy> in the semantic graph store. At step 245, SE 164 creates <AccessControlPolicy> in the semantic graph store. This may include creating <AccessControlTriples> to represent the access control rules under this <AccessControlPolicy> using the access control ontology (shown in FIG. 24) and inserting <AccessControlTriples> in the semantic graph store.

With continued reference to FIG. 22, at step 246, SE 164 responds to SE 163 with an indication of a successful result. At step 247, originator 162 requests to create the <SemanticTriples> in the semantic graph store. At step 248, SE 163 forwards the request of step 247 to SE 164 that hosts the semantic graph store. At step 249, SE 164 conducts semantic triple CREATE operation. SE 164 may validate the CREATE operation in semantic graph store by using ID of originator 162 and a related <AccessControlPolicy>. <AccessControlPolicy> may be created if it does not exist. SE 164 may bind the <AccessControlPolicy> with the triples to be created in the semantic graph store as shown in FIG. 25. SE 164 may insert the triples associated with <AccessControlTriples> in the semantic graph store. At step 250, SE 164 may send a message to SE 163 with successful result. At step 251, SE 163 may respond to originator 162 with successful result.

With reference to FIG. 22, at step 252, originator 161 requests a semantic triple RETRIEVE operation. At step 253, SE 163 sends the request of step 252 to SE 164. At step 254, SE 164 conducts semantic triple RETRIEVE operation. SE 164 may validate the retrieve operation by using the ID of originator 161 and compose semantic query commands with <AccessControlPolicy> as shown in FIG. 26. SE 164 may conduct the query with the <Access ControlPolicy>. At step 255, SE 164 sends a message to SE 163 with the successful result. At step 256, SE1 163 sends a message to originator 161 with the successful result.

Generally, if an application initiates the semantics query over the triples provided by originator 161, a query engine in SE 164 performs a query search, which automatically uses the AccessControlTriples inserted in the semantic graph store. This may be because of the binding between <AccessControlTriples> with the triples created by originator 161. Note that a query AE or SE only needs to provide its identification, e.g., AE ID or SE ID to identify the access control rules as shown in FIG. 26.

Example files for access control in semantic graph store are shown in FIG. 23, FIG. 24, FIG. 25, FIG. 26, and FIG. 53A through FIG. 53C. Even though the mechanisms are examples with a centralized semantic graph store, general procedures may be applicable to all kinds semantic graph stores.

Figure 54:
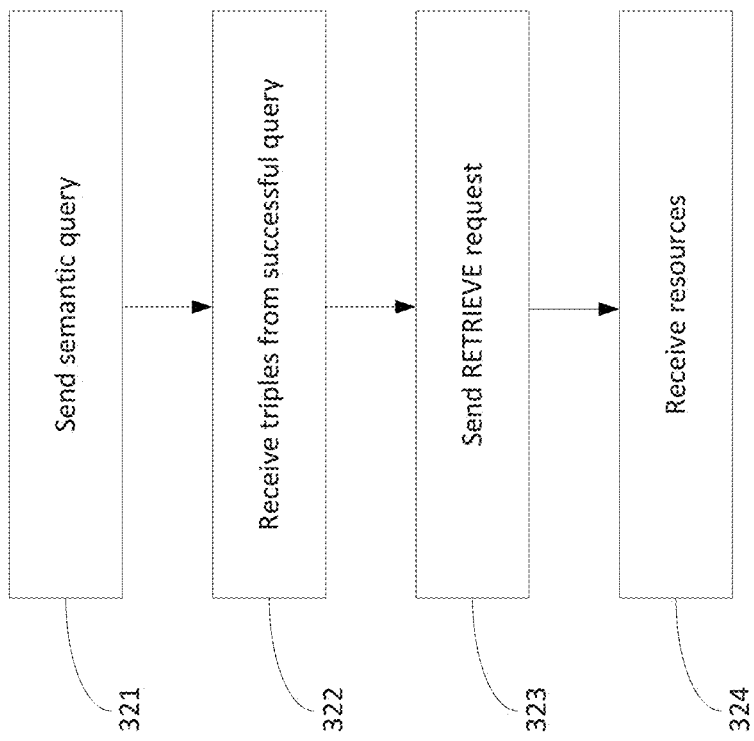
FIG. 54 illustrates an exemplary method for conducting resource discovery via semantic query.

Resource discovery via semantic query is discussed below. FIG. 54 illustrates an exemplary method for conducting resource discovery including semantic query. At step 321, originator 161 (e.g., AE or SE) may send a semantic query to SE 164, which hosts a semantic graph store. In response to the request, SE 164 may conduct a semantic query in the semantic graph store. At step 322, originator 161 may receive from SE 164 a triple(s) or triple node(s) in response to the successful query at step 321. At step 323, which may be subsequent to receiving the triples of step 322, originator 161 may send a RETRIEVE request for a resource to SE 164, which hosts the resource tree. The resource may be in the resource tree of SE 164 and addressed by the URI or URL (uniform resource locator) appointed or associated to the triple or triple node received in step 322. SE 164 conducts a retrieving operation in the resource tree. At step 324, which may be in response to step 323, originator 161 receives a triple or triple node from a successful retrieving operation.

Figure 27:
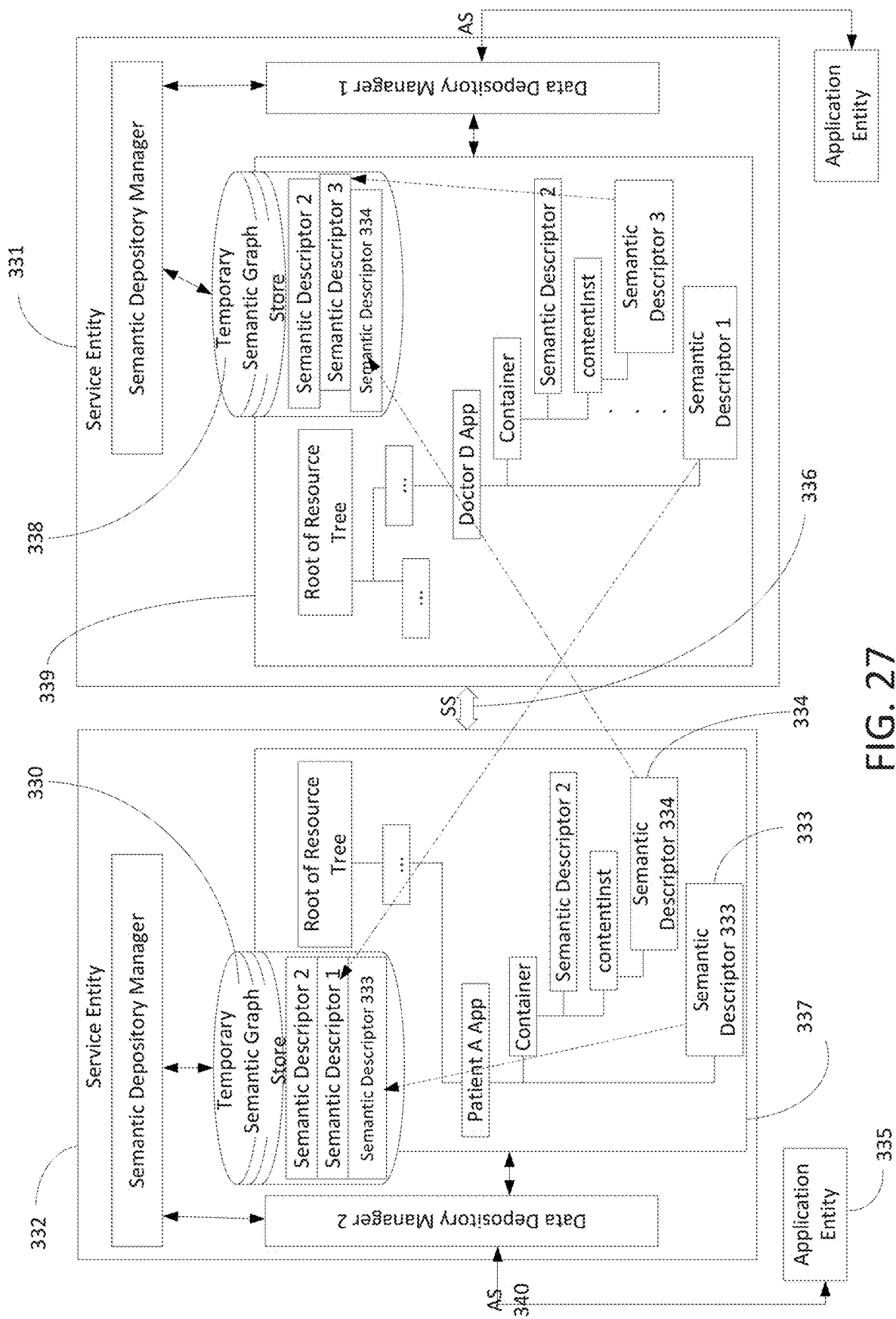
FIG. 27 illustrates an exemplary Architecture of Semantic Descriptors Distributed in Hierarchical Resource Trees.

FIG. 27 illustrates an exemplary architecture of semantic descriptors distributed in hierarchical resource trees. This distributed architecture has a plurality of features. A temporary semantic graph store (e.g., temporary semantic graph store 330 or temporary semantic graph store 338) used for semantic query may reside locally on a service entity (e.g., SE 331 or SE 332), such as a CSE in oneM2M, and include semantic triples extracted from the semantic descriptors (e.g., semantic descriptor 333 or semantic descriptor 334) distributed in hierarchical resource trees. The semantic descriptors containing semantic triples may be located at different hierarchical resource trees on multiple service entities. For example, semantic descriptor 334 may be located in resource tree 337 on SE 332 and located in resource tree 339 on SE 331. An application entity (e.g., AE 335), such as an AE in oneM2M, may communicate with SE 332 via interface AS 340, such as Mca interface in oneM2M, for RESTful operations such as CREATE, RETRIEVE, UPDATE, DELETE etc. over semantic descriptor resources in the resource tree. SE 332 may communicate with another SE 331 via interface SS 336, such as Mcc or Mcc' interface in oneM2M, for RESTful operations such as CREATE, RETRIEVE, UPDATE, DELETE etc. over semantic descriptor resources in the resource tree.

The RESTful operations such as CREATE, RETRIEVE, UPDATE, and DELETE over the semantic descriptors in the hierarchical resource trees are similar to the operations to other resources in the resource trees. As mentioned in the background, semantic query is different from the semantic search and semantic query should be conducted with all the semantic triples linked in a semantic graph store. Thus, local temporary semantic graph store is disclosed herein for semantic query purpose.

Figure 28:
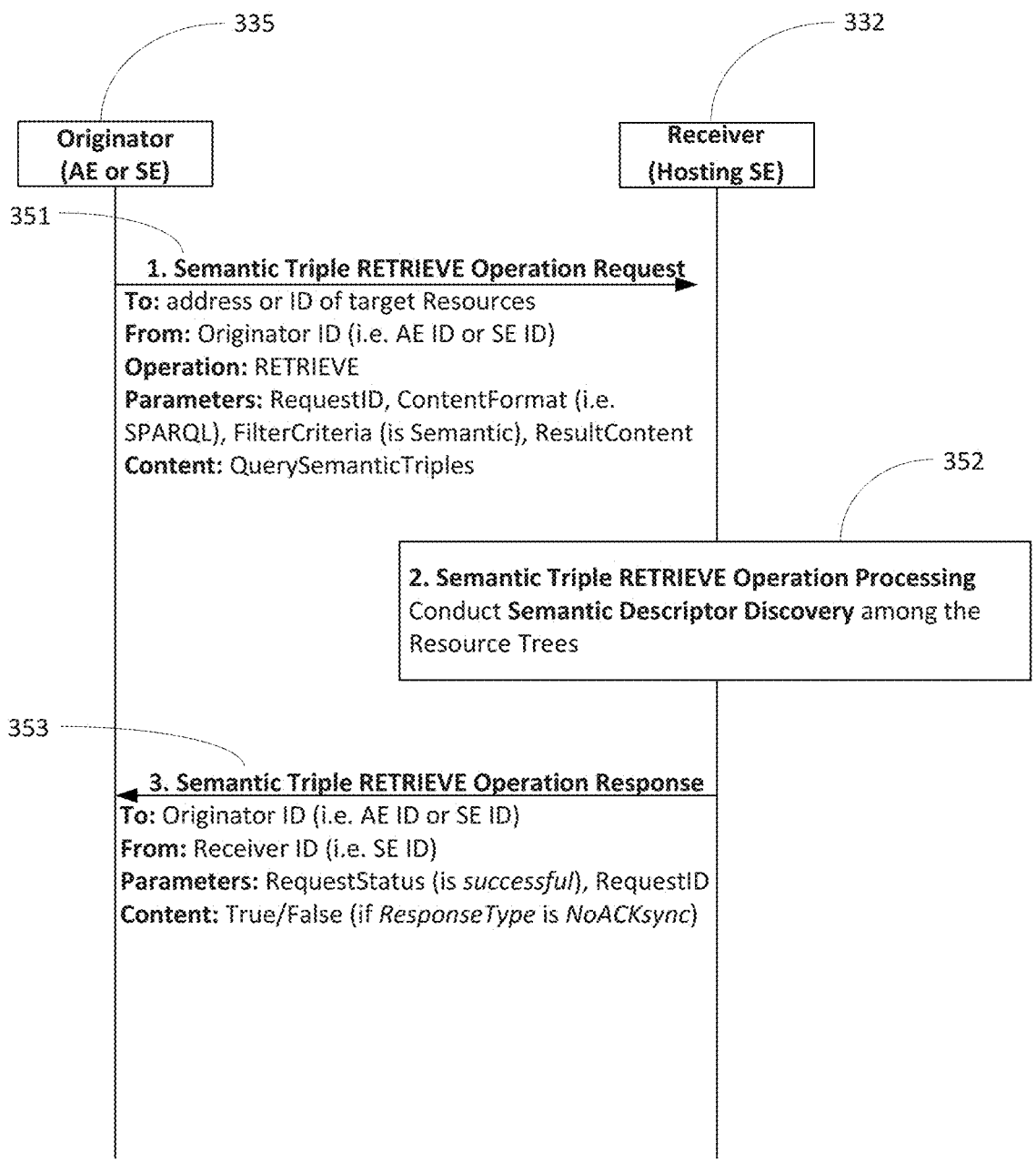
FIG. 28 illustrates an exemplary Semantic Query with Distributed Semantic Descriptors in Resource Trees.

FIG. 28 illustrates an exemplary semantic query with distributed semantic descriptors in resource trees. At step 351, a request comprising a semantic triple RETRIEVE operation may be received by receiver 332 (i.e., SE 332). The request may include the following: 1) address or ID of target resource (e.g., To address); 2) originator ID (e.g., AE ID or SE ID); 3) operation (e.g., RETRIEVE); 4) parameters (e.g., RequestID, ContentFormat (for example—SPARQL), FilterCriteria (is Semantic), ResultContent); or 5) content (e.g., Query SemanticTriples). At step 352, based on the request of step 351, receiver 332 may perform processing associated with semantic triple RETRIEVE operations. Receiver 332 may conduct semantic descriptor discovery among the resource trees. Receiver 332 may validate the semantic triple RETRIEVE operation in resource tree. For example, determine originator 335 has the privileges to RETRIEVE the semantic descriptors in resource trees based on the access control policy rules specified by <AccessControlPolicy> for each semantic descriptor. Receiver 332 may determine if FilterCriteria is valid. Based on successful validation of the RETRIEVE request, receiver 332 may RETRIEVE the semantic descriptors discovered. Receiver 332 may extract semantic triples from the semantic descriptors retrieved and deposit them into a local temporary semantic graph store. A SPARQL update operation may be used to load the temporary semantic graph store. Receiver 332 may construct semantic query command if not provided in the request (e.g., in SPARQL query language). Receiver 332 may conduct semantic query with the targeted query semantic triples and the FilterCriteria in the temporary semantic graph store. Receiver 332 may remove the semantic triples (e.g., all) in the temporary semantic graph store. At step 353, receiver 332 may compose and send a message with the semantic query results to originator 335.

It is contemplated herein, that the temporary semantic graph store may be used to link the semantic triples extracted from the semantic descriptors discovered from the resource tree(s), e.g., to form the relationship graph for semantic query. This temporary semantic graph store may be cleared after each semantic query and then loaded with another group of semantic triples extracted from the semantic descriptors discovered for another semantic query. Therefore the temporary semantic graph store may not retain a semantic triple after each query to ensure that the semantic triples forming the query graph are the only triples that an originator is allowed to have operations with in this temporary semantic graph store.

Figure 29:
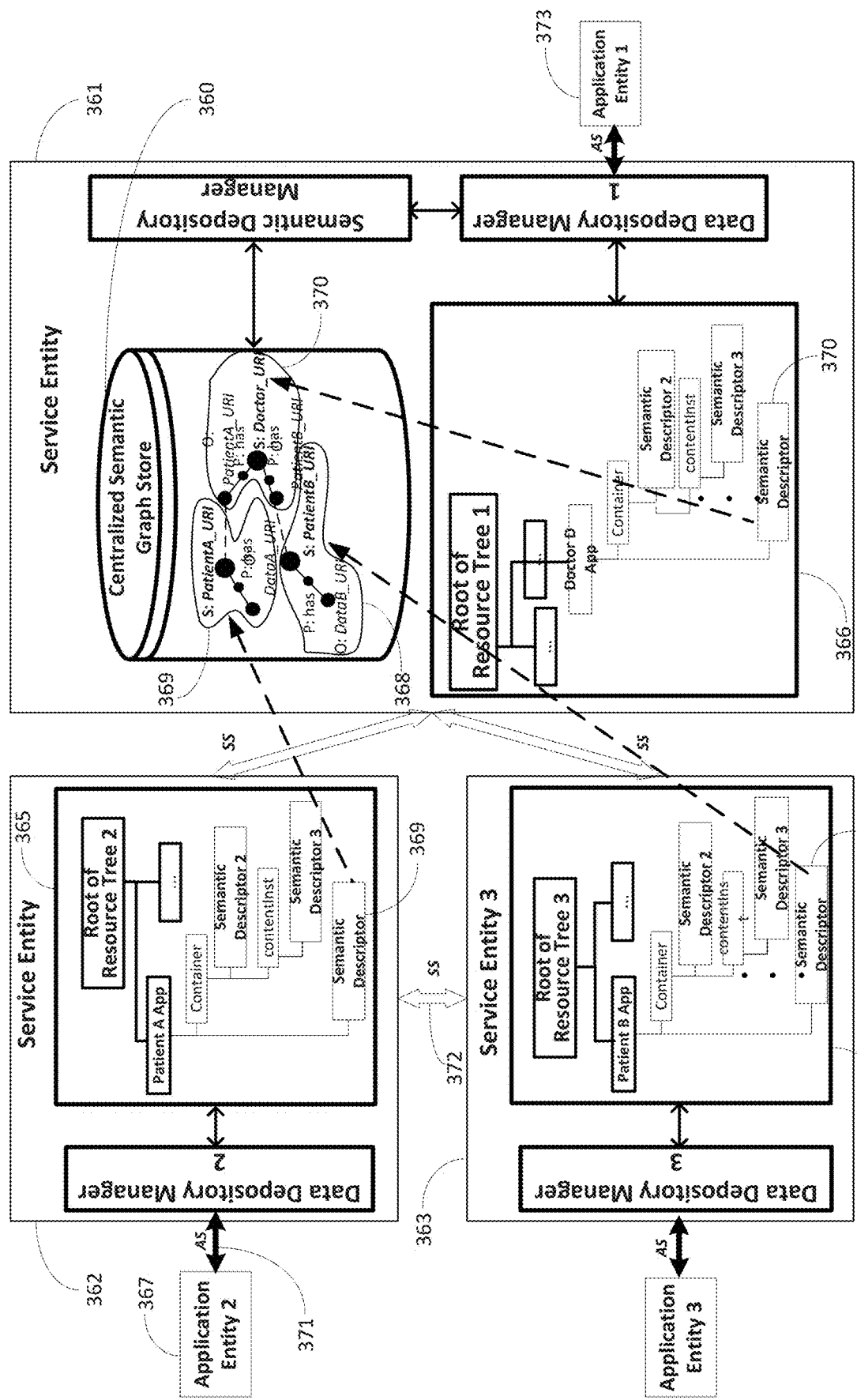
FIG. 29 illustrates an exemplary Architecture for Semantic Descriptors in a Semantic Graph Store and Hierarchical Resource Trees.

Disclosed herein is a hybrid architecture with semantic descriptors in both semantic graph store and hierarchical resource trees. FIG. 29 illustrates an exemplary architecture for semantic descriptors in a semantic graph store and hierarchical resource trees. The hybrid architecture may have the following features. There may be centralized semantic graph store 360 used for semantic query and it may reside on a SE 361 (e.g., a CSE in oneM2M). Centralized semantic graph store 360 may include semantic triples from the semantic descriptors distributed in hierarchical resource trees, such a resource tree 364, resource tree 365, or resource tree 366. There may be semantic descriptor 368 of resource tree 364, semantic descriptor 369 of resource tree 365, or semantic descriptor 370 of resource tree 366. As shown, the semantic descriptors containing semantic triples may be located at different hierarchical resource trees on multiple service entities.

With continued reference to FIG. 29, below are exemplary options for the semantic descriptor. In a first option, semantic descriptors in a resource tree are real resources containing semantic triples. The operation of CREATE, RETRIEVE, UPDATE, or DELETE may be conducted over the semantic descriptors in the resource tree(s) like the operations to any other type resources in the resource trees. But the semantic graph in centralized semantic graph store 360 may be synchronized with those semantic descriptors each time an operation is conducted over the semantic descriptors in the resource tree(s). Centralized semantic graph store 360 may be used for semantic query and other semantic analytical operations. This first option may be considered more of a distributed approach.

With continued reference to FIG. 29, in a second option, semantic descriptors in a resource tree may be virtual resources that do not contain semantic triples. An operation of CREATE, RETRIEVE, UPDATE, or DELETE conducted over the virtual resource semantic descriptors in the resource tree(s) may trigger the real operation in centralized semantic graph store 360. Centralized semantic graph store 360 may be used not only for semantic query but also for storing Semantic triples. This second option may be considered more of a centralized approach.

With reference to FIG. 29, an application entity (e.g., AE 367) may communicate with a service entity (e.g., SE 362) via interface AS 371, e.g., Mca interface in oneM2M, for RESTful operations such as CREATE, RETRIEVE, UPDATE, DELETE etc. over semantic descriptor resources (e.g., semantic descriptor 369) in the resource tree (e.g., 365), as well as semantic query over semantic triples in centralized semantic graph store 360. In an example, SE 362 may communicate with another SE 363 via interface SS 372, e.g., Mcc or Mcc' interface in oneM2M, for RESTful operations such as CREATE, RETRIEVE, UPDATE, DELETE etc. over semantic descriptor resources in the resource tree (e.g., resource tree 364), as well as semantic query over semantic triples in a centralized semantic graph store. In the first option, the RESTful operations such as CREATE, RETRIEVE, UPDATE, and DELETE over the semantic descriptors in the hierarchical resource trees are similar to the operations to other resources in the resource trees. For the second operation, the operations such as CREATE, RETRIEVE, UPDATE, and DELETE over the semantic triples in centralized semantic graph store 360 are similar to those described with regard to the centralized approach are similar to the operations to other resources in the resource trees.

Figure 30:
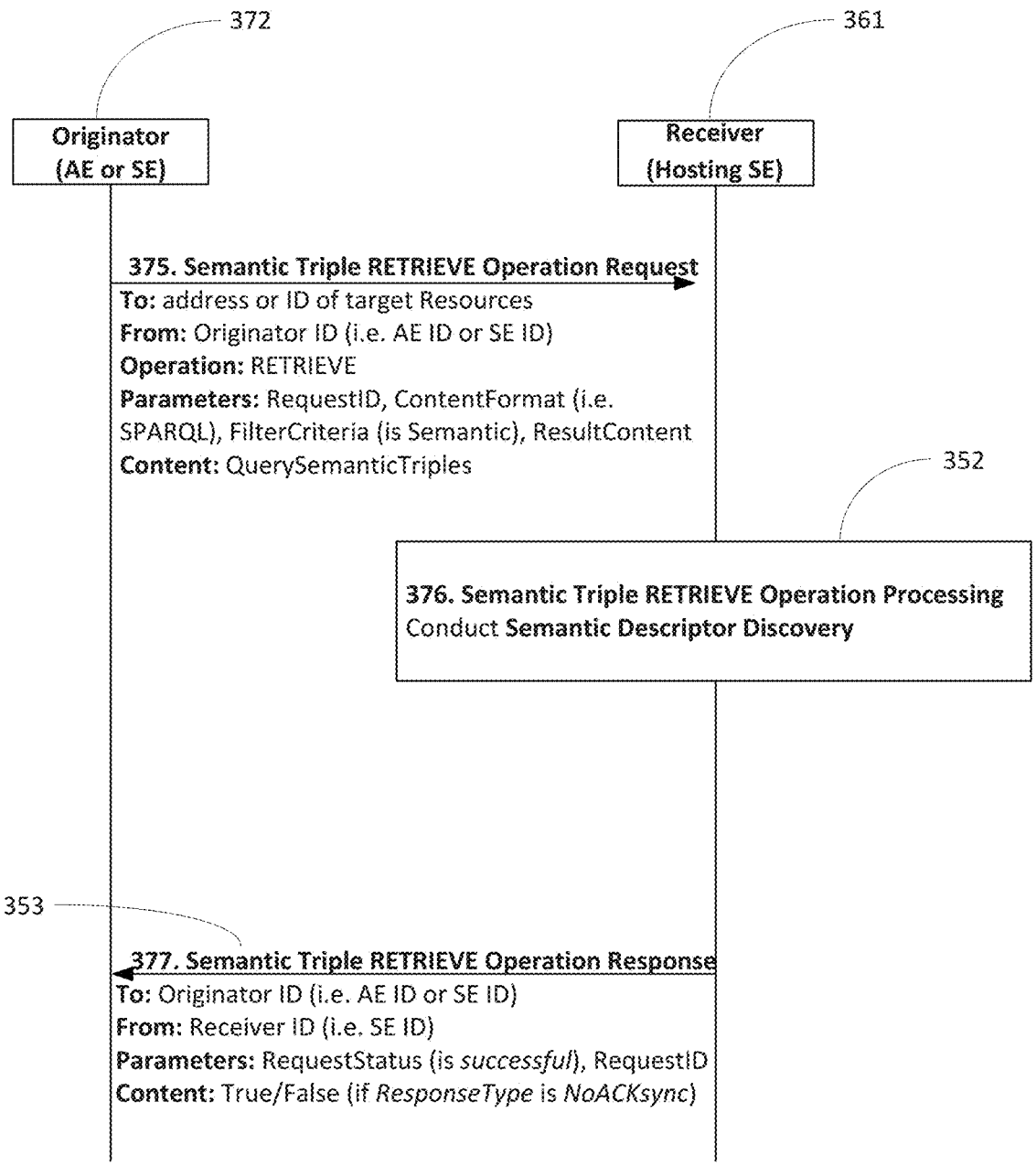
FIG. 30 illustrates an exemplary method for Semantic Query with Semantic Descriptors in Resource Trees and Semantic Triples in Semantic Graph Store.

FIG. 30 illustrates an exemplary method for semantic query with semantic descriptors in resource trees. At step 375, receiver 361 (e.g., SE 361) may receive a request for a semantic triple RETRIEVE operation. At step 376, based on the request of step 375, receiver 361 may process the semantic triple RETRIEVE operation. Receiver 361 may conduct a semantic descriptor discovery. Receiver 361 may validate the semantic triple RETRIEVE operation in resource tree. This may include determining originator 373 has the privileges to RETRIEVE the semantic descriptors discovered in resource trees based on the access control policy rules specified by <AccessControlPolicy> for each semantic descriptor. In addition there may be a determination whether the FilterCriteria are valid. In the first option, based on successful validation of the RETRIEVE operation, receiver 361 may RETRIEVE the semantic descriptor discovered in the resource trees. Receiver 361 may construct a graph view with the list of semantic triples after successful validation of the RETRIEVE operation. In the first option, receiver 361 may extract semantic triples from the semantic descriptors retrieved and deposit them into semantic graph store 360 with the graph view constructed. Receiver 361 may construct a semantic query command, if not provided in the request (e.g., in SPARQL query language). Receiver 361 may conduct semantic query with the targeted query semantic triples and the FilterCriteria within the view constructed in the semantic graph store.

At step 377, receiver 361 may construct and send a message (e.g., a response) to AE 373. NOTE that "Access Control with Graph Views" scheme is shown as an example in FIG. 30 and other areas herein, but the "Access Control with <AccessControlTriple>" scheme may be also applicable for the first option or the second option.

Disclosed herein is an alternate approach which allows for enabling relationships between distributed semantic descriptors. Filtering or querying across distributed descriptions provides an alternative to the other approaches described herein with regard to conventional semantic filtering proposals in oneM2M. Note that the general assumptions made in the centralized approach discussed herein apply, so that the semantic description may be in RDF triple format or not. Here, focus is placed on the overall graphs created by the semantic instances and as such, disclosed is the exemplary use of semantic instances in the form of triples. The term "semantic descriptor" or "semantic triples" (plural) may be used for semantic descriptions in any formats (e.g., RDF). The term "semantic instance" for a single statement e.g., RDF-triple may be used. Queries may be exemplified for RDF triples via SPARQL, for example.

The distributed architecture addressed in this approach may have the following features. The semantic descriptors may be located across resources on different hierarchical resource trees on single service entities. Requests for semantic operations across several service entities may be broken down into requests routed to individual Service Entities, so the semantic operations addressed here target the Descriptors distributed within the addressed Service Entity. An application entity (AE), e.g., AE in oneM2M, may communicate with a SE via interface AS, e.g., Mca interface in oneM2M, for RESTful operations such as CREATE, RETRIEVE, UPDATE, DELETE etc. over semantic descriptor resources in the resource tree. A SE may communicate with another SE via interface SS, e.g., Mcc or Mcc' interface in oneM2M, for RESTful operations such as CREATE, RETRIEVE, UPDATE, DELETE etc. over semantic descriptor resources in the resource tree. A temporary semantic graph store used for semantic query may reside on a service entity (SE), e.g., CSE in oneM2M, and contain semantic triples extracted from the semantic descriptors distributed in hierarchical resource trees. Note that in this architecture the problem of security and privacy is resolved via access control policies, as described with regard to conventional access control policy in oneM2M. The semantic descriptors have resource-level policies it determines which entities may access them for each CRUD operation.

A significant issue may be in querying the semantic descriptors of the possibly large amount of resources available in a service entity. There are several choices, such as the ones discussed below. A first choice may include processing each query over the entire SE tree (e.g., process each query as if it was targeting the base of the resource tree (for example CSEBase in oneM2M)) and as if all the semantic descriptors in the SE are relevant to each query. This may be considered an inefficient method of searching. A second choice may include processing each query considering the semantic descriptor of the operation target. For the case described with regard to conventional semantic filtering proposals in oneM2M. This may lead a query directed at <device12> to not use the semantic descriptor information available at <operationX> at all. A third choice may include processing each query using the resourceDescriptionLink method described in conventional semantic filtering proposals in oneM2M discussed herein. In this case, two (or more) descriptors containing more than one common concept may lead to several links being established between the same two descriptors. Based on the procedural description, each time a new link would be encountered the entity processing the query operation would be fetching the corresponding semantic descriptor (for operation X in this case). This would result in multiple retrievals of the same descriptor. In addition, the retrievals can be processed based on semantic understanding of the descriptor content. A fourth choice may include processing each query over a set of descriptors which are related in meaning. The set may be made wider or smaller based on policies which would trade query efficiency for accuracy. The method described in the following belongs to this category. It has the advantage of using knowledge available at annotation time regarding how a semantic instance or subgraph is related to others, since it knows where (at which resource tree level) to place that instance or description.

Figure 31:
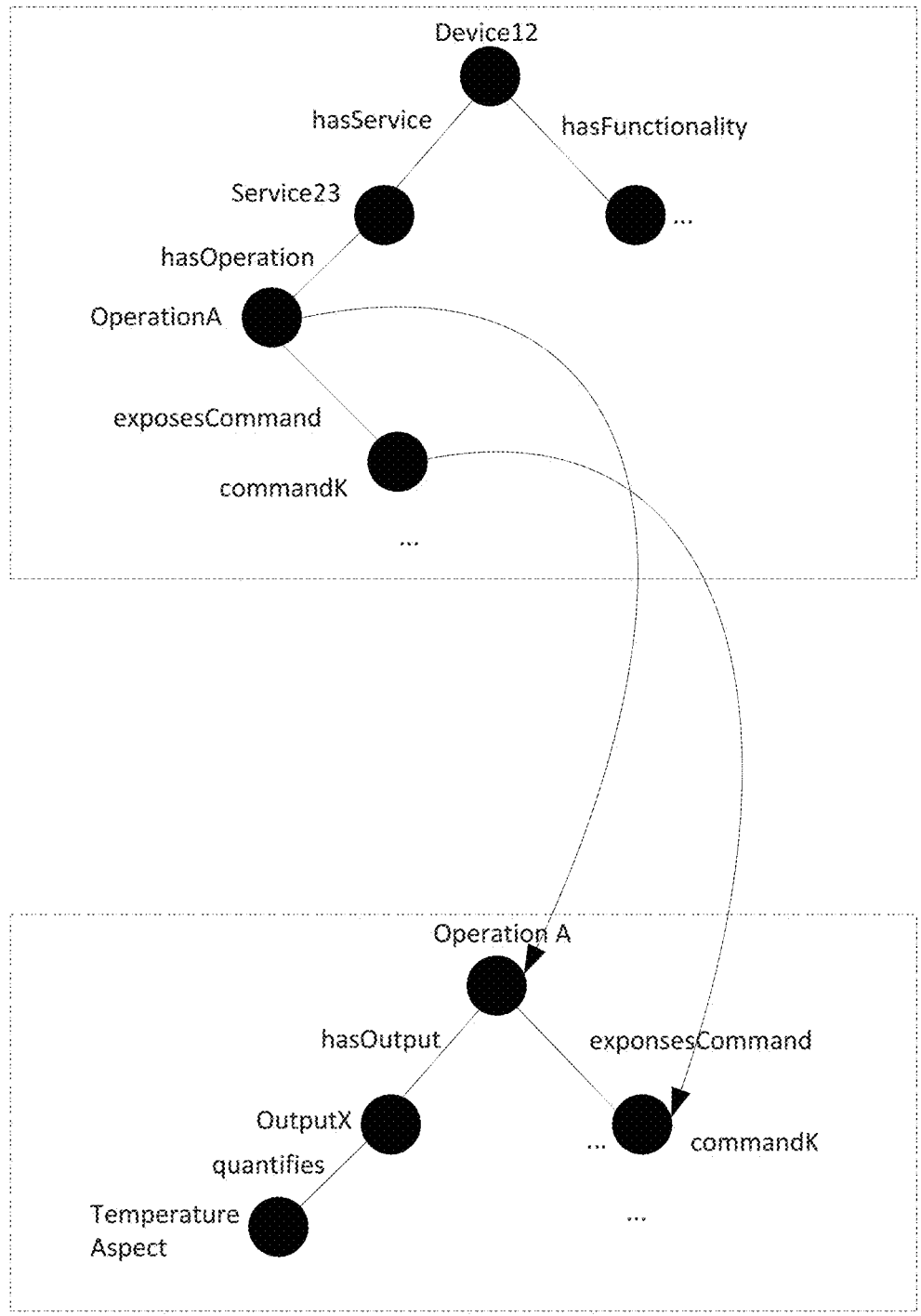
FIG. 31 illustrates an exemplary Problem of multiple resourceDescriptionLinks between same descriptors.

FIG. 31 illustrates a problem of multiple resourceDescriptionLinks between same descriptors as done conventionally. In this disclosure the semantic descriptors with related content may be provided with links to each other, as opposed to the solution as discussed in the section of "semantic filtering proposals in oneM2M" where the links provided are between related concepts embedded in the semantic instances of the semantic descriptors. Specifically, a new attribute (e.g., relatedSemantics) is disclosed to be added to the semantic descriptor resource to provide the links to the related semantics descriptors.

Figure 32:
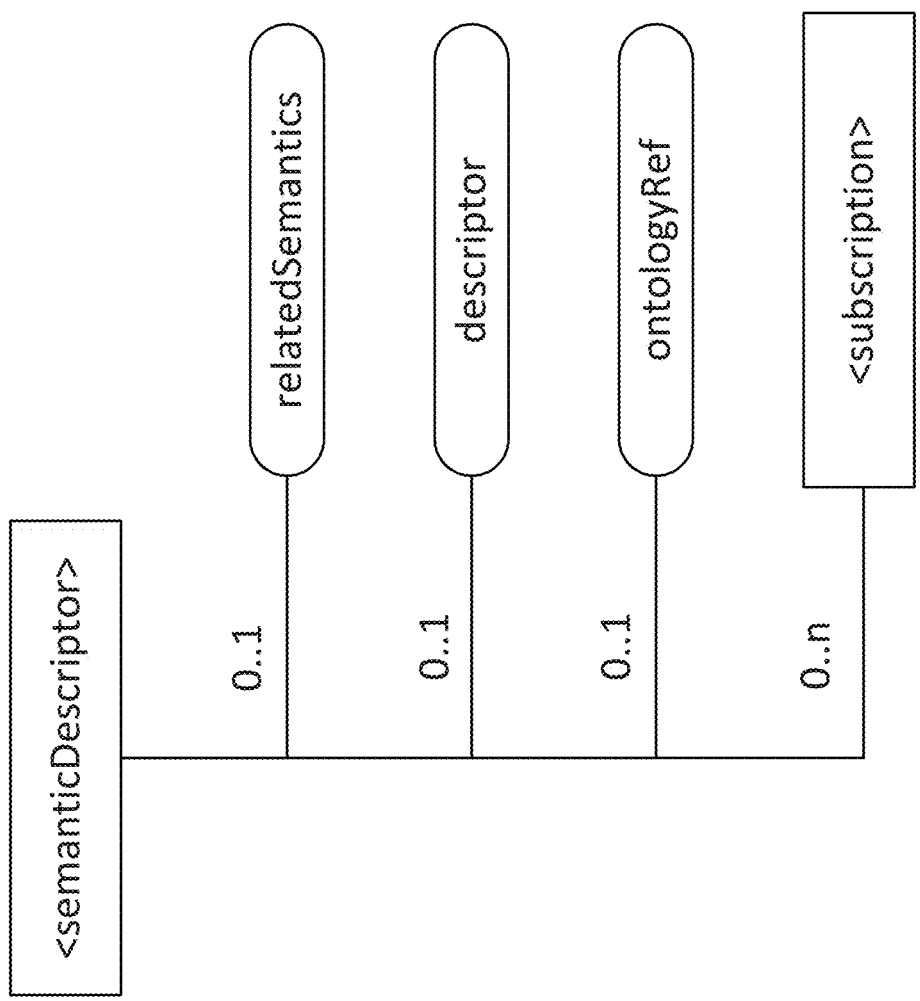
FIG. 32 illustrates an exemplary relatedSemantics attribute.

Using an example of a semantic descriptor resource in the oneM2M context, the attribute relatedSemantics is added to the <semanticDescriptor> resource as shown in FIG. 32, which illustrates relatedSemantics attribute.

There are multiple implementations that can be envisioned for the relatedSemantics attribute as described with regard to the list of links and group of links discussed herein. In a first implementation, the relatedSemantics attribute may include a list of individual links to related semantic descriptors. In a second implementation, relatedSemantics attribute points to a group. For this option <semanticGroup> resource is disclosed herein, however, a general purpose <group> resource may also be used for this purpose.

Note that in this context, the concept of "related" semantic descriptors may have the following meaning: two or more semantic descriptors are "related" if they are to be used together to form a larger graph for the purposes of semantic queries. Herein it is provided a first example based on an initial subject-based scheme and a second example using an arbitrary graph-based scheme which provides for schemes for generating related semantic descriptors, e.g., for deciding that semantic descriptors are related and providing the corresponding links. It should be noted that the method of providing inter-descriptor links introduced here may be considered independent of how a specific system chooses to implement the algorithms which ultimately decide that two or more semantic descriptors are related.

The following example of oneM2M distributed graphs (which is similarly associated with conventional semantic filtering proposals in oneM2M discussed herein) will be used below. In this example the graphs stored in independent resources contain information relevant to each other: OperationA from the first graph is further described in the second descriptor, and the relationship exposesCommand and object commandK are contained in both. Further graph description (such as additional potential triples with the subject commandK in the first graph and relevant to the resource operationA descriptor) may create additional dependencies between the graphs in this case.

Figure 33:
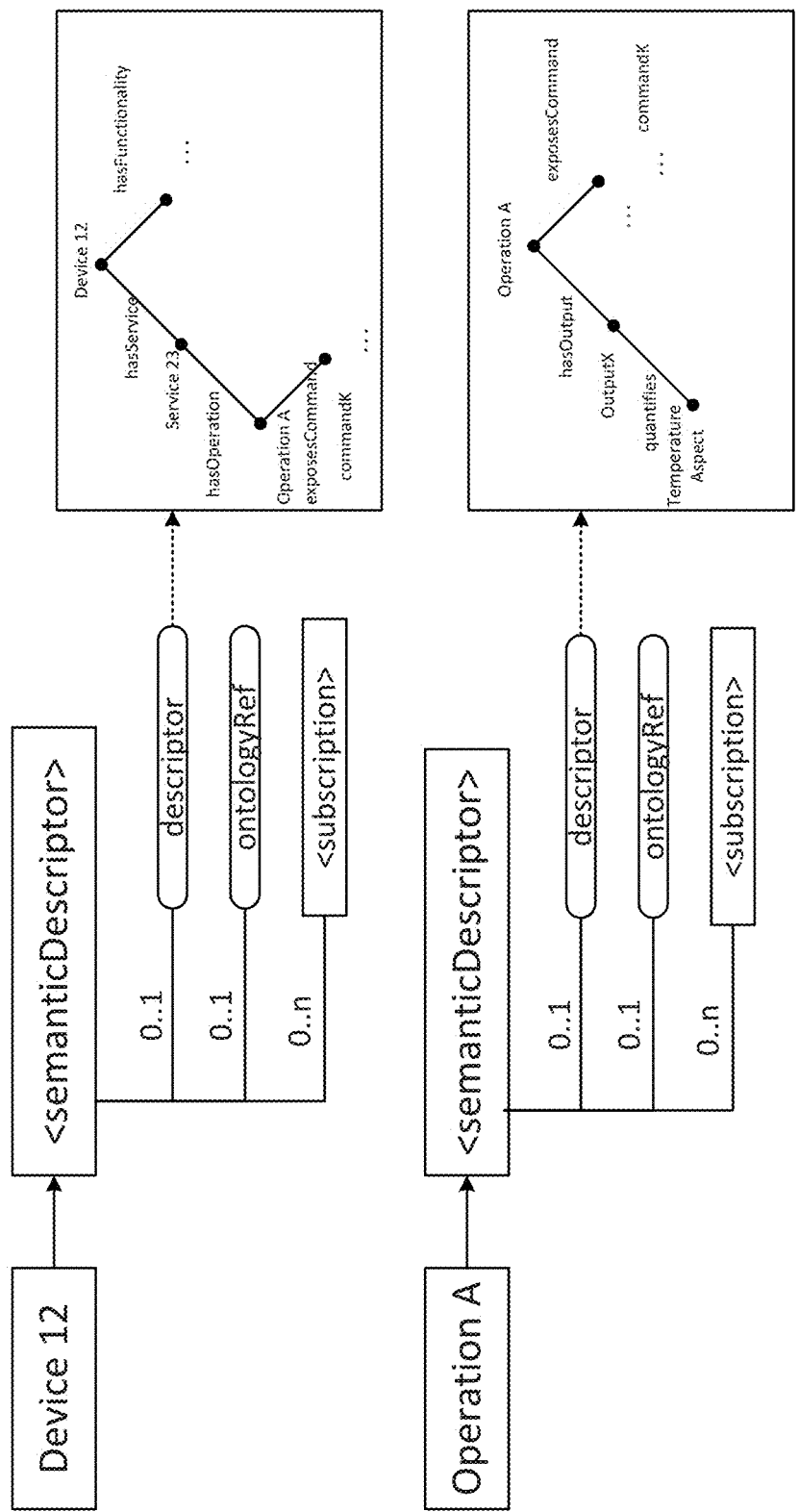
FIG. 33 illustrates an exemplary graph distributed across different semantic descriptors.

FIG. 33 illustrates an exemplary graph distributed across different semantic descriptors. In an example, there may be the following filter request: "Find all devices that have a service that has an operation whose output quantifies a temperature aspect, and filter it for those with the output=OutputX and command=commandK"

Below is the corresponding SPARQL representation of the request:

```
SELECT ?device
WHERE { ?device rdf:type base:Device .
        ?device base:hasService ?service.
        ?service base:hasOperation ?operation .
        ?operation base:hasOutput ?output .
        ?output base:quantifies temp:TemperatureAspect .
        ?device base:exposesCommand ?command .
        FILTER (?output == OutputX && ? command ==
        commandK)
      }
```

Figure 34:
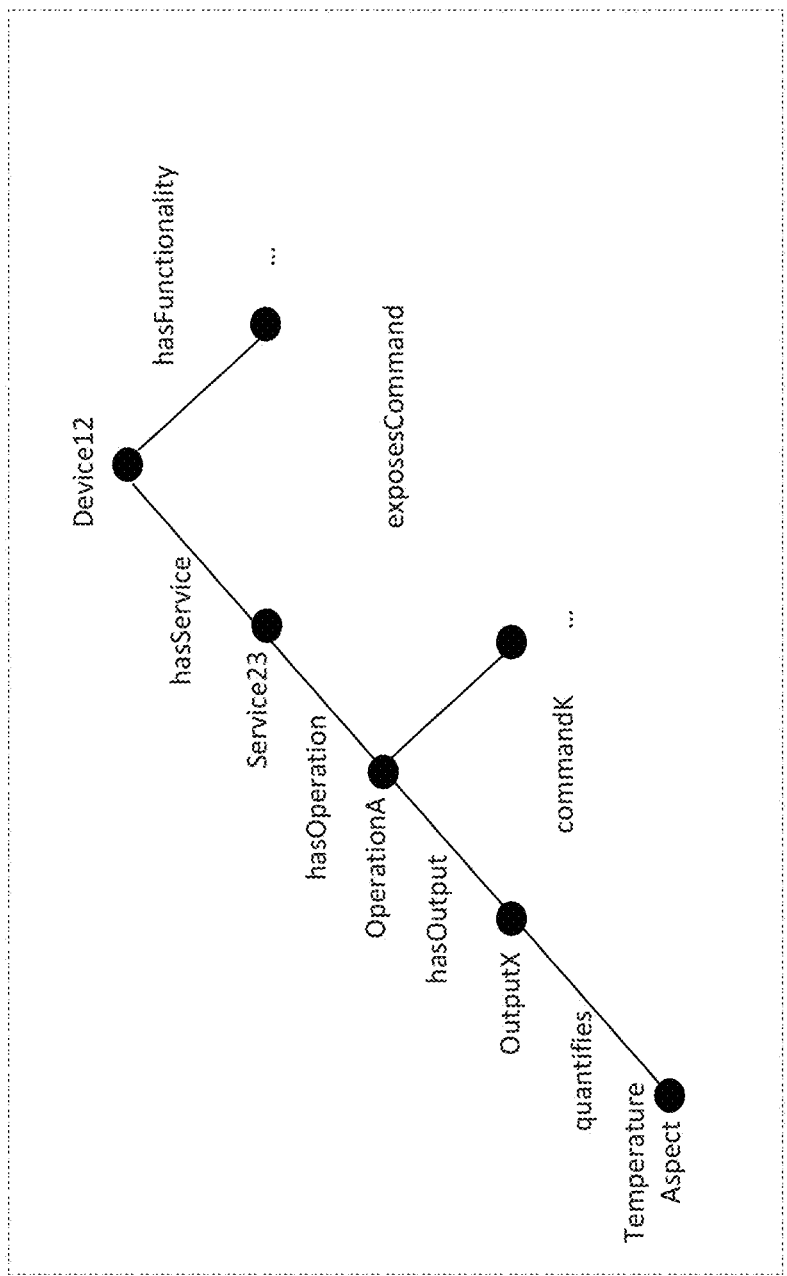
FIG. 34 illustrates an exemplary composite graph from sub-graphs distributed in separate descriptors.

The goal is to enable the creation of a larger resultant graph to be submitted to evaluate the SPARQL query against, as shown in FIG. 34.

In this implementation the relatedSemantics attribute contains a list of links pointing to descriptors associated with other resources, which should be used together with the descriptor in the given <semanticDescriptor> resource in order to perform semantic queries.

Figure 35:
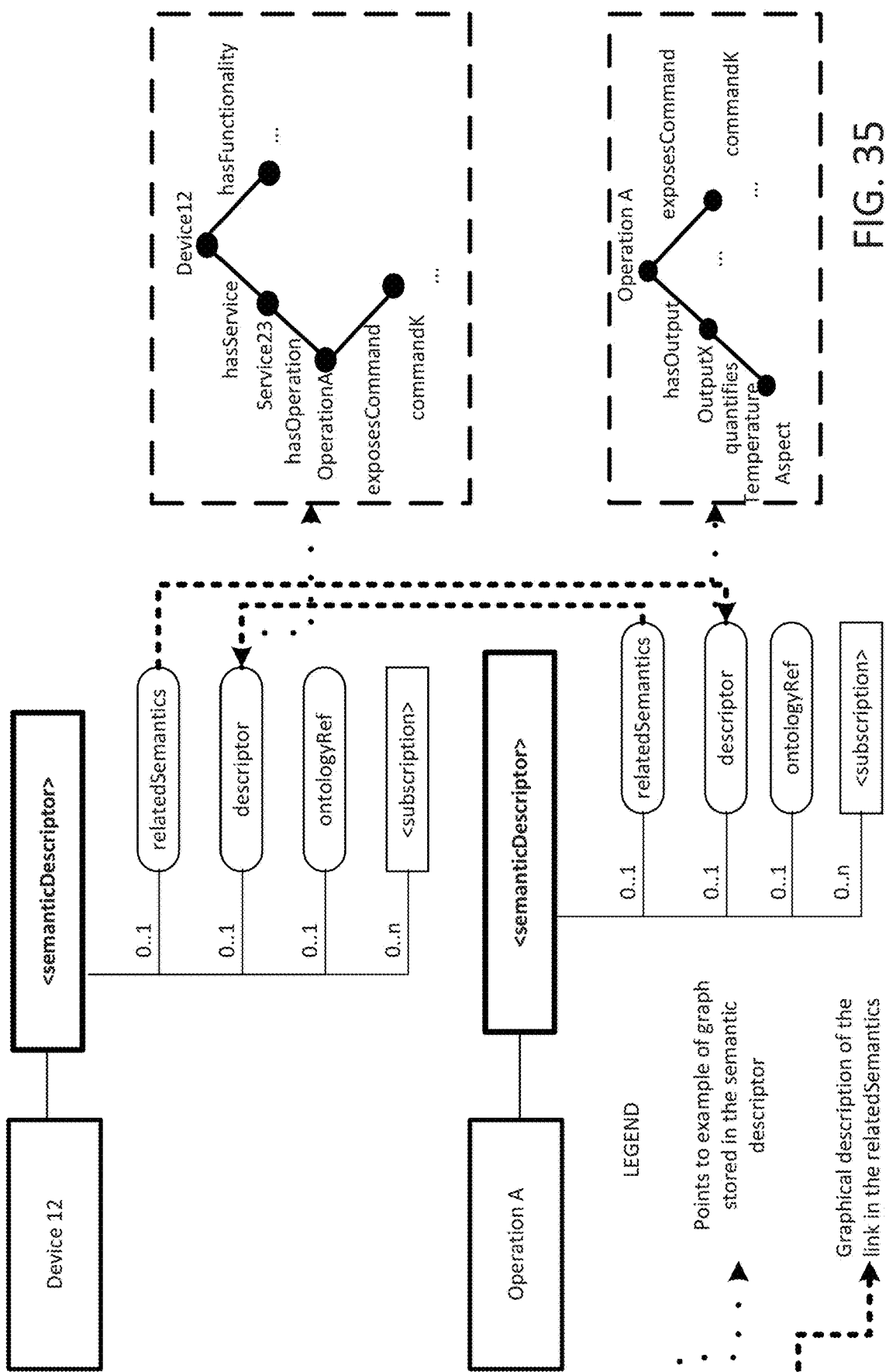
FIG. 35 illustrates an exemplary use or relatedSemantics attribute with a list of links.

FIG. 35 is an example use or relatedSemantics attribute with a list of links. This is useful in cases like the one presented, when a more limited number of semantic descriptors are related, making the link list short. In order to further simplify this option it can be envisioned that a standardized rule might specify that all semantic descriptors of child resources are considered related by default, meaning that all the child resource descriptors (if present) should be automatically added to the parent's if the query is directed to the parent. This way the relatedSemantics attribute of the parent does not need to contain links to all the descriptors of the children.

Figure 36:
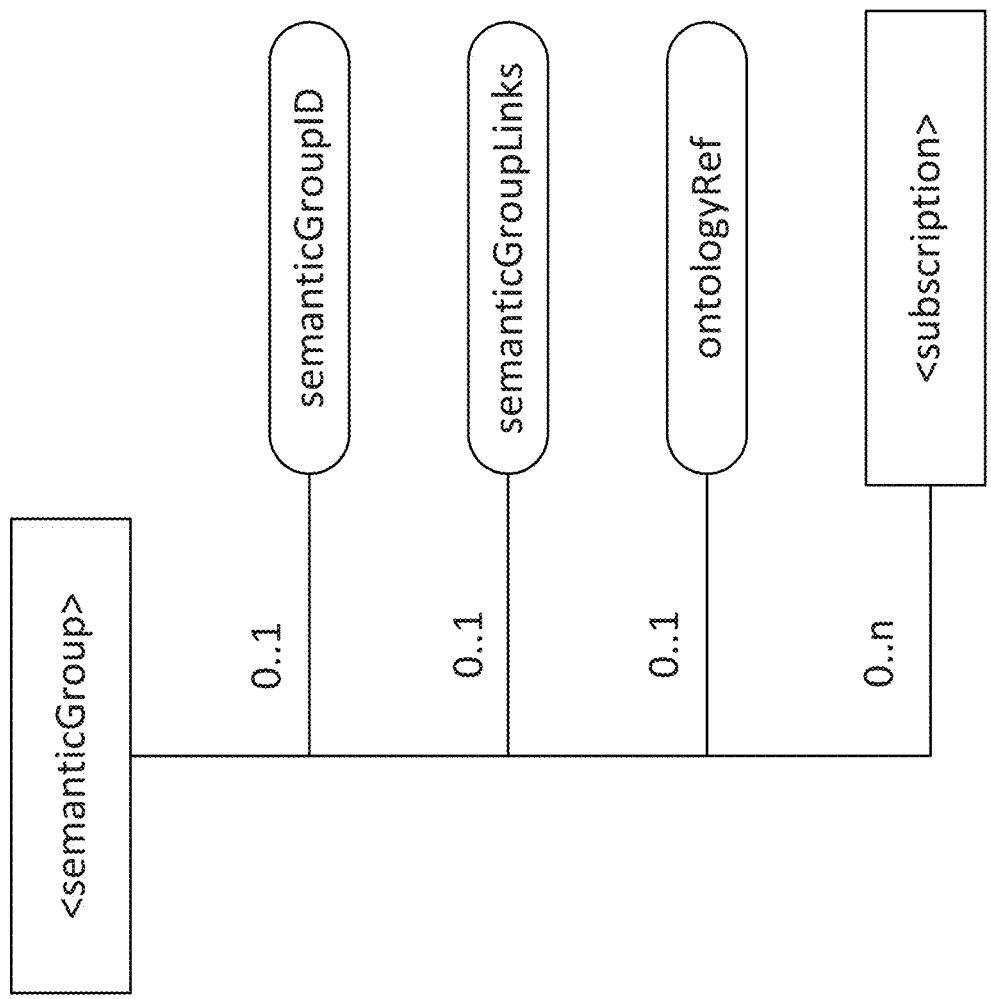
FIG. 36 illustrates an exemplary <semanticGroup> resource.
Figure 37:
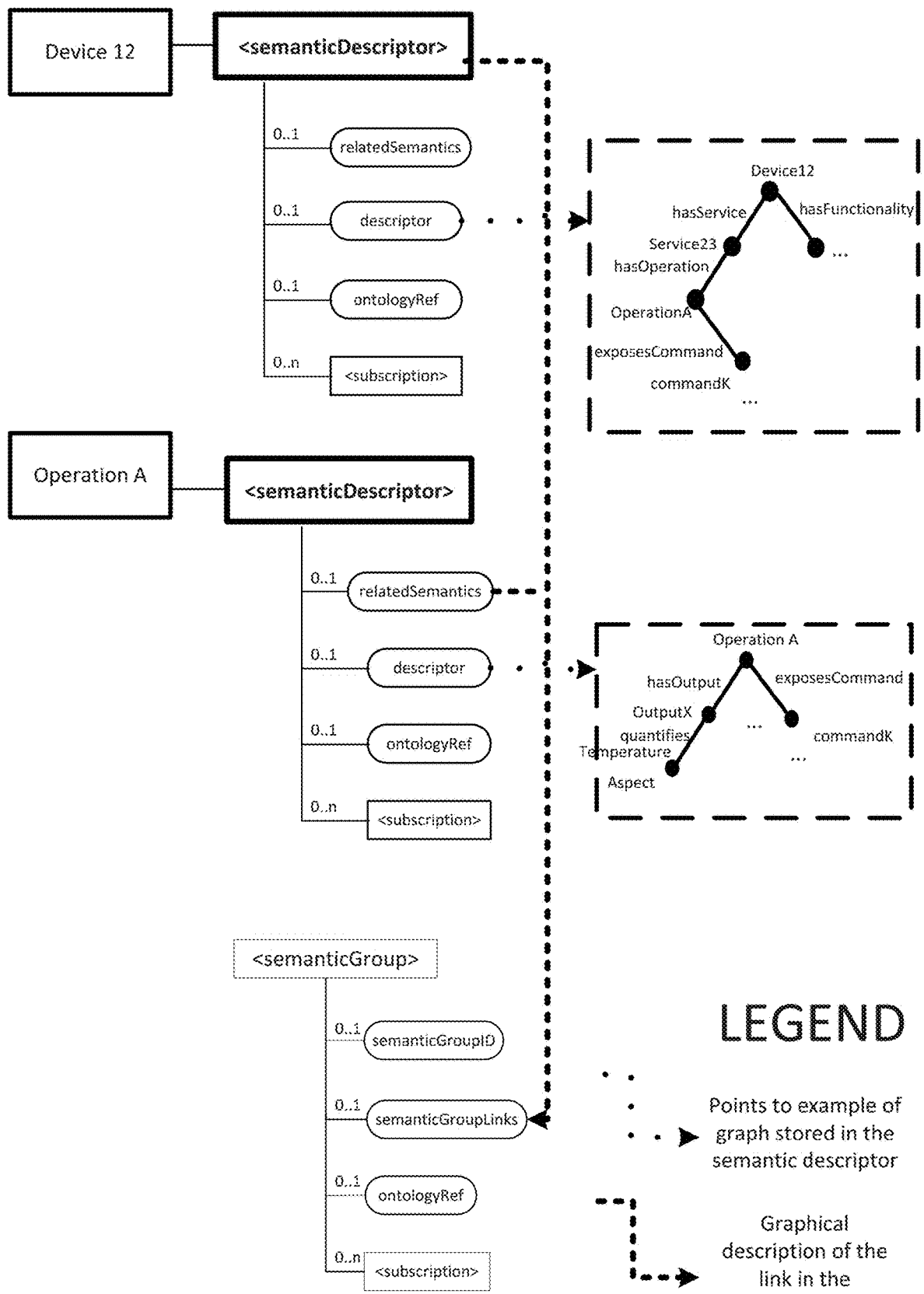
FIG. 37 illustrates an exemplary use or relatedSemantics attribute with <semanticGroup>.

In this implementation the relatedSemantics attribute contains a link pointing to a newly disclosed resource, <semanticGroup>, as in FIG. 36. The semanticGroupLinks is used to identify the descriptors to be used together when performing semantic queries. The relatedSemantics attributes of the individual semantic resources would point to either the <semanticGroup> resource, the semanticGroupLinks attribute directly, or may indicate the semanticGroupID associated. In the example above a <semanticGroup> resource may be formed when distributing the composite graph across the <Device12> and <operationA> resources. For this resource a semanticGroupID may be allocated, e.g., 56, and the semanticGroupLinks attribute may include a list of links to the relevant semantic descriptions, e.g., the links point to <Device12> and <OperationA>. In other implementations the links may point instead to each to each of the descriptor attributes of the respective <semanticDescriptor> resources, or to the child <semanticDescriptor> resources themselves. FIG. 37 is an example use or relatedSemantics attribute with <semanticGroup>.

Generating and Maintaining Relationship links between Distributed Semantic Descriptors. The distributed sematic descriptor architecture may rely on the availability of platform functionalities that make use of semantics technologies. This means that there are semantically-enabled platform functionalities which provide the semantic descriptors using CRUD operations. Similarly, CRUD operations may be used to manage these descriptors, including performing updates of the semantic instances. The sum of these annotation functionalities is considered the semantic annotation function.

Discussed herein are function generating resources, in which the annotation functionalities may have rules and policies about where the generated resources should be stored, how the access control attributes should be set, etc.

Below are examples of relationship-maintaining schemes that may be used in the annotation generation process in order to exemplify how the proposed methods of semantic descriptor linking may be used.

The example in the previous section is relying upon a semantic annotation function having used the larger graph in FIG. 34 to annotate the resources <Device12> and <operation A> as shown in FIG. 33. This is a logical representation of the processing of a graph. In specific implementations, the processing of this graph may make use of a local temporary or permanent triple store. This may be different than the hybrid approach discussed herein as the triple store is local and does not need to be shared among the Service Entities.

The Semantic Annotation function may be used however to generate the links between the various semantic descriptors created and to populate the relatedSemantics attributes at the same time that it generates the sub-graphs and annotations.

Figure 8:
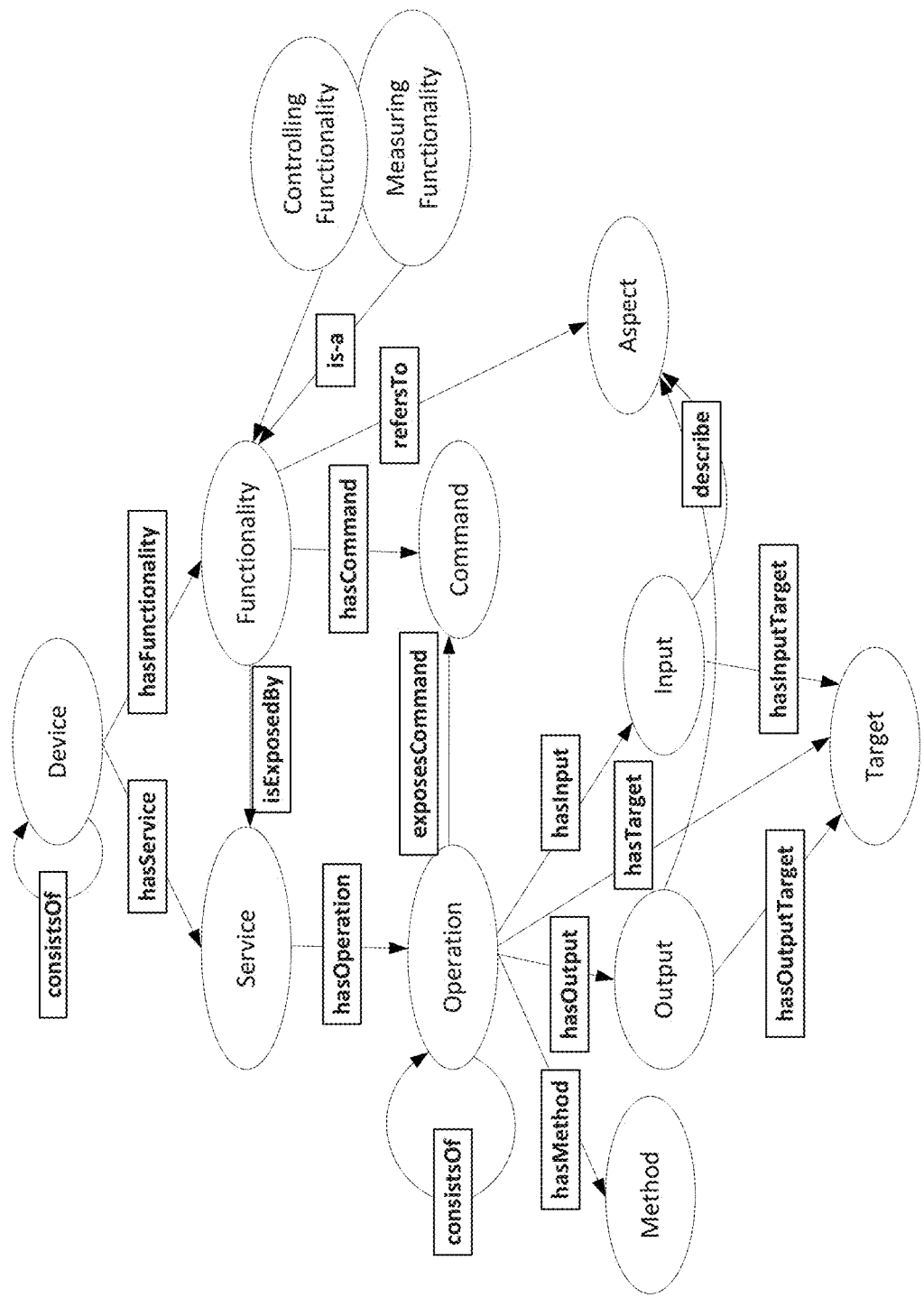
FIG. 8 illustrates an exemplary oneM2M Base Ontology.
Figure 9:
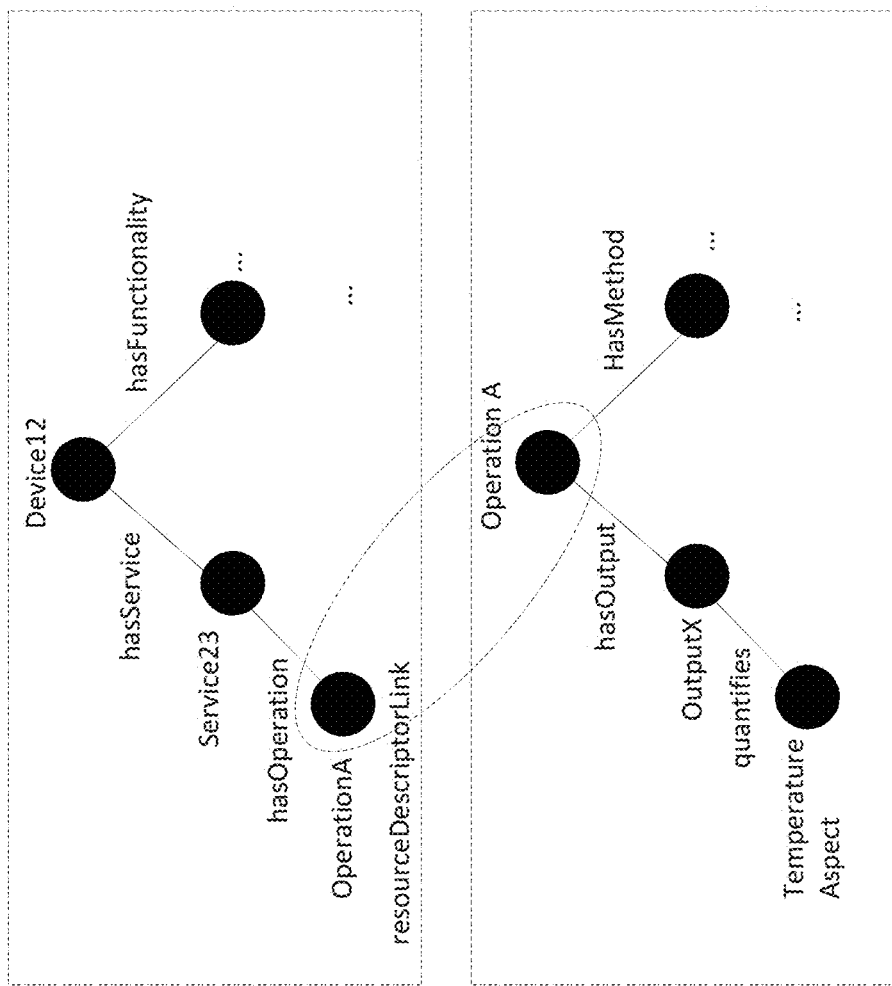
FIG. 9 illustrates an exemplary resourceDescriptorLink.
Figure 10:
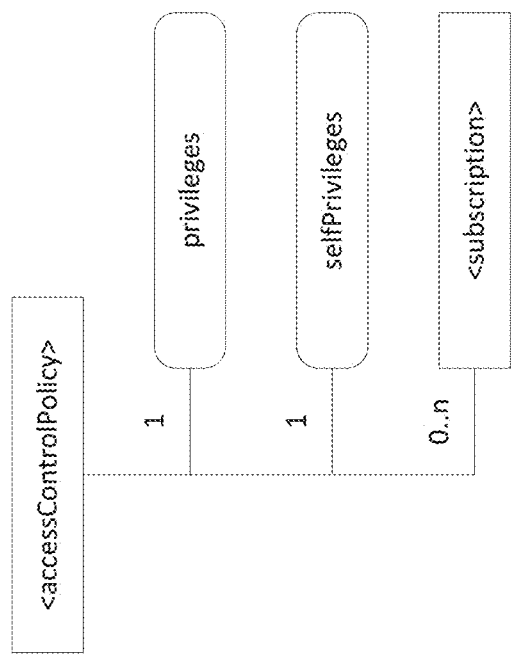
FIG. 10 illustrates an exemplary structure of <accessControlPolicy> resource.
Figure 11:
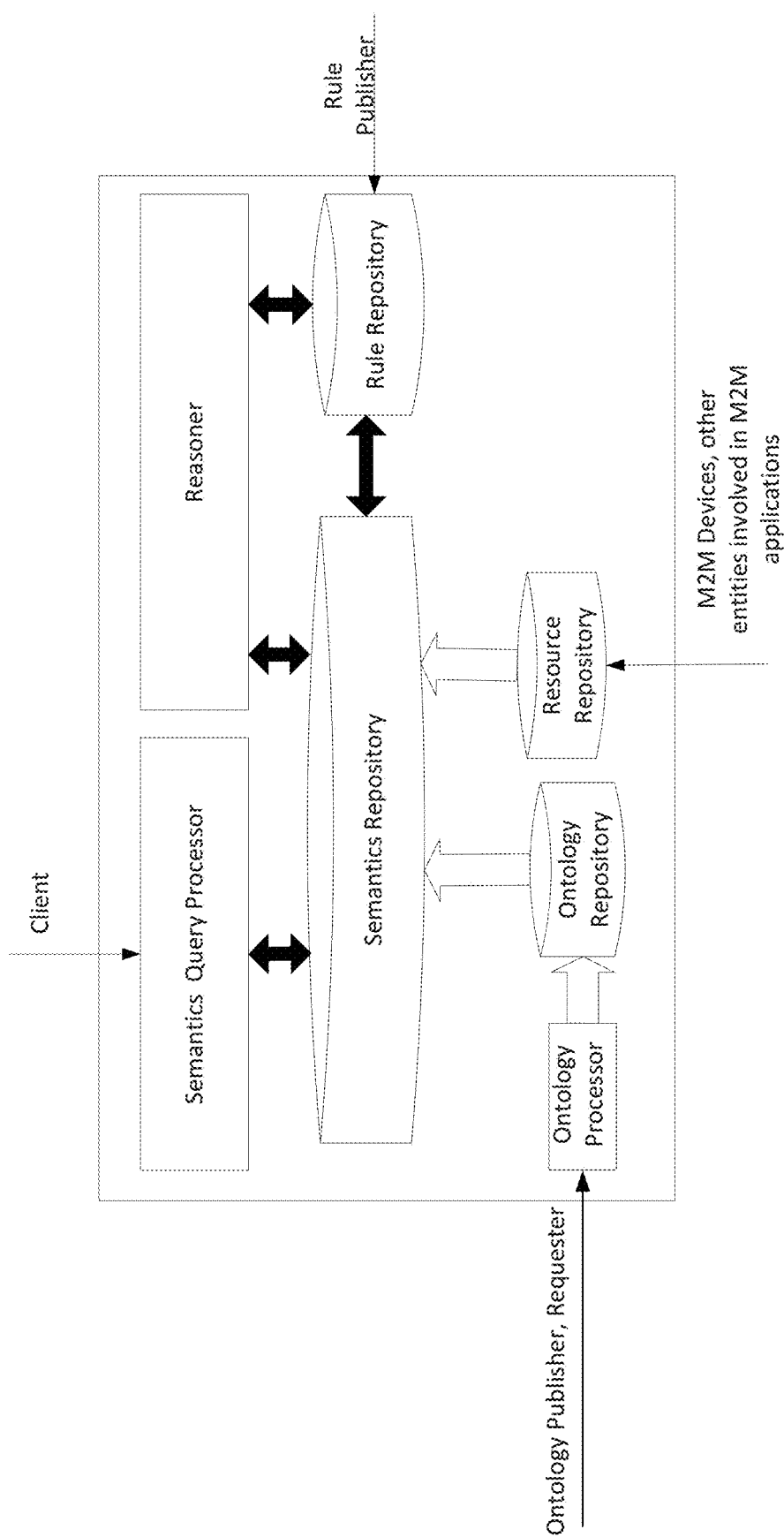
FIG. 11 illustrates an exemplary functional architecture of M2M semantic support.

The following descriptions use the oneM2M Base Ontology (FIG. 8) as an example. The semantic annotation engine uses this ontology to create the graph in FIG. 34 which is represented in RDF. Please note that the text shown is not formatted for accurate RDF syntax within the descriptors, rather it is a conceptual representation of the overall graph.

An example based on an initial subject-based scheme is provided below. In this scheme, each rdf: Description is stored in the semantic descriptor of the corresponding resource, hence the designation as "Subject-based Scheme." With this approach, when forming or updating a triple whose object is another resource, the annotation engine creates an entry into the relatedSemantics attribute in the same <semanticDescriptor> resource as well.

Using the example graph of FIG. 37, the descriptor and the relatedSemantics attributes of the <semanticDescriptor> child resource associated with the resource <Device12> would be as shown in FIG. 39. Note that in this case the graph is distributed across the <Device12>, <OperationA> resources, as well as <Service23> and <OperationX>. The corresponding RDF for the last three resources can be easily extracted from FIG. 38, by isolating the corresponding descriptions.

If employing the list of links method for populating the relatedSemantics attribute in the <semanticDescriptor> resource of <Device12>, the following list as shown in FIG. 40 will be generated. FIG. 40 is an example of relatedSemantics attribute when the list of links method is used.

If employing the group of links method the relatedSemantics attribute in the semanticDescriptor resource of <Device12> may point to the corresponding <semanticGroup> resource. In fact, the relatedSemantics attributes in the semanticDescriptor resources of <Service23>, <OperationA> and <output> point to the same corresponding <semanticGroup> resource. Within the <semanticGroup> resource, the semanticGroupLinks attribute may include the list of links as shown in FIG. 41. FIG. 41 is an example of semanticGroupLinks attribute when the group of links method is used.

Example using an Arbitrary Graph-based Scheme. Using an arbitrary graph-based scheme allows arbitrary graphs to be stored in the semantic descriptor of the resources, and it is the current assumption in oneM2M specifications. This approach allows for any logic to be used in implementation of the annotation engine, in regards with the decision of where individual portions of the overall graph should be stored.

This is loosely associated with the example associated with the discussion for enabling relationships between distributed semantic descriptors, where the graphs stored in each <Device12> and <operationA> contain triples with subjects different than the two resources. We should note however that in this example each resource may include triples related to itself in its own description, so the graphs choices are not completely arbitrary.

For this example, the composite graph described in RDF in FIG. 38 may use colors, numbers, or some other mechanism to represent the information decided to be stored in the descriptors of the <Device12> and <OperationA> respectively. The line at bracket 101 denotes a triple which is stored in both locations. Please note that the text shown is not formatted for accurate RDF syntax within the descriptors, rather it is a conceptual representation of the overall graph, as well as of the triples captured within each descriptor.

In this example, the semantic descriptors associated with resources <Device12> and <OperationA> would be as shown in FIG. 42 and FIG. 43. FIG. 42 is an example semantic annotation for <Device12> in an arbitrary graph-based scheme. FIG. 43 is an example <OperationA> annotation in an Arbitrary Graph-based scheme.

If employing the list of links method in this case the relatedSemantics attributes of <Device12> and <OperationA> will point at each other. This will indicate that when a semantic query is done across one of the descriptors, the other should also be retrieved to complete the graph for query purposes If employing the group of links method the relatedSemantics attributes of both <Device12> and <OperationA> will point to the same <semanticGroup> resource, where the semanticGroupLinks attribute will contain the list of links shown in FIG. 44. FIG. 44 is an example semanticGroupLinks attribute when the group of links method is used.

Maintenance of the relationships between semantic descriptors is done by the annotation engine that generates the schemes as well, and it is the same independent of the way the "related" relationship between the descriptors has been established. Here, there are exemplary schemes such as "subject-based scheme" and an "arbitrary graph based scheme." With the subject based scheme, the triples in the same descriptor have the same subject, and the subject is the parent resource. In the arbitrary scheme, triples can be stored arbitrarily, not by subject.

The maintenance method is simpler for the group approach, since when a descriptor is created, updated, or deleted such that the relationships change, the updates occur mainly in the <semanticGroup> resource, especially for larger groups of related descriptors. In contrast, maintaining the relationships in a list of links implementation is optimal when only a few descriptors are related.

Figure 45:
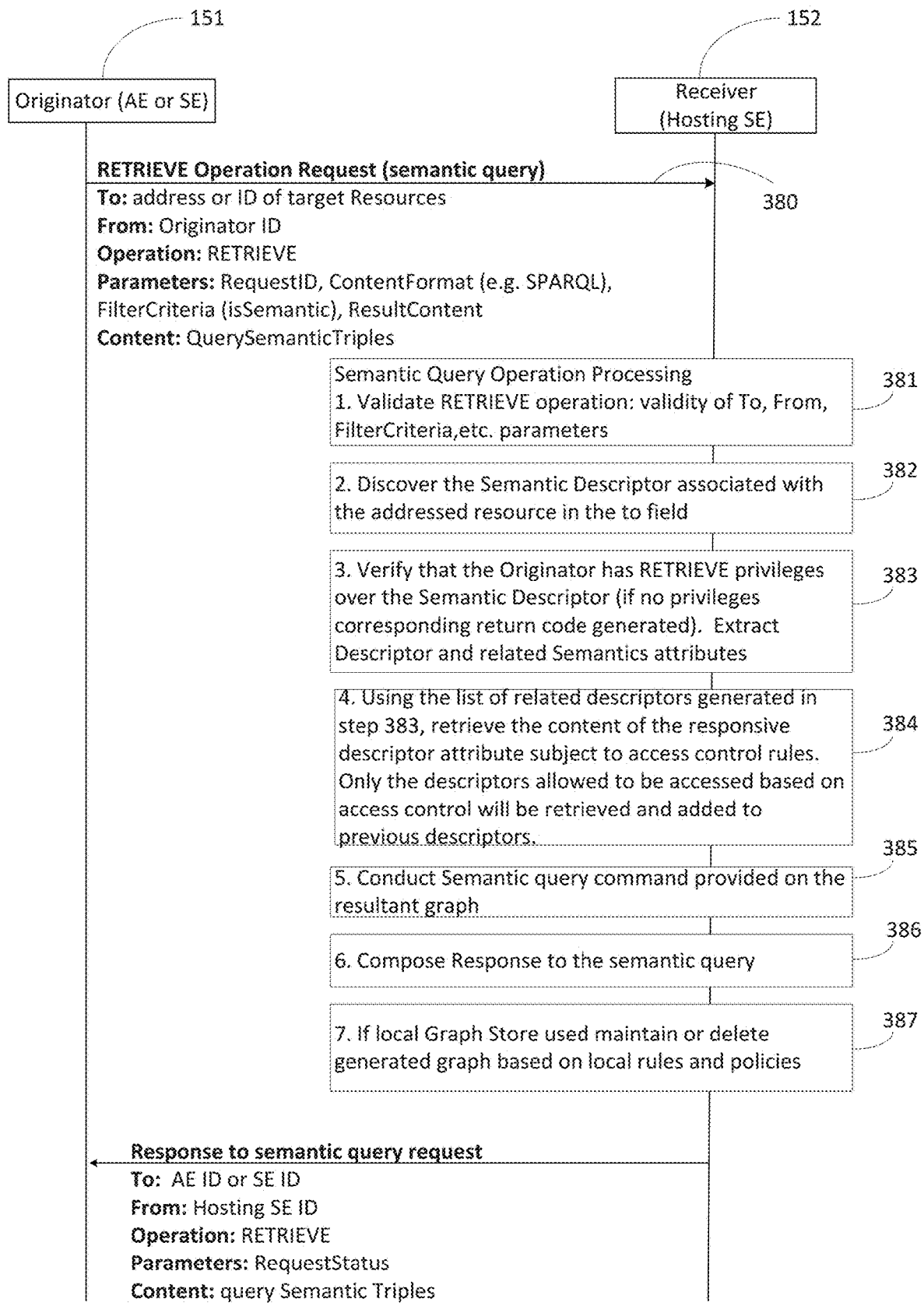
FIG. 45 illustrates an exemplary Semantic Query Using RelatedSemantics Links Approach.

In order to enable semantic filtering on semantic descriptions stored across several resources connected by relatedSemantics attributes, with or without the use of <semanticGroup> resource, the semantic query engine may use the steps of FIG. 45. FIG. 45 illustrates an exemplary method for semantic query using relatedSemantics approach. At step 381, receiver 152 processes a received RETRIEVE request (step 380) by validating the request parameters. Although RETRIEVE request starting with step 380 in this instance is discussed here, other semantic resource discovery is generally applicable. At step 382, receiver 152 discovers the semantic descriptor associated with the addressed resource in the corresponding field. The semanticDescriptor itself may have an attribute called relatedSemantics, which identifies other descriptors to get. At step 383, receiver 152 verifies that originator 151 has RETRIEVE privileges over the message target (e.g., a semantic descriptor), then extract descriptor and relatedSemantics attributes. If no privileges over the message target, then corresponding return code generated. The content of the semantic descriptor may be saved locally, which may be as a document or in local or temporary graph store. A document is the representation of the semantic descriptor, like in FIG. 42. The graph store is like FIG. 25. The related semantics may be used to generate list (i.e., set) of other semantic descriptors to be retrieved. This list may be provided directly or by accessing the <semanticGroup> resource pointed at by the relatedSemantics attribute. If originator 151 has no RETRIEVE privileges at the <semanticGroup>, no other descriptors are gathered.

With continued reference to FIG. 45, at step 384, receiver 152 may use the list of related descriptors generated in the previous step. Receiver 152 retrieves the content of each of the respective descriptor attributes, subject to access control rules. If allowed to be accessed, the content of each of the descriptor attributes of the <semanticDescriptor> resources linked is added to the content on which the SPARQL request is being executed. The full or enlarged content subject to the SPARQL request is provided to the SPARQL engine for processing. At step 385, receiver 152 conducts semantic query command (or other semantic resource discovery) provided on the resultant graph. At step 386, receiver 152 composes response to the semantic query. At step 387, if the local graph store has been used, the receiver may maintain or delete generated graph based on local rules and policies.

Technical effects of the disclosed approaches for semantic filtering or discovery may include the following: 1) required semantic information may be found; 2) resource-based access control may be in some instances more easily enforced as the information is being accessed at execution time of the operation and the access privileges of the requester may be applied; 3) the content to be processed by the SPARQL engine is collected prior to processing, which may allow the use of external, non-oneM2M specific semantic query engines; or 4) descriptors containing more than one common concept are linked by only one link, which may allow for easier avoidance of duplicate content being considered for request processing.

Using the example associated with "enabling Relationships between Distributed Semantic descriptors", the composite graph (FIG. 34) is constructed using the steps above (e.g., FIG. 45) and is provided to the SPARQL engine for processing. The SPARQL engine may use a local triple store in order to temporarily store the graphs, in which case this may lead to a HYBRID approach.

Discussed below are examples based on <semanticGroup>. Given an implementation of distributed semantic descriptors, an enhanced <semanticGroup> resource as introduced below may provide not only for maintaining the relationships between the descriptors, but also for the semantic filtering operations being more efficient.

Figure 46:
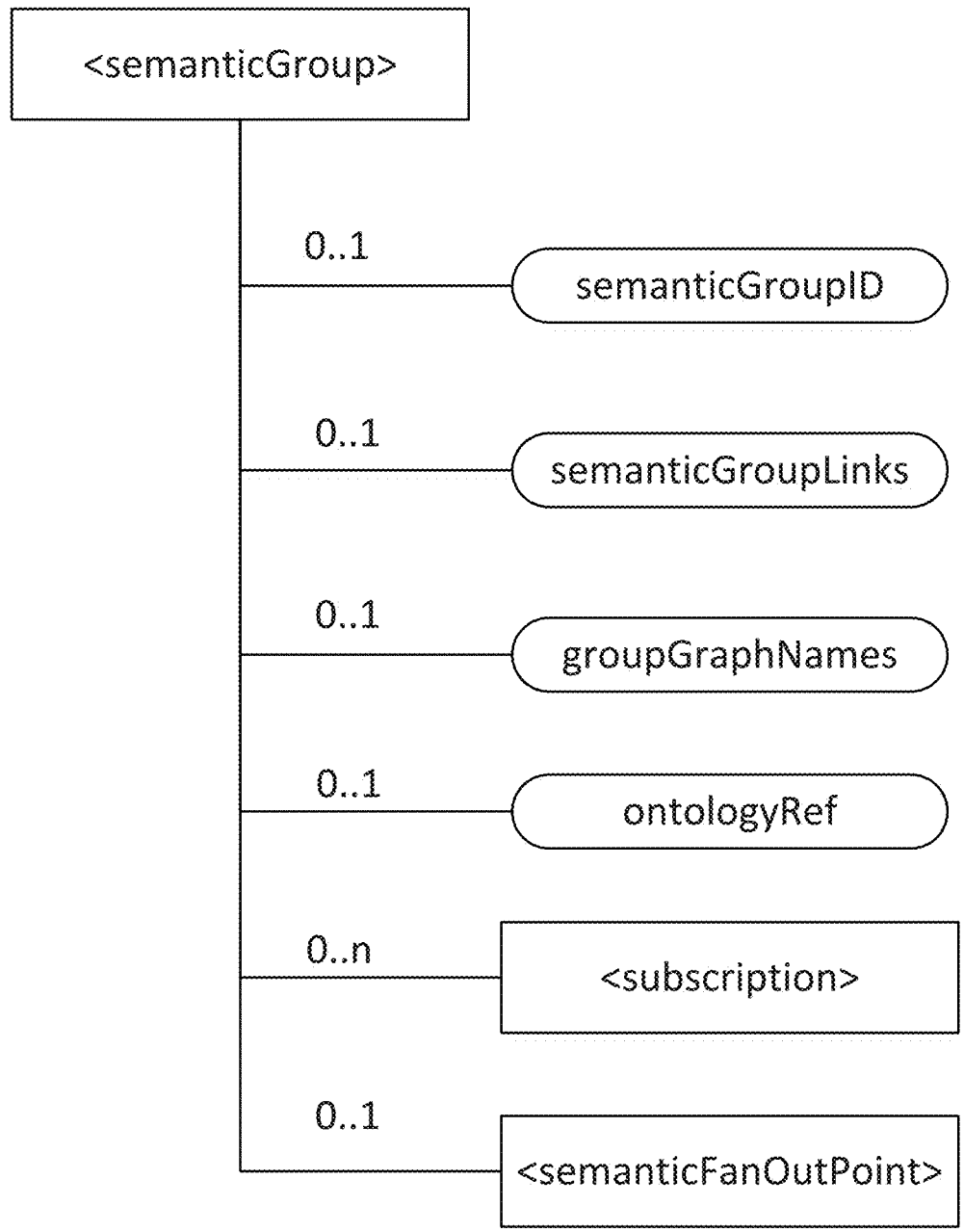
FIG. 46 illustrates an exemplary Enhanced <semanticGroup> resource.

FIG. 46 illustrates an example of an enhanced <semanticGroup> resource. The enhancement includes the introduction of resource <semanticFanOutPoint>, which may be a virtual resource and allow the <semanticGroup> resource to become the target of semantic queries instead of the individual resources. This may add a layer of usefulness when the query originator (e.g., originator 151) has an understating of the resource tree based on previous discoveries. By addressing the queries to the <semanticFanOutPoint> of the <semanticGroup> resource, a technical effect may be that the semantic engine at receiver 152 may more easily maintain and search the composite graph associated with the entire group. Local triple store storage, caching, etc., may further make more efficient the processing of the query in the semantic engine at the receiver, for faster results. In addition, the <semanticGroup> resource may be used to target queries to resources belonging to different SEs. If the <semanticGroup> resource residing on a first SE includes member resources on a second SE and third SE, respectively, the retrieve operation may be fanned out to corresponding resources on the second SE and third SE. Then the queries may be processed within the individual SEs as described above.

Another enhancement when using the <semanticGroup> resource may be made by providing instructions for the use of graph names for each graph contained in a semantic descriptor, e.g., each semantic descriptor created may be named and a unique name should be assigned to it. In addition it may be provided that the graph name is associated with the location of the descriptor. The naming might be hierarchical, such that all the graphs in the group might be addressed together, or the names assigned might be independent of each other. In either case a new attribute groupGraphNames may be used to provide the names for the graphs in the group, either via a list or the root name.

A technical effect of this method may be to provide the originator of semantic operations greater granularity by making them as specific or as wide as possible. On the receiver side the semantic engine may be more efficient, such that when receiving a query request addressed to the <semanticFanOutPoint> but in which the SPARQL payload indicates a specific graph, the engine uses the relationship between the graph name and the links provided in the semanticGroupLinks to address only the descriptor associated with the given graph.

Figure 1:
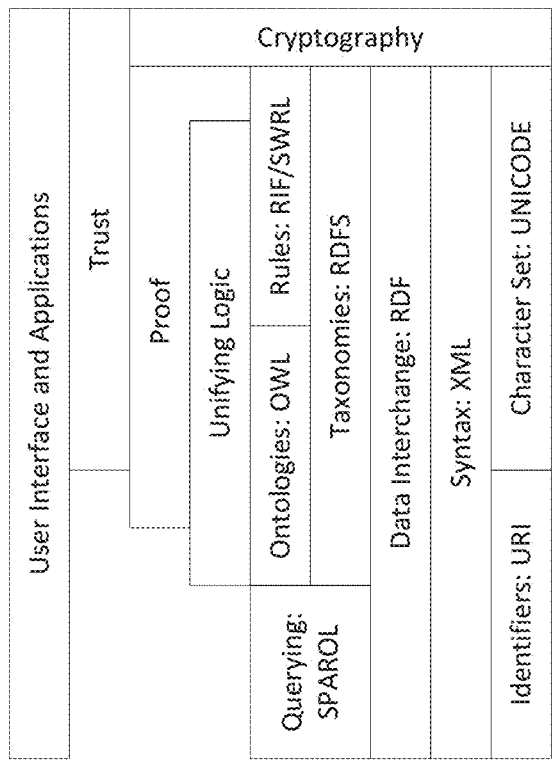
FIG. 1 illustrates an exemplary Architecture of the Semantic Web.
Figure 2:
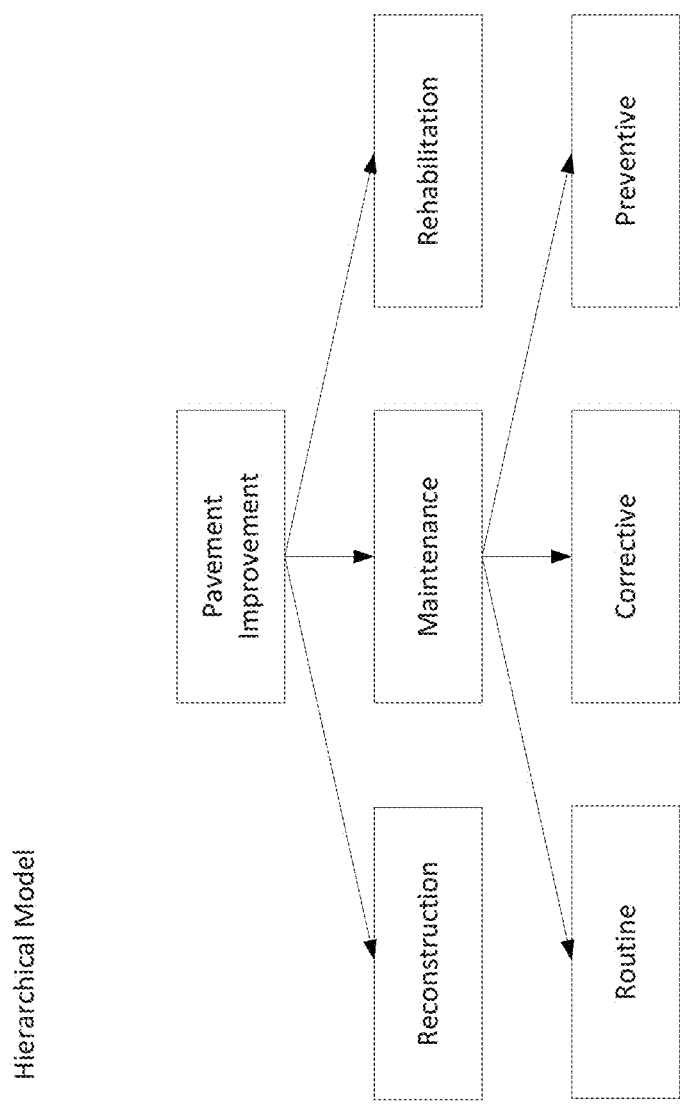
FIG. 2 illustrates an exemplary Hierarchical Database.
Figure 3:
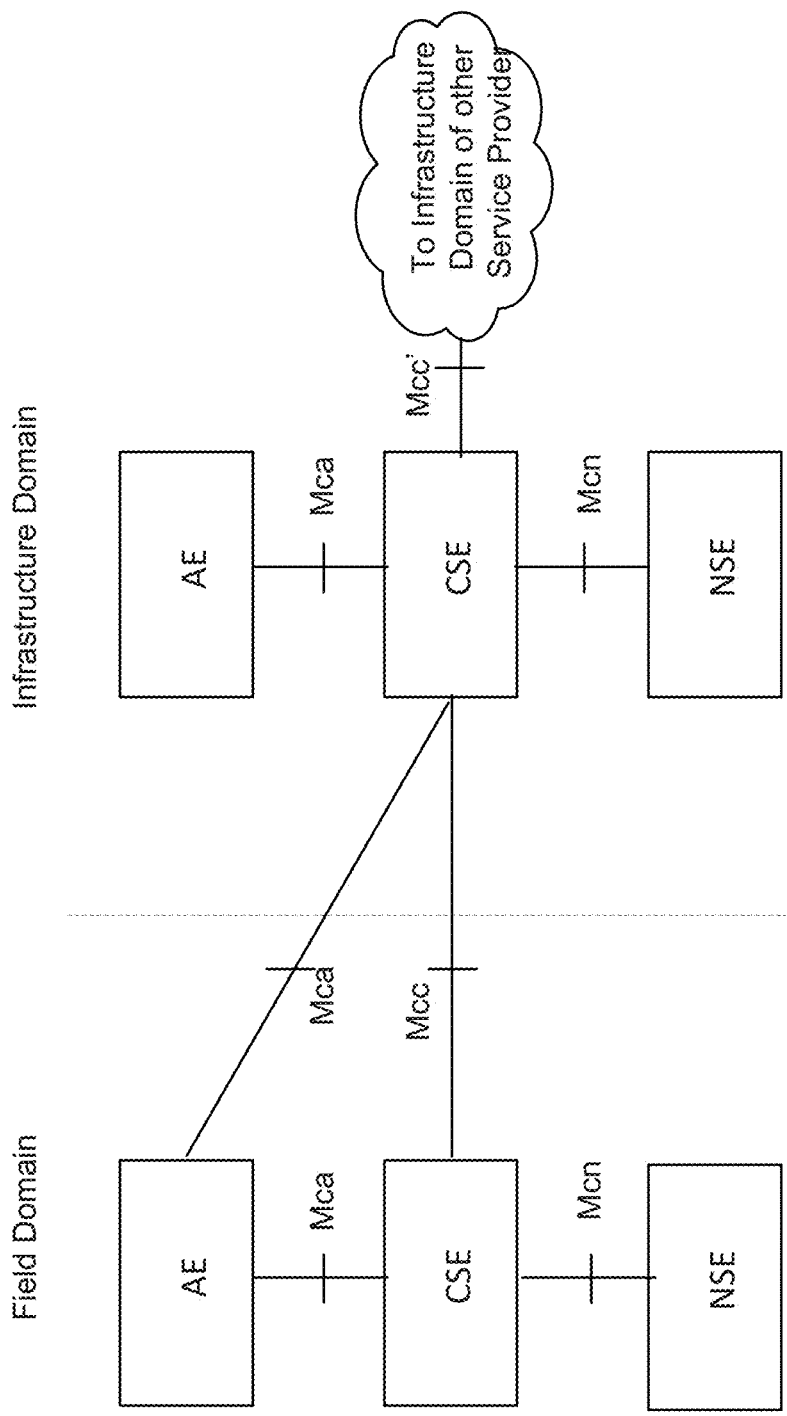
FIG. 3 illustrates an exemplary oneM2M Architecture.
Figure 4:
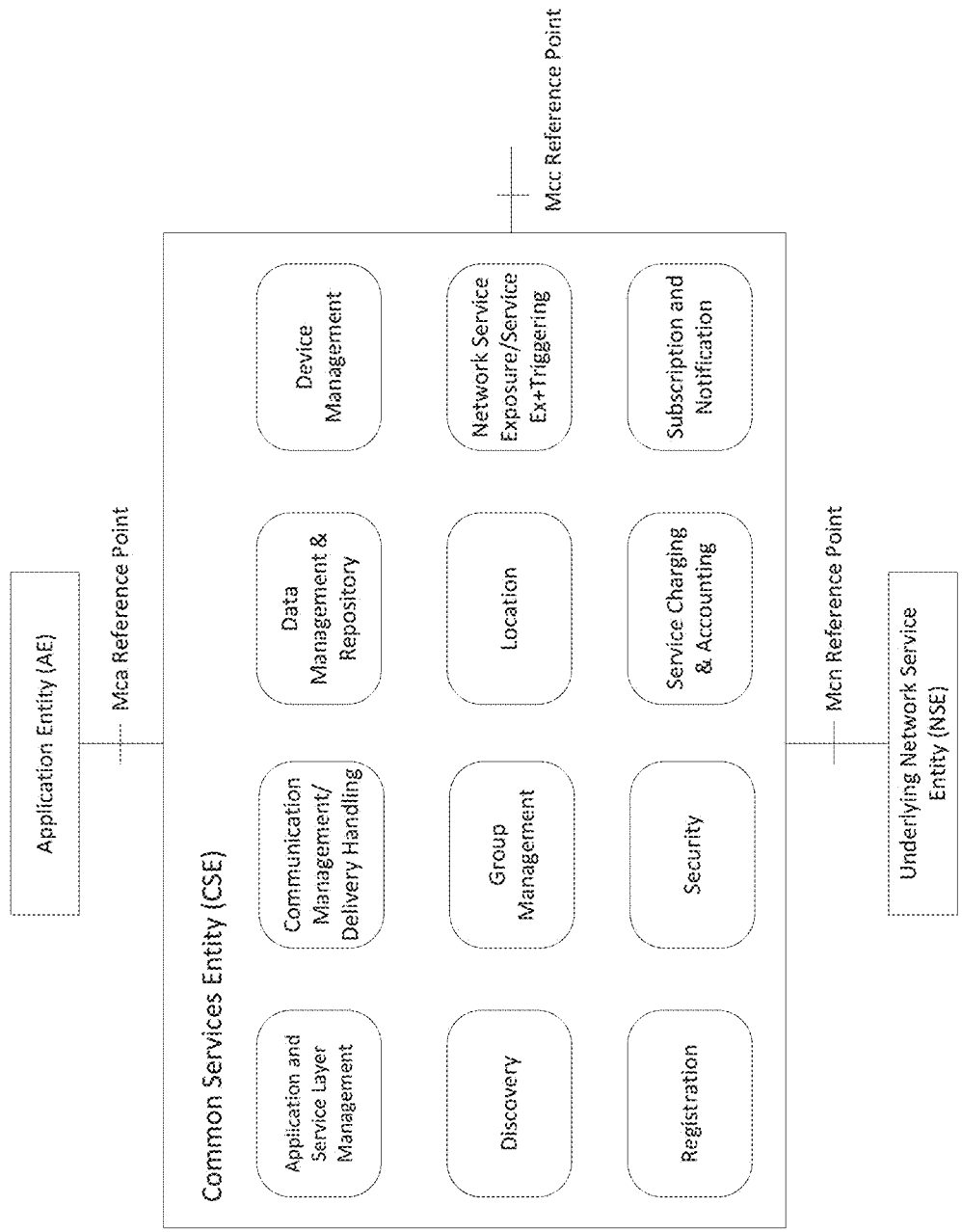
FIG. 4 illustrates an exemplary oneM2M Common Service Functions.
Figure 5:
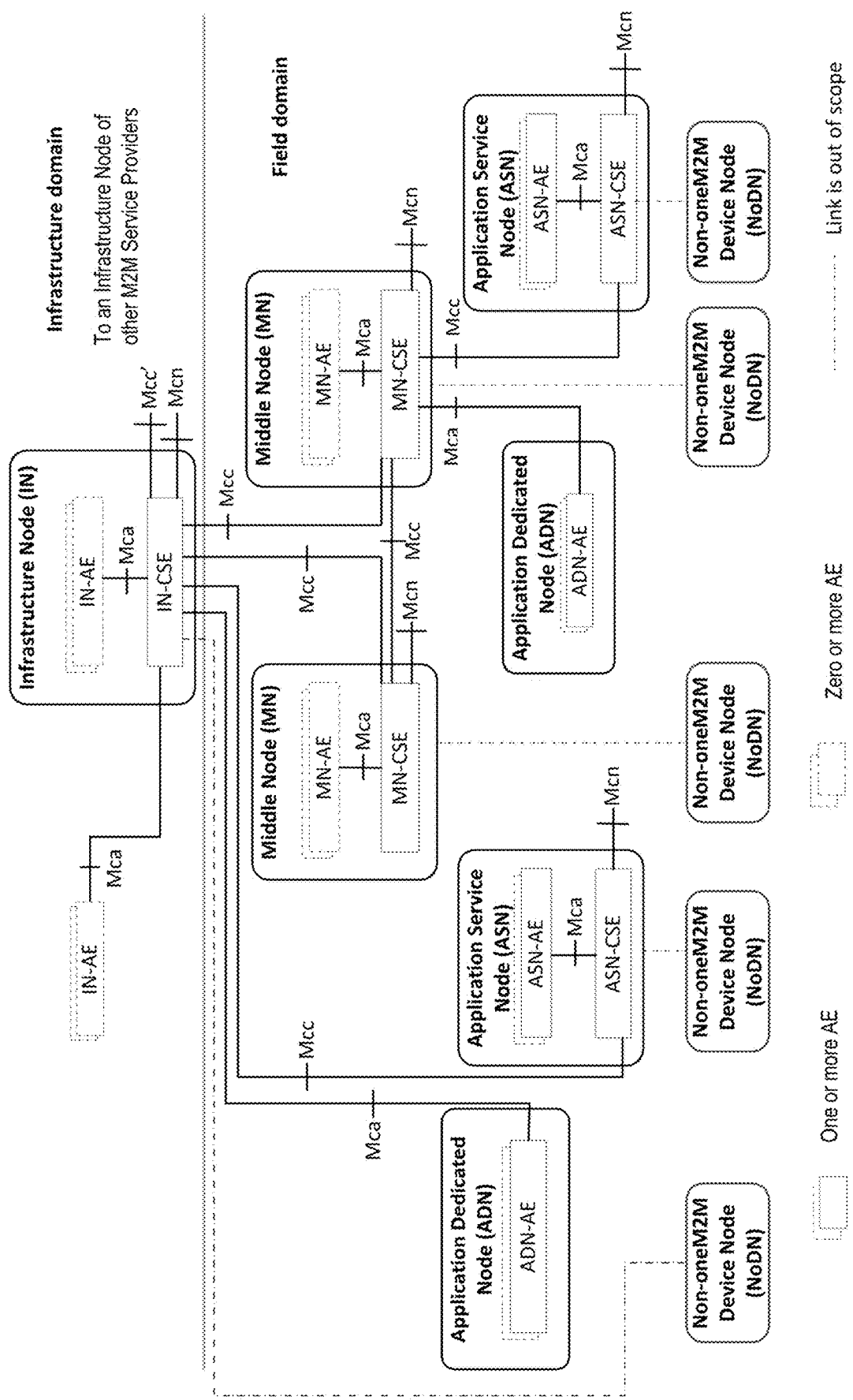
FIG. 5 illustrates an exemplary configuration supported by oneM2M Architecture
Figure 6:
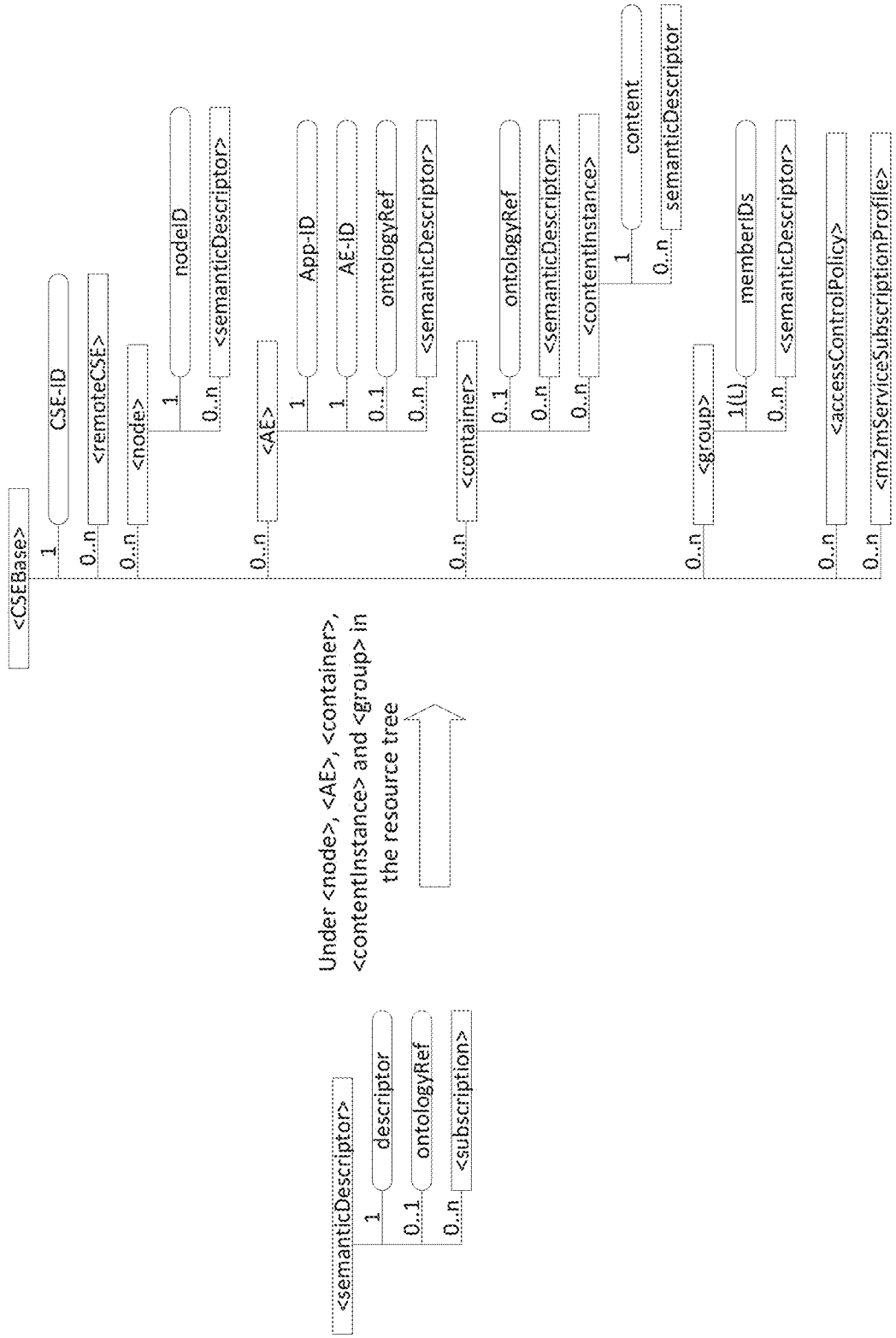
FIG. 6 illustrates an exemplary structure of <semanticDescriptor> Resource in a Resource Tree.
Figure 7:
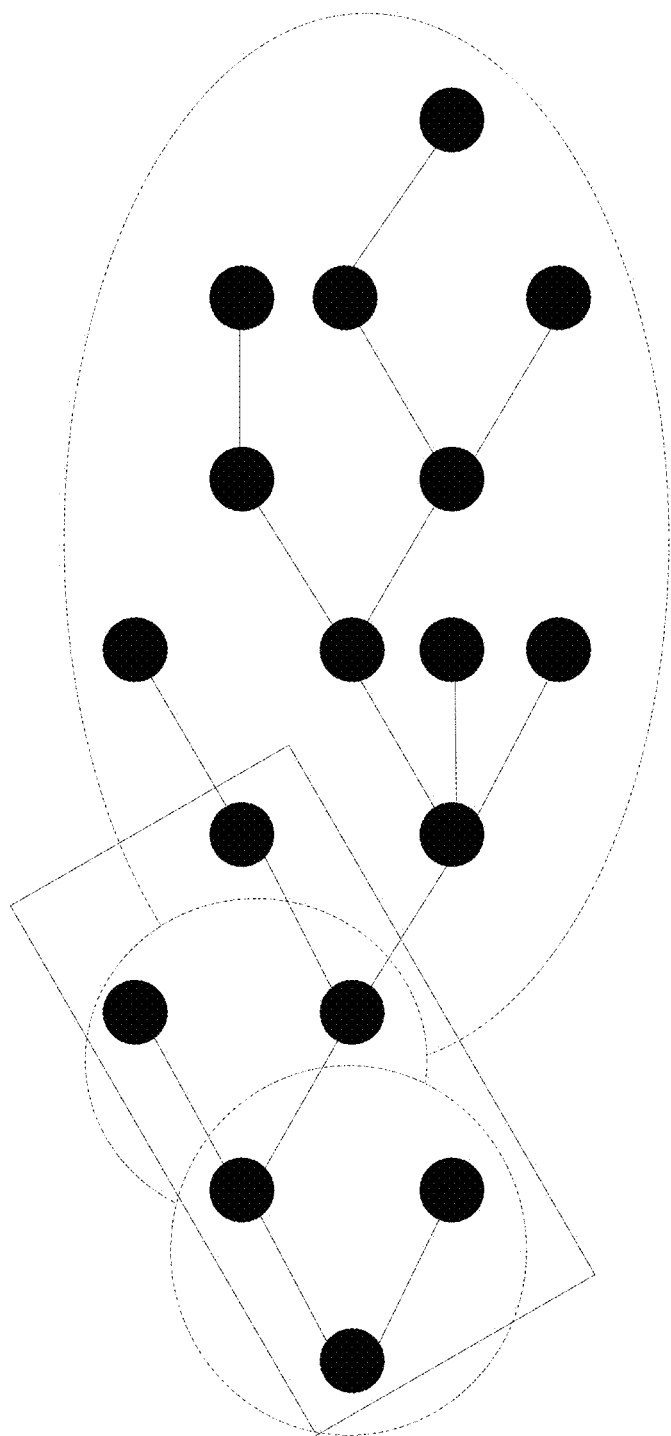
FIG. 7 illustrates an exemplary scope of semantic filter across semantic information stored in different resources.
Figure 47:
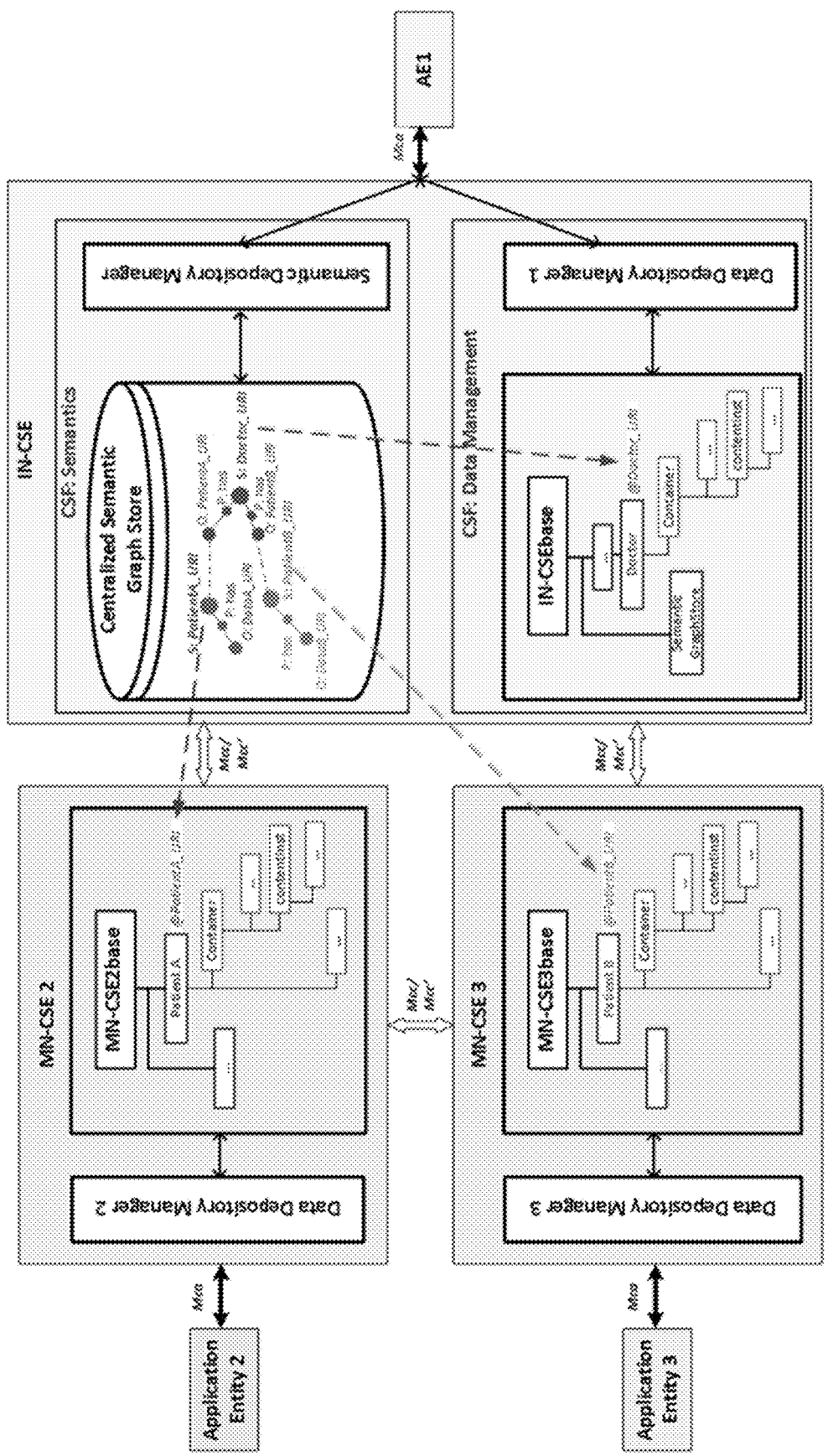
FIG. 47 illustrates an exemplary Architecture for disclosed methods using oneM2M.
Figure 48:
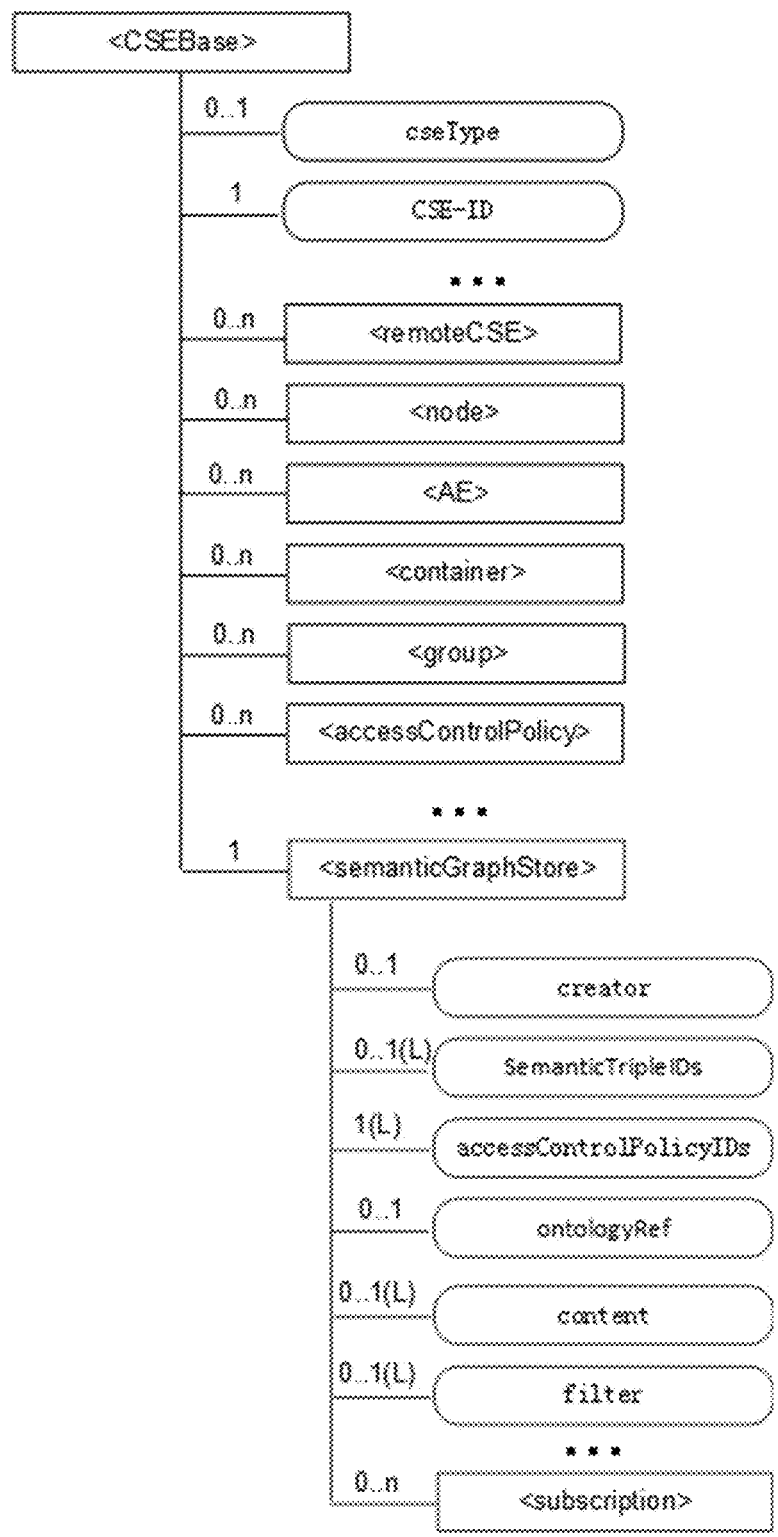
FIG. 48 illustrates an exemplary Resource Tree for disclosed methods using oneM2M.

Considering the oneM2M architecture shown in FIG. 4, the semantic graph store and semantic depository manager may reside in CSF Semantics, and the resource tree and data depository manager may reside in CSF data management and repository. FIG. 47 illustrates an exemplary architecture with a semantic graph store considering oneM2M. FIG. 48 illustrates an exemplary resource tree for disclosed methods using oneM2M. As shown in FIG. 48, new resource <SemanticGraphStore> is added under the <CSEbase>. In an example, relatedSemantics attribute of a different semanticDescriptor resource may point to a <semanticGroup> to indicate the descriptors that are related. Once that's done, the semanticFanOutPoint of the group may be used to send semantic operations which concern all the related descriptors.

Figure 50:
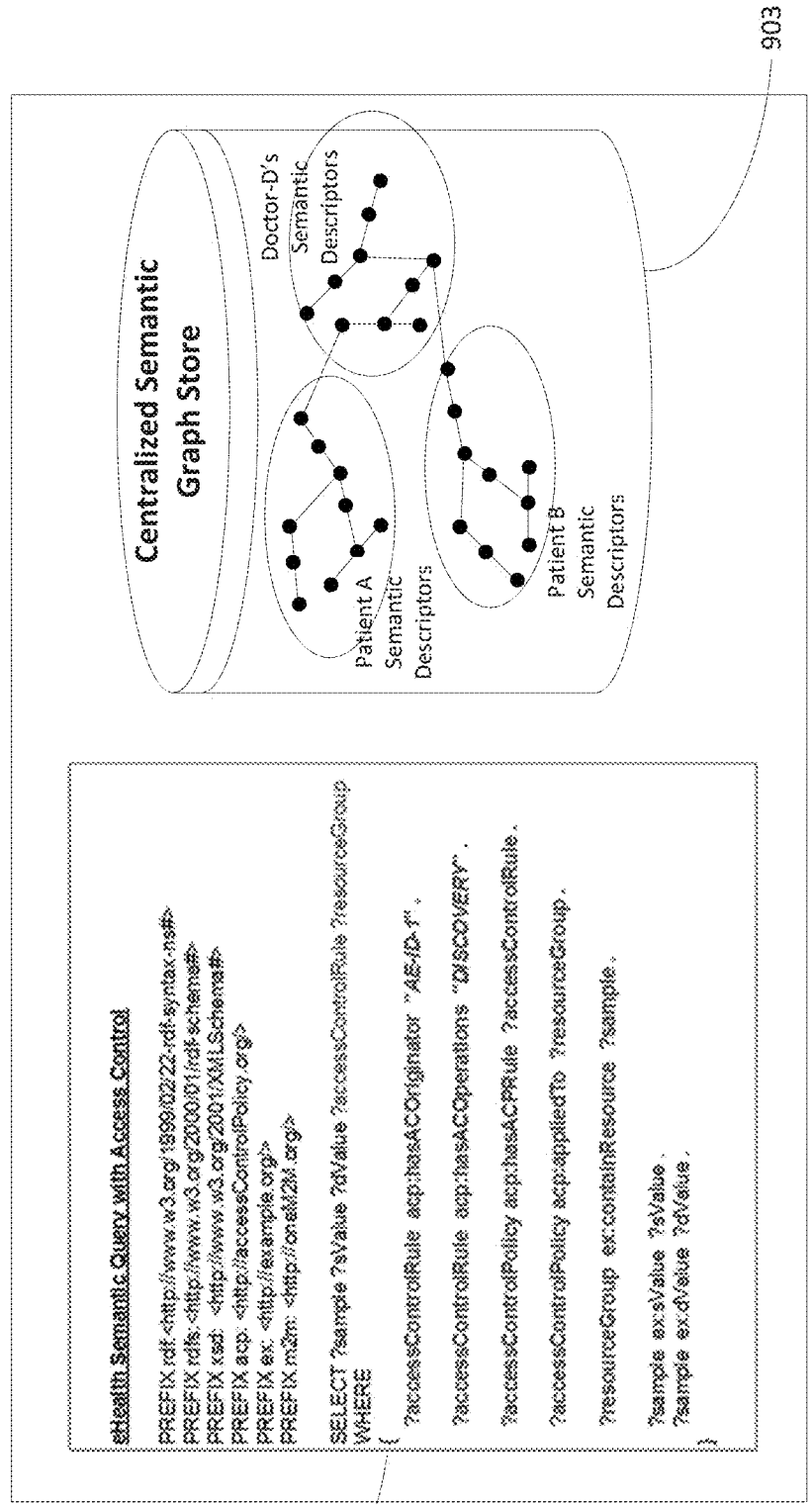
FIG. 50 illustrates an exemplary display that may be generated based on the methods and systems herein.

FIG. 50 illustrates an exemplary display (e.g., graphical user interface) that may be generated based on the methods and systems discussed herein. Display interface 901 (e.g., touch screen display) may provide text in block 902 associated with RESTful operations for semantic IoT, such as eHealth semantic query with access control as discussed herein. In another example, progress of any of the steps (e.g., sent messages or success of steps) discussed herein may be displayed in block 902. In addition, graphical output 903 may be displayed on display interface 901. Graphical output 903 may be the topology of a semantics graphic store, a graphical output of the progress of any method or systems discussed herein (e.g., FIG. 18-FIG. 21, among others), or the like. FIG. 53A through FIG. 53C illustrate output that may be on display interface 901. There may be query result with an option to choose a download format. As shown, there may be an Svalue, Dvalue, semantic descriptor, and sample shown as provided in the example and corresponding result in FIG. 53A through FIG. 53C.

FIG. 51A is a diagram of an example machine-to machine (M2M), Internet of Things (IoT), or Web of Things (WoT) communication system 10 in which one or more disclosed concepts associated with RESTful operations for semantic IoT may be implemented (e.g., FIG. 16-FIG. 49C and FIG. 54). Generally, M2M technologies provide building blocks for the IoT/WoT, and any M2M device, M2M gateway or M2M service platform may be a component of the IoT/WoT as well as an IoT/WoT service layer, etc.

As shown in FIG. 51A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 51A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example.

Referring to FIG. 51B, the illustrated M2M service layer 22 in the field domain provides services for the M2M application 20 (e.g., eHealthcare App), M2M gateway devices 14, and M2M terminal devices 18 and the communication network 12. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Referring also to FIG. 51B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. These service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

In some examples, M2M applications 20 and 20' may include desired applications that communicate using RESTful operations for semantic IoT, as discussed herein. The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

The RESTful operations for semantic IoT of the present application may be implemented as part of a service layer. The service layer is a software middleware layer that supports value-added service capabilities through a set of application programming interfaces (APIs) and underlying networking interfaces. An M2M entity (e.g., an M2M functional entity such as a device, gateway, or service/platform that may be implemented by a combination of hardware and software) may provide an application or service. Both ETSI M2M and oneM2M use a service layer that may contain the RESTful operations for semantic IoT of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) or a network node (where it is referred to as a network SCL (NSCL)). The oneM2M service layer supports a set of Common Service Functions (CSFs) (e.g., service capabilities). An instantiation of a set of one or more particular types of CSFs is referred to as a Common Services Entity (CSE), which can be hosted on different types of network nodes (e.g., infrastructure node, middle node, application-specific node). Further, the RESTful operations for semantic IoT of the present application can be implemented as part of an M2M network that uses a Service Oriented Architecture (SOA) or a resource-oriented architecture (ROA) to access services such as the RESTful operations for semantic IoT of the present application.

As discussed herein, the service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications r various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware or software and that provides (service) capabilities or functionalities exposed to various applications or devices (i.e., functional interfaces between such functional entities) in order for them to use such capabilities or functionalities.

FIG. 51C is a system diagram of an example M2M device 30, such as an M2M terminal device 18 (e.g., AE 367, AE 335, or originator 151) or an M2M gateway device 14 (e.g., SE 361 or receiver 152) for example. As shown in FIG. 51C, the M2M device 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. It will be appreciated that the M2M device 30 may include any sub-combination of the foregoing elements while remaining consistent with the disclosed subject matter. M2M device 30 (e.g., Service entity 163, receiver of FIG. 22 and originator 161 of FIG. 22, MN-CSE of FIG. 47, Application Entity 373 of FIG. 29, IN-CSE of FIG. 47, and others) may be an exemplary implementation that performs the disclosed systems and methods for RESTful operations for semantic IoT.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, or any other functionality that enables the M2M device 30 to operate in a wireless environment. The processor 32 may be coupled to the transceiver 34, which may be coupled to the transmit/receive element 36. While FIG. 51C depicts the processor 32 and the transceiver 34 as separate components, it will be appreciated that the processor 32 and the transceiver 34 may be integrated together in an electronic package or chip. The processor 32 may perform application-layer programs (e.g., browsers) or radio access-layer (RAN) programs or communications. The processor 32 may perform security operations such as authentication, security key agreement, or cryptographic operations, such as at the access-layer or application layer for example.

The transmit/receive element 36 may be configured to transmit signals to, or receive signals from, an M2M service platform 22. For example, the transmit/receive element 36 may be an antenna configured to transmit or receive RF signals. The transmit/receive element 36 may support various networks and air interfaces, such as WLAN, WPAN, cellular, and the like. In an example, the transmit/receive element 36 may be an emitter/detector configured to transmit or receive IR, UV, or visible light signals, for example. In yet another example, the transmit/receive element 36 may be configured to transmit and receive both RF and light signals. It will be appreciated that the transmit/receive element 36 may be configured to transmit or receive any combination of wireless or wired signals.

In addition, although the transmit/receive element 36 is depicted in FIG. 51C as a single element, the M2M device 30 may include any number of transmit/receive elements 36. More specifically, the M2M device 30 may employ MIMO technology. Thus, in an example, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other examples, the processor 32 may access information from, and store data in, memory that is not physically located on the M2M device 30, such as on a server or a home computer. The processor 32 may be configured to control lighting patterns, images, or colors on the display or indicators 42 in response to whether the steps in some of the examples described herein are successful or unsuccessful (e.g., semantic triple CREATE operation request or semantic triple RETRIEVE operation request, etc.), or otherwise indicate a status of RESTful operations for semantic IoT as discussed herein and associated components. The control lighting patterns, images, or colors on the display or indicators 42 may be reflective of the status of any of the method flows or components in the FIG.'S illustrated or discussed herein (e.g., FIG. 16-FIG. 49C and FIG. 52-FIG. 54 and the like herein). Disclosed herein are messages and procedures of RESTful operations for semantic IoT. The messages and procedures can be extended to provide interface/API for users to request resource-related resources via an input source (e.g., speaker/microphone 38, keypad 40, or display/touchpad 42) and request, configure, or query RESTful operations for semantic IoT, among other things that may be displayed on display 42.

The processor 32 may receive power from the power source 48, and may be configured to distribute or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M device 30. It will be appreciated that the M2M device 30 may acquire location information by way of any suitable location-determination method while remaining consistent with information disclosed herein.

The processor 32 may further be coupled to other peripherals 52, which may include one or more software or hardware modules that provide additional features, functionality or wired or wireless connectivity. For example, the peripherals 52 may include various sensors such as an accelerometer, biometrics (e.g., fingerprint) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The transmit/receive elements 36 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The transmit/receive elements 36 may connect to other components, modules, or systems of such apparatuses or devices via one or more interconnect interfaces, such as an interconnect interface that may comprise one of the peripherals 52.

FIG. 51D is a block diagram of an exemplary computing system 90 on which, for example, the M2M service platform 22 of FIG. 51A and FIG. 51B may be implemented. Computing system 90 (e.g., M2M terminal device 18 or M2M gateway device 14) may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is a processor, distinct from main CPU 91, that performs additional functions or assists CPU 91. CPU 91 or coprocessor 81 may receive, generate, and process data related to the disclosed systems and methods for RESTful operations for semantic IoT, such as processing a request to CREATE as in step 202 of FIG. 18.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIG. 51A and FIG. 51B.

It is understood that any or all of the systems, methods and processes described herein may be embodied in the form of computer executable instructions (e.g., program code) stored on a computer-readable storage medium which instructions, when executed by a machine, such as a computer, server, M2M terminal device, M2M gateway device, or the like, perform or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals. As evident from the herein description, storage media should be construed to be statutory subject matter under United States Code, Title 35, Section 101 (35 U.S.C. § 101). Computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred methods, systems, or apparatuses of the subject matter of the present disclosure—RESTful operations for semantic IoT—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

What is claimed:

1. An apparatus for semantic operations, the apparatus comprising:
    a processor; and
    a memory coupled with the processor, the memory comprising executable instructions that when executed by the processor cause the processor to effectuate operations comprising:
        receiving a message that has a virtual fanout resource,
            wherein the virtual fanout resource is a child resource,
            wherein the virtual fanout resource is virtual based on not containing semantic triples;
        using the virtual fanout resource to connect with multiple semantic descriptors,
            wherein the multiple semantic descriptors comprise semantic triples,
            wherein using the virtual fanout resource comprises triggering an operation in a semantic graph,
        in response to using the virtual fanout resource to connect with multiple semantic descriptors, retrieving content from attributes of the multiple semantic descriptors, wherein the multiple semantic descriptors are distributed over multiple common service entities of a communications network;
        generating a semantic graph based on the retrieved content from the content of the multiple semantic descriptors; and
        providing instructions to conduct semantic operation on the semantic graph.

2. The apparatus of claim 1, the operations further comprising saving the generated semantic graph in a temporary graph store.

3. The apparatus of claim 1, the operations further comprising assigning a name for the semantic graph.

4. The apparatus of claim 1, the operations further comprising assigning a name for the semantic graph, wherein the name of the semantic graph is associated with location of a first semantic descriptor of the multiple semantic descriptors.

5. The apparatus of claim 1, the operations further comprising assigning a hierarchical name for the semantic graph.

6. The apparatus of claim 1, the operations further comprising:
   assigning a name for the semantic graph; and
   inserting the name into an attribute that is used for providing the names for semantic graphs in a group.

7. A method for semantic resource discovery, the method comprising:
   receiving a message that has a virtual fanout resource;
      wherein the virtual fanout resource is a child resource,
      wherein the virtual fanout resource is virtual based on not containing semantic triples;
   using the virtual fanout resource to connect with multiple semantic descriptors,
      wherein the multiple semantic descriptors comprise semantic triples,
      wherein using the virtual fanout resource triggers comprises triggering an operation in a semantic graph,
      wherein the operation is a RETRIEVE or UPDATE conducted over the multiple semantic descriptors,
      wherein each semantic descriptor of the multiple semantic descriptors is a member resource of the group resource in a resource tree;
   in response to using the virtual fanout resource to connect with multiple semantic descriptors, retrieving content from attributes of the multiple semantic descriptors, wherein the multiple semantic descriptors are distributed over multiple common service entities of a communications network;
   generating a semantic graph based on the retrieved content from the content of the multiple semantic descriptors; and
   providing instructions to conduct semantic operation on the semantic graph.

8. The method of claim 7, further comprising saving the generated semantic graph in a temporary graph store.

9. The method of claim 7, further comprising assigning a name for the semantic graph.

10. The method of claim 7, further comprising assigning a name for the semantic graph, wherein the name of the semantic graph is associated with location of a first semantic descriptor of the multiple semantic descriptors.

11. The method of claim 7, further comprising:
   assigning a name for the semantic graph; and
   inserting the name into an attribute that is used for providing the names for semantic graphs in a group.

12. A computer readable storage medium storing computer executable instructions that when executed by a computing device cause said computing device to effectuate operations comprising:
   receiving a message that has a virtual fanout resource,
      wherein the virtual fanout resource is a child resource,
      wherein the virtual fanout resource is virtual based on not containing semantic triples;
   using the virtual fanout resource to connect with multiple semantic descriptors,
      wherein the multiple semantic descriptors comprise semantic triples,
      wherein using the virtual fanout resource comprises triggering an operation in a semantic graph;
   in response to using the virtual fanout resource to connect with multiple semantic descriptors, retrieving content from attributes of the multiple semantic descriptors, wherein the multiple semantic descriptors are distributed over multiple common service entities of a communications network;
   generating a semantic graph based on the retrieved content from the content of the multiple semantic descriptors; and
   providing instructions to conduct semantic operation on the semantic graph.

13. The computer readable storage medium of claim 12, the operations further comprising saving the generated semantic graph in a temporary graph store.

14. The computer readable storage medium of claim 12, the operations further comprising assigning a name for the semantic graph.

* * * * *